(12) United States Patent
Schoon

(10) Patent No.: US 8,662,277 B2
(45) Date of Patent: Mar. 4, 2014

(54) PLANETARY GEARBOX WITH INTEGRAL SERVICE BRAKE

(75) Inventor: Benjamin Warren Schoon, Lafayette, IN (US)

(73) Assignee: Fairfield Manufacturing Company, Inc., Lafayette, IN (US)

( * ) Notice: Subject to any disclaimer, the term of this patent is extended or adjusted under 35 U.S.C. 154(b) by 40 days.

(21) Appl. No.: 13/335,378

(22) Filed: Dec. 22, 2011

(65) Prior Publication Data

US 2013/0161148 A1  Jun. 27, 2013

(51) Int. Cl.
- *F16H 57/10* (2006.01)
- *B60T 1/06* (2006.01)
- *B60T 13/22* (2006.01)
- *F16D 66/00* (2006.01)

(52) U.S. Cl.
USPC ....... 192/221.1; 188/71.5; 188/71.8; 475/331

(58) Field of Classification Search
USPC ...................................................... 192/221.1
See application file for complete search history.

(56) References Cited

U.S. PATENT DOCUMENTS

| | | | |
|---|---|---|---|
| 3,998,295 A | 12/1976 | Martin | |
| 4,010,830 A | 3/1977 | Logus et al. | |
| 4,064,973 A | 12/1977 | Deem et al. | |
| 4,173,269 A | 11/1979 | Craig | |
| 4,279,330 A | 7/1981 | Pottorff et al. | |
| 4,498,560 A | 2/1985 | Purdy | |
| 4,562,903 A * | 1/1986 | Rogier | 188/18 A |
| 4,742,895 A | 5/1988 | Bok | |
| 4,798,269 A | 1/1989 | Lindner et al. | |
| 4,845,468 A * | 7/1989 | Stark | 340/454 |
| 4,890,699 A | 1/1990 | Megginson et al. | |
| 5,046,590 A | 9/1991 | Trema | |
| 5,050,939 A | 9/1991 | Middelhoven et al. | |
| 5,174,420 A | 12/1992 | DeWald et al. | |
| 5,228,543 A | 7/1993 | Heidenreich | |
| 5,253,735 A * | 10/1993 | Larson et al. | 188/1.11 L |
| 5,551,534 A | 9/1996 | Smithberger et al. | |
| 5,601,160 A | 2/1997 | Horsch | |
| 5,685,398 A | 11/1997 | Marshall et al. | |
| 6,019,199 A * | 2/2000 | Heidenreich | 188/73.34 |
| 6,073,731 A | 6/2000 | Ieda | |
| 6,101,921 A | 8/2000 | Granberg et al. | |
| 6,109,166 A | 8/2000 | Granberg | |
| 6,116,383 A | 9/2000 | Bissonnette et al. | |
| 6,142,262 A | 11/2000 | Bissonnette et al. | |
| 6,145,635 A | 11/2000 | White | |
| 6,152,269 A * | 11/2000 | Malvestio | 188/106 P |
| 6,170,616 B1 | 1/2001 | White | |

(Continued)

*Primary Examiner* — Justin Holmes
*Assistant Examiner* — Mark Manley
(74) *Attorney, Agent, or Firm* — Woodling, Krost and Rust

(57) ABSTRACT

A brake mechanism includes a fixed housing in which the brake mechanism substantially resides. A plate closes the fixed housing and includes a cylindrical portion extending partially within the fixed housing. A parking piston and a service piston are employed to act against a brake stack which includes a plurality of stators and rotors interleaved together. A wear adjuster is press-fit onto the cylindrical portion of the plate and engages the service piston during actuation of the service piston and compensates for wear of friction material from the rotors or stators such that the distance between the service piston and the brake stack is substantially the same during the life of the brake mechanism. If neither the service piston nor the parking piston engage the brake stack prohibiting rotation of the input drive, the planetary gear set drives the rotating output drive with respect to the fixed housing.

23 Claims, 35 Drawing Sheets

(56) References Cited

U.S. PATENT DOCUMENTS

| | | |
|---|---|---|
| 6,260,668 B1 | 7/2001 | McClanahan |
| 6,264,009 B1 | 7/2001 | Johnson |
| 6,386,332 B1 | 5/2002 | Daniel |
| 6,481,541 B2 | 11/2002 | Taki et al. |
| 6,481,542 B2 | 11/2002 | Giering et al. |
| 6,508,336 B1 | 1/2003 | El-Kassouf |
| 6,543,596 B2 | 4/2003 | Martin et al. |
| 6,550,588 B2 | 4/2003 | Hinton et al. |
| 6,585,088 B1 | 7/2003 | Fontaine et al. |
| 6,588,551 B1 | 7/2003 | Krammerer et al. |
| 6,766,884 B2 | 7/2004 | Parsons et al. |
| 6,772,863 B2 | 8/2004 | Jessen et al. |
| 6,907,962 B2 | 6/2005 | Forster |
| 6,997,291 B2 | 2/2006 | Boisseau |
| 7,059,453 B2 | 6/2006 | Yamamoto et al. |
| 7,121,389 B2 | 10/2006 | Manrao et al. |
| 7,134,532 B2 | 11/2006 | Baumgartner et al. |
| 7,380,643 B2 | 6/2008 | Grimm et al. |
| 7,424,358 B2 | 9/2008 | Baumgartner |
| 7,493,992 B2 | 2/2009 | Rogers |
| 7,506,730 B2 | 3/2009 | Strandberg et al. |
| 7,686,607 B2 | 3/2010 | Dantlgraber |
| 7,849,976 B2 | 12/2010 | Kawahara et al. |
| 7,861,831 B2 | 1/2011 | Chung |
| 7,866,447 B2 | 1/2011 | Baumgartner et al. |
| 7,900,751 B2 | 3/2011 | Walker et al. |
| 7,900,752 B2 | 3/2011 | Mayberry et al. |
| 7,909,147 B1 | 3/2011 | Schnell |
| 2005/0031460 A1 | 2/2005 | Perry |
| 2005/0166751 A1 | 8/2005 | Mark |
| 2005/0173976 A1 | 8/2005 | Mies |
| 2006/0097565 A1 | 5/2006 | Mies |
| 2006/0201321 A1 | 9/2006 | Loedige et al. |
| 2006/0266419 A1 | 11/2006 | Krug-Kussius |
| 2007/0020354 A1 | 1/2007 | Dantlgraber |
| 2007/0051100 A1 | 3/2007 | Kauss |
| 2008/0050464 A1 | 2/2008 | Dantlgraber |
| 2008/0190103 A1 | 8/2008 | Behm |
| 2008/0250781 A1 | 10/2008 | Mueller et al. |
| 2008/0262688 A1 | 10/2008 | Behm |
| 2008/0295507 A1 | 12/2008 | Mueller et al. |
| 2008/0314664 A1 | 12/2008 | Mueller et al. |
| 2009/0008174 A1 | 1/2009 | Tikkanen et al. |
| 2009/0036248 A1 | 2/2009 | Mueller et al. |
| 2009/0084102 A1 | 4/2009 | Mueller et al. |
| 2010/0269496 A1 | 10/2010 | Mueller et al. |

\* cited by examiner

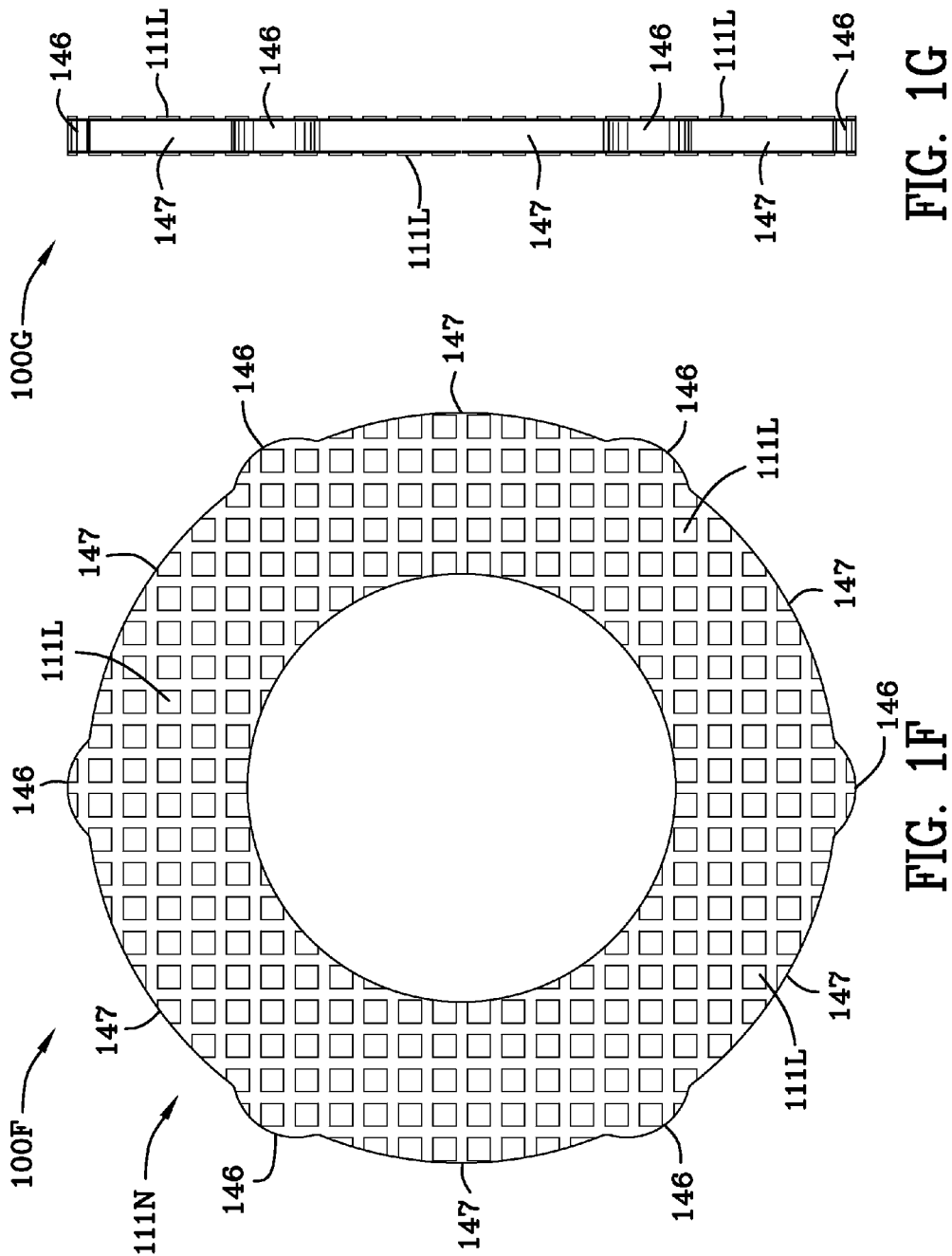

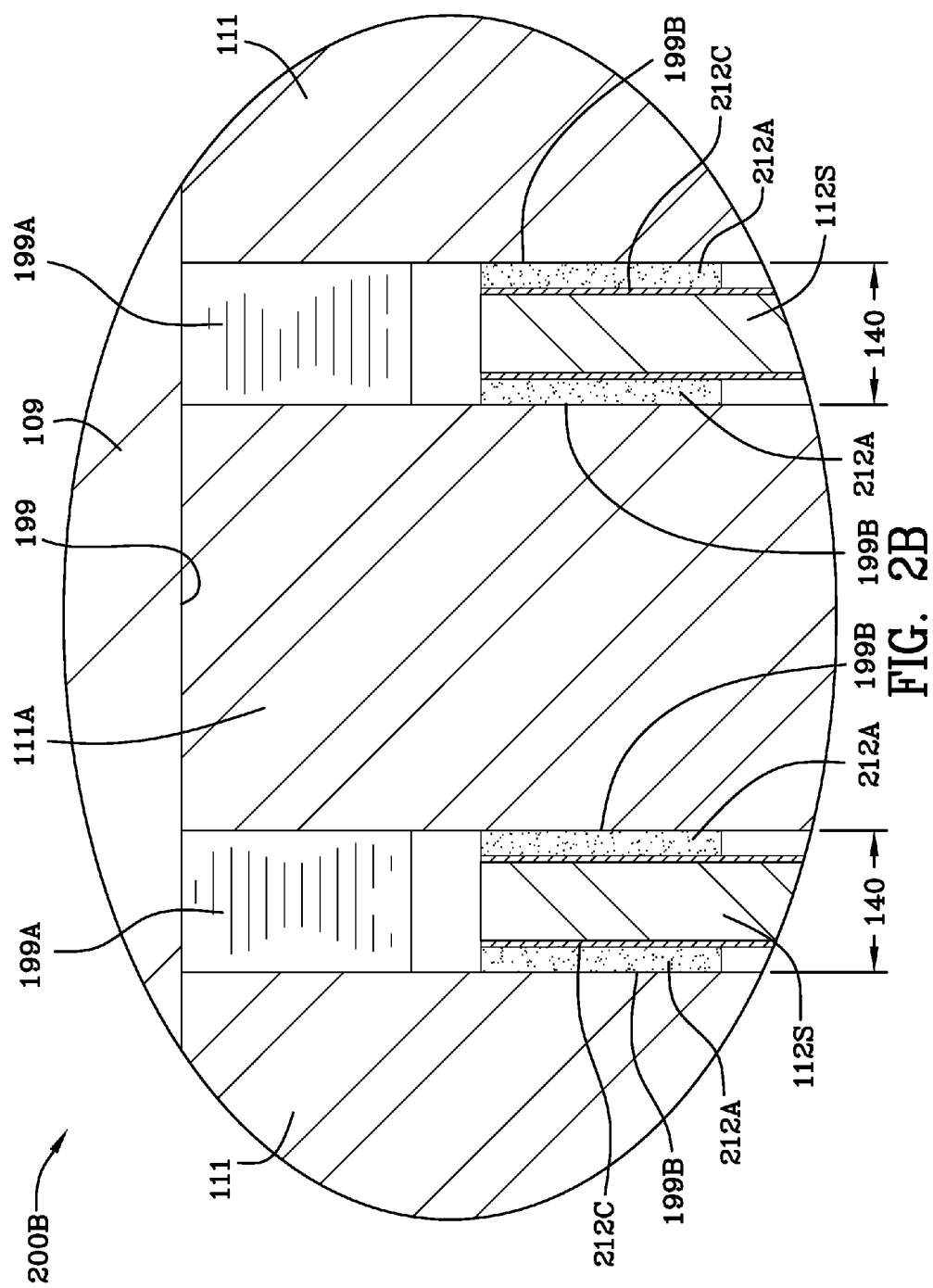

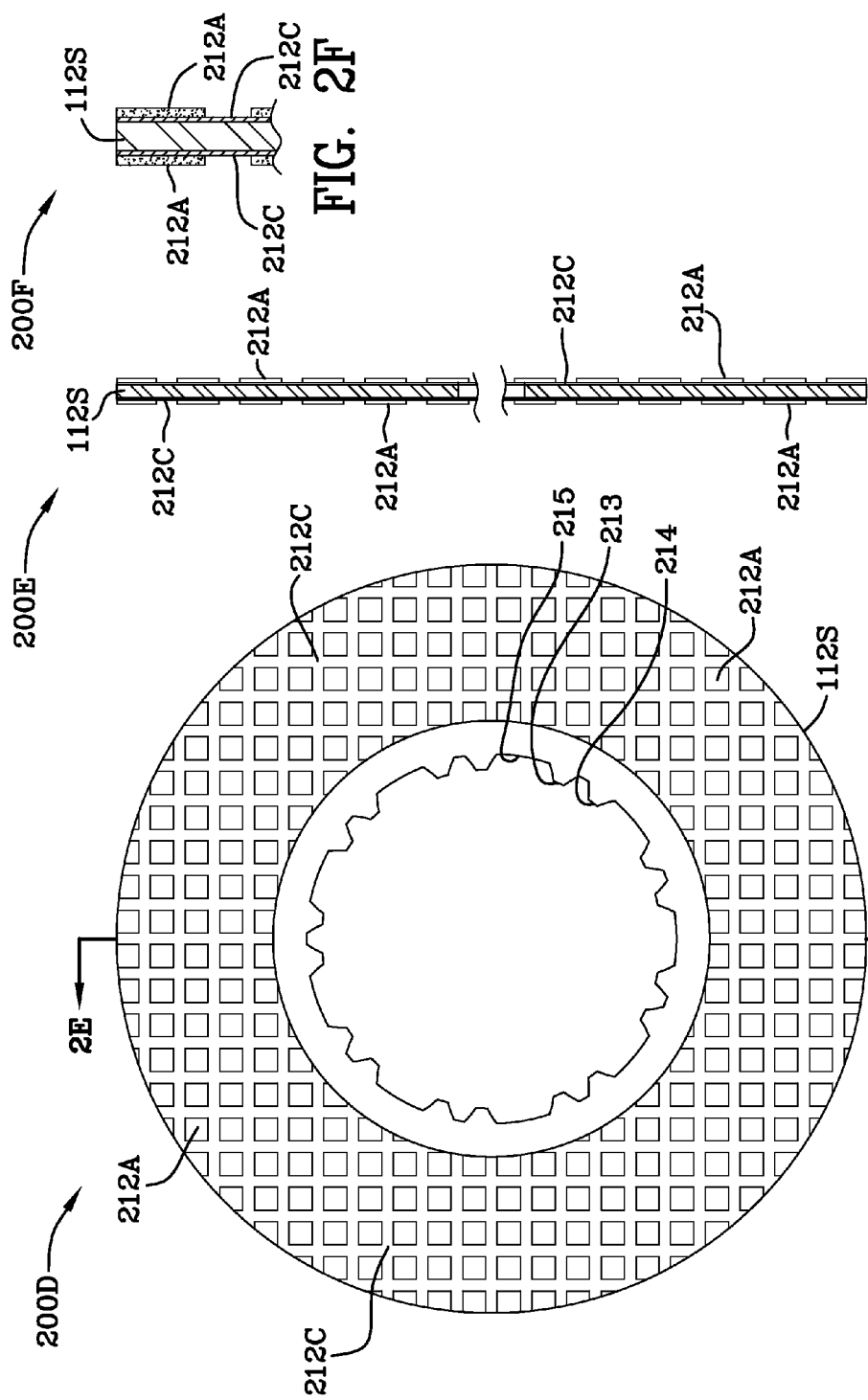

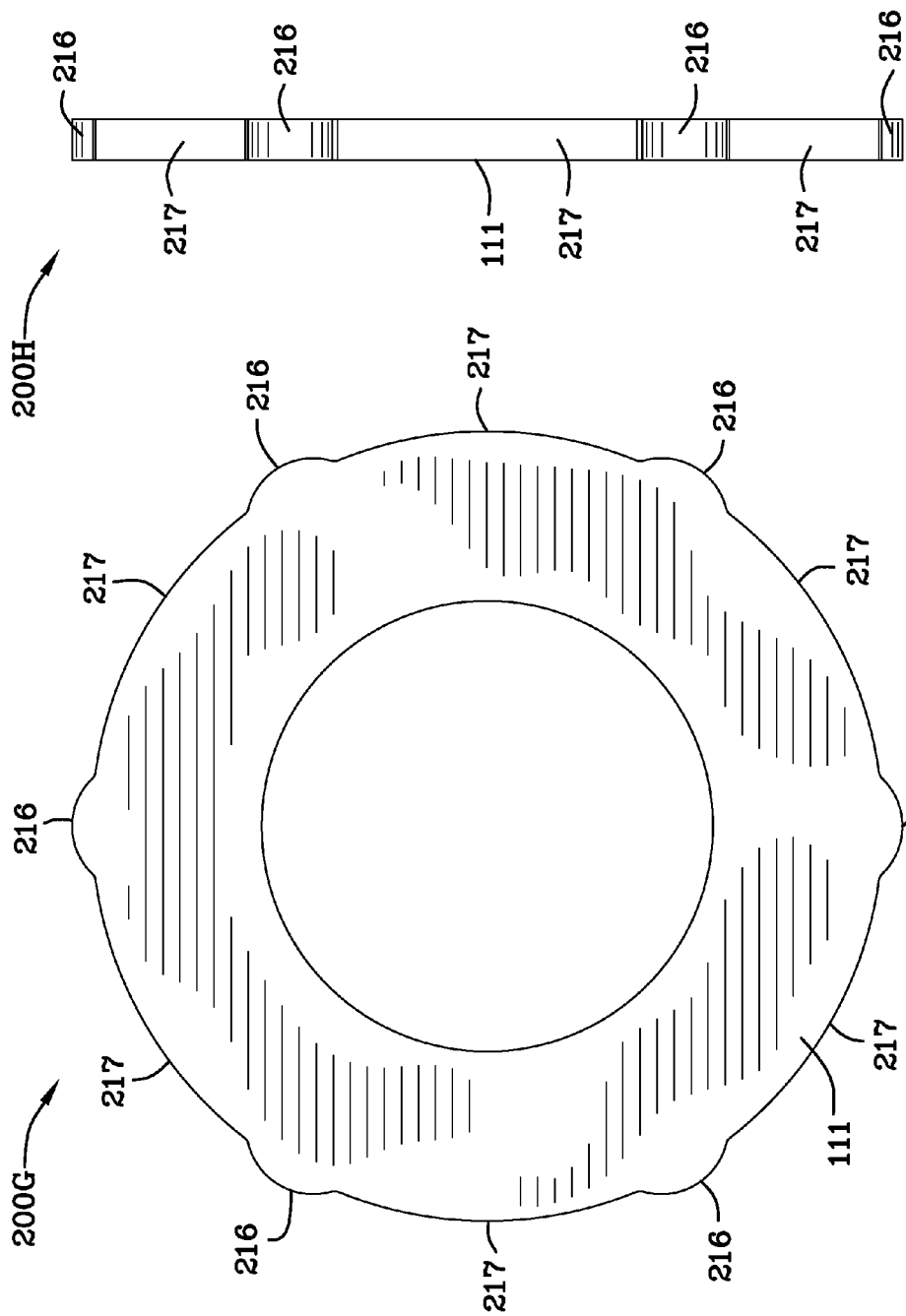

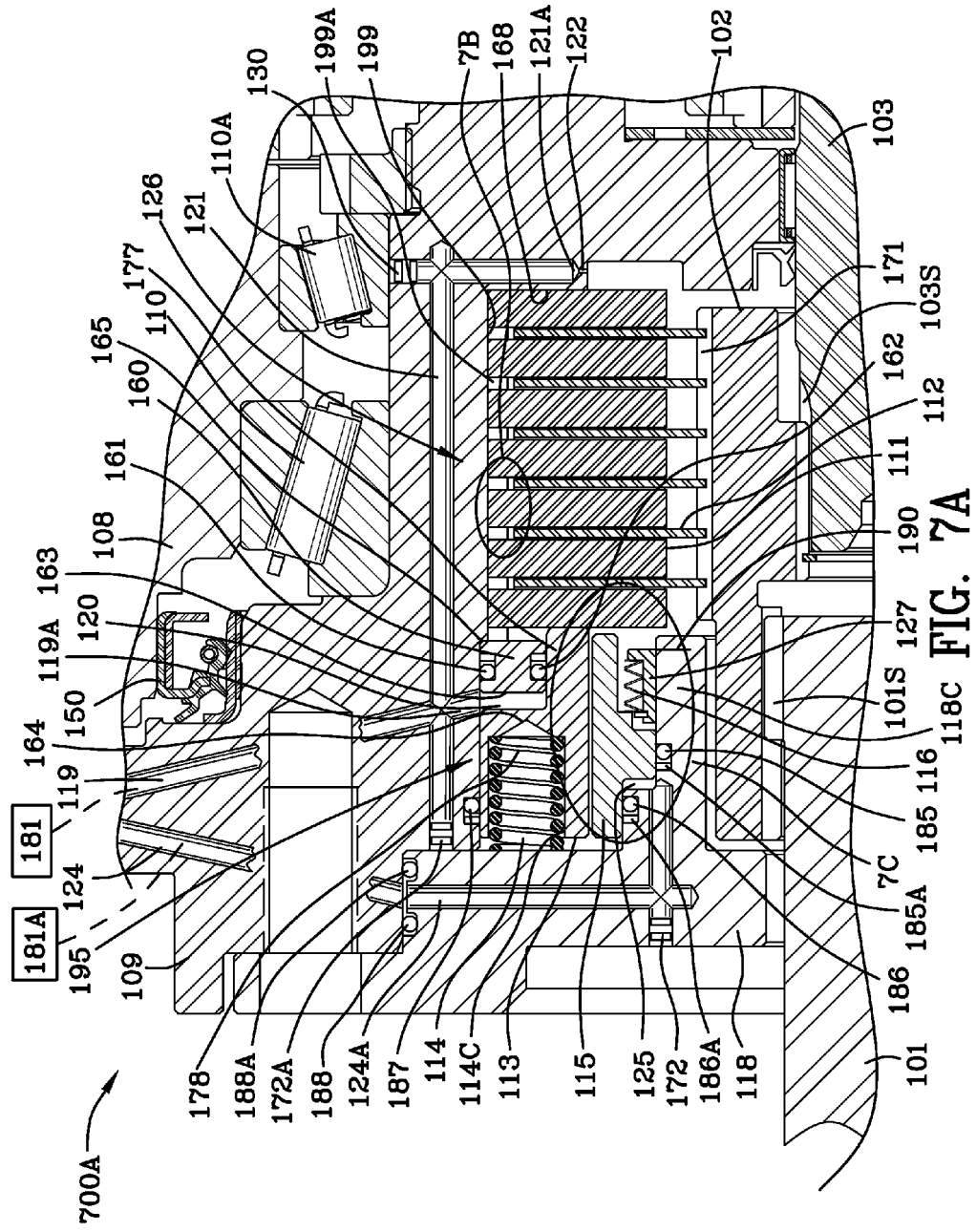

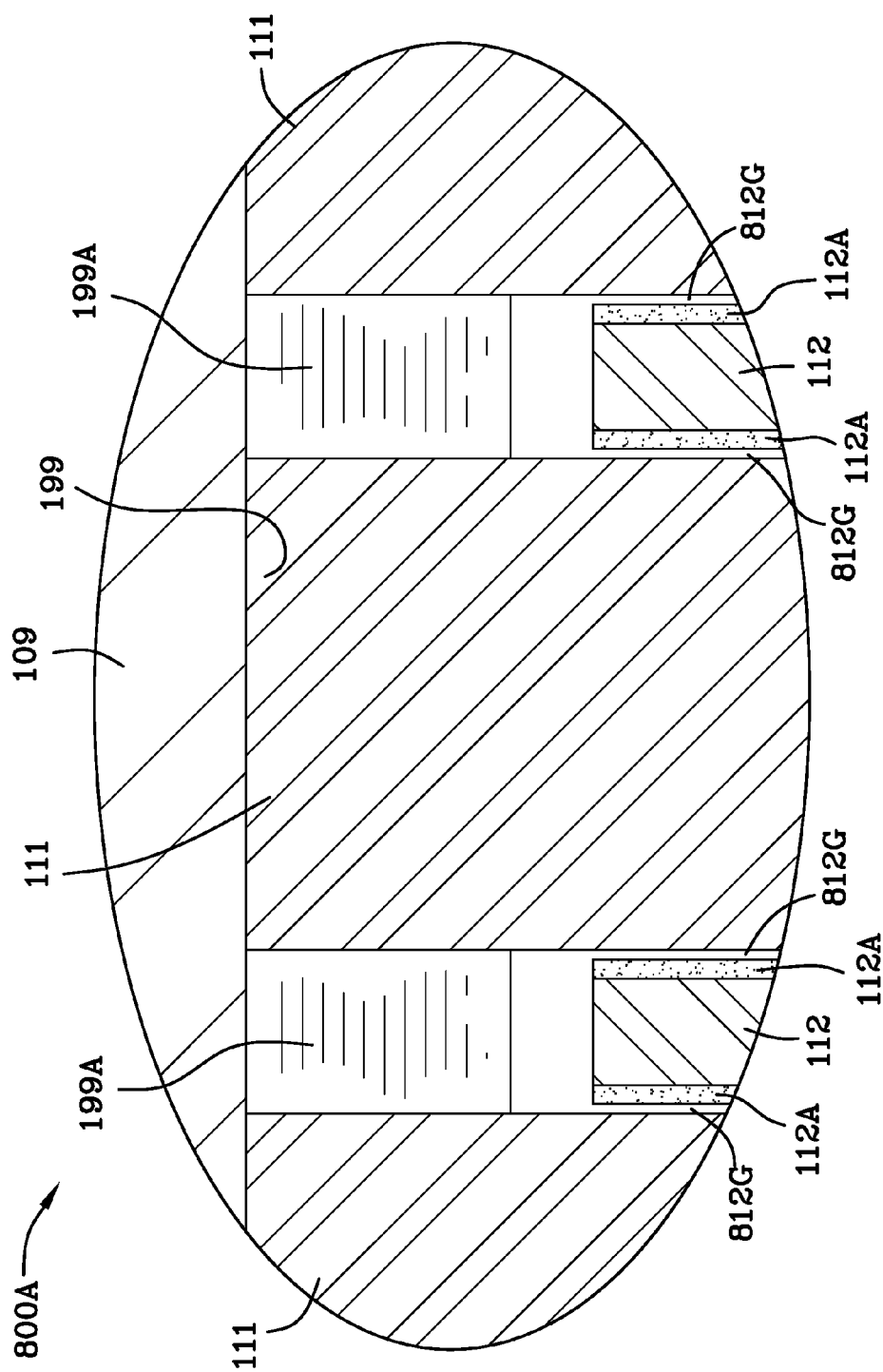

PLANETARY GEARBOX WITH INTEGRAL SERVICE BRAKE

FIELD OF THE INVENTION

The invention is primarily in the field drives for off-highway vehicles/machines driven at relatively high velocity and which require high performance parking/static brakes and dynamic/service brakes.

BACKGROUND OF THE INVENTION

Many off-highway machines are driven by hydraulic motors mounted to planetary wheel drives. Some of these vehicles are capable of speeds of up to 35-40 miles/hour. Due to the large mass of these machines and their relatively high speed, braking is a very important function.

Braking is usually categorized in two ways: service dynamic braking and parking static braking. On many high-speed off-highway machines, the service braking is handled by a combination of back-driving the hydraulic system and actuating a disc-caliper system on the output of the planetary wheel drive. Parking braking is usually done with a multi-disc wet brake at the input of the planetary wheel drive. This brake is usually spring-applied and released with hydraulic charge pressure.

There are a few shortcomings of a disc-caliper service braking system on high-speed off-highway hydraulic machines. Due to the potential large momentum associated with these machines an output disc-caliper service brake needs to be very large which makes it a costly feature. An output disc-caliper service brake is exposed to the environment. The environment for many of these machines can be severe and highly corrosive to a brake disc. For low to moderate braking, the hydrostatic system is used almost exclusively. This prevents corrosion from being "wiped off" frequently by the caliper.

U.S. Pat. No. 7,493,992 to Rogers states in the abstract thereof, as follows: "gearbox having an integral wet brake assembly is provided to replace the prior gearbox assembly of an underground mining machine. The brake housing is configured and contoured to be nestingly received upon the gearbox housing and without intrusion upon the output drive flanges. The brake housing includes concentric parking and service brake pistons adapted to engage and disengage a brake disc stack provided within a cavity machined into an end plate of the gear box assembly. An intermediate shaft of the gearbox is provided with a hub to engage the rotary discs of the brake disc stack. The parking brake is normally engaged by a spring and released by hydraulic pressure, while the service brake is normally released by a spring and engaged by hydraulic pressure."

U.S. Pat. No. 5,601,160 to Horsch states, in the abstract thereof, "a hydraulically actuated brake assembly capable of rendering both a service brake function and a park brake function to a rotatable shaft that passes through a stationary housing. The brake assembly includes a series of wetted rotatable and nonrotatable brake members arranged in a stacked and intermixed relation within the housing and arranged coaxially about the shall. The brake assembly further includes a service brake piston and a park brake piston for individually or conjointly applying a compressive force against the brake members thereby providing a braking action to the shaft and a park brake piston. The pistons are preferably arranged in axial alignment with each other and coaxially about the shaft. The service brake piston responds to fluid pressure being introduced into, a first fluid receiving cavity. The park brake piston is spring applied and is responsive to the fluid pressure introduced into a second fluid receiving cavity. The brake assembly further includes a brake release mechanism for normally urging the service brake piston into a released position wherein the piston is disposed a fixed distance from the brake members. The brake release mechanism is specifically structured and designed to maintain a fixed clearance between the brake piston and the brake members when the brake piston is in its released position and self-compensates for wear on the braking surfaces of the brake members."

SUMMARY OF THE INVENTION

A brake mechanism in combination with a planetary gear set is disclosed which includes a fixed housing having a substantially cylindrical inner portion. The substantially cylindrical inner portion of the fixed housing/spindle includes contours thereon which mate with contours of the stators. The stators may be keyed or splined and mate with corresponding keyed or splined surfaces of the fixed housing. The brake mechanism resides substantially within the substantially cylindrical inner portion of the fixed housing. A plate includes a flange portion and a cylindrical portion extending partially within the substantially cylindrical inner portion of the fixed housing. The flange portion of the plate substantially encloses the substantially cylindrical inner portion of the fixed housing. There is an opening in the plate which allows a motor shaft to penetrate therethrough. The motor shaft is driven by a hydraulic motor or by an electric motor.

The planetary gear set includes an input planetary stage and an output planetary stage. The planetary gear set includes a rotating input drive and a rotating output drive. The planetary gear set further includes a motor shaft, an input shaft, and a coupling affixed to the motor shaft and to the input shall transferring the rotary motion of the motor shaft to the input shaft. The input shaft includes a sun gear for driving the input planetary stage. The ring gear and a hub are affixed together and the input sun gear drives input planet gears which interengage with said ring gear. An input planet carrier engages and drives and an output sun gear which, in turn, drives output planet gears. Output planet gears are mounted on the fixed housing and are rotatable with respect to the fixed housing. Output planet gears are interengaged with the ring gear and drive the ring gear and the hub with respect to said housing. Bearings are interposed between the hub and the fixed housing enabling the hub to rotate with respect to the fixed housing.

The brake mechanism includes a service piston and a brake stack. The brake stack includes a plurality of stators and a plurality of rotors and the plurality of rotors are interleaved with the stators such that each of the plurality of rotors resides interleaved between a pair of proximate stators. The rotors are affixed to the coupling and rotate therewith. Each of the rotors includes friction material affixed thereto. The stators are affixed to the fixed housing. The rotating input drive imparts rotating input motion to the planetary gear set driving the rotating output drive of the planetary gear set. The output drive of the planetary gear set is rotatable with respect to the fixed housing.

The service piston includes a brake stack engagement portion, a piston portion, a first shoulder portion, a second shoulder portion and a piston cavity. The piston cavity of the service piston is formed by the piston portion of the service piston and the cylindrical portion of the plate. The service piston is movable between a home position and another position. After each actuation of the service piston the home position and the another position change. The service piston is in the home position when the service piston is not actuated, and, the plurality of rotors and the plurality of stators are not engaged with each other. Before the first actuation, the wear adjuster is placed on the cylindrical portion of the plate to a specified position, which then determines the initial home position, $I_0$. The placement of the wear adjuster is such that one end of the wear adjuster is placed at a line scribed or marked on the cylindrical portion of the plate.

The another position of the service piston is determined according to the wear of the brake stack. Before the first actuation occurs, the another position is in the initial another position and it is determined by the thickness of the brake stack. After the first actuation of the service piston, the engagement portion of the service piston engages the brake stack forcing the plurality of rotors and the plurality of stators into engagement with each other and creating some wear of the friction material in the brake stack. The engagement portion of the service piston is initially spaced apart from the brake stack by a distance, G. The distance, G, is defined as the distance between the end of the engagement portion of the service piston in its initial home position and the end of the engagement portion of the service piston in the initial another position (determined by the brake stack thickness in the engaged state), initially, the brake stack has no wear and the initial position of the brake stack (i.e., the initial another position of the service piston) is determined by the initial thickness of all the rotors and stators with respect to a wall of the substantially cylindrical inner portion of housing. The initial home position of the service piston, for example, may also be referenced from the wall of the substantially cylindrical inner portion of housing.

A generally cylindrically shaped shape wear adjuster includes a groove and a snap ring. The snap ring resides in the groove. The wear adjuster further includes a wall and a spring. The spring resides between the wall of the adjuster and the snap ring.

The generally cylindrically shaped wear adjuster is press fit on the cylindrical portion of the plate. The press-fit of the wear adjuster permits the wear adjuster to move on the cylindrical portion of the plate in engagement with, and under the force of, the piston portion of the service piston.

During actuation and movement of the service piston to the another position: the first shoulder of the service piston engages the wear adjuster repositioning the wear adjuster position to accommodate for loss of friction material; the second shoulder of the service piston engages the spring compressing the spring between the shoulder of the service piston and the wall of the wear adjuster; and, the engagement portion of the service piston forcefully engages the brake stack wherein the plurality of stators and the plurality of rotors engage each other prohibiting rotation of the input drive with respect to the fixed housing.

Actuation and movement are caused by pressure applied to the service piston pressure cavity. Pressurized fluid is used to actuate the service piston.

Upon discontinuation of the service piston actuation, the follow results occur: the spring urges the second shoulder of the service piston in a direction opposite the wall of the wear adjuster and repositions the service piston to a second position due to a loss of friction material; the first shoulder of the service piston disengages the wear adjuster and the service piston is repositioned to the second position; and, the engagement portion of the service piston is returned to the second position and is spaced a distance, G, from the brake stack when it is next engaged.

Discontinuation of the service piston actuation is the substantial removal of pressure from the service piston pressure cavity. Once the service position has been repositioned to a second position, it is then ready for the next actuation. After the next actuation, the service piston will be repositioned to a third position. The sequence of movement of the service piston is from the initial home position, to the second position, to the third position etc. compensating for the wear of friction material while keeping the gap, G, constant, as the friction material of the brake stack is depleted after each actuation.

A method for operating a brake mechanism in combination with a planetary gear set is also disclosed and claimed. The method includes arranging a brake stack within the housing. The brake stack includes a plurality of stators and a plurality of rotors. The method further includes affixing the rotors to a coupling such that the rotors rotate with the coupling. Further, the method includes affixing the stators to a fixed housing. Still further, the method includes interleaving a plurality of rotors with the stators such that each of the plurality of rotors resides interleaved between a pair of proximate stators.

The step of press-fitting a wear adjuster on a cylindrical member to a pre-set location on the cylindrical member is included in the method. The wear adjuster includes a groove and a snap ring. The snap ring resides in the groove. The wear adjuster further includes a wall and a spring. The spring resides between the wall of the adjuster and the snap ring. The wear adjuster is generally cylindrically shaped. The press-fit of the wear adjuster is light so as to permit the wear adjuster to move on the cylindrical member in engagement with, and under the force of, the service piston.

The method further includes positioning a generally cylindrically shaped service piston concentrically around the cylindrical member to an initial home position, $I_0$, and abutting the service piston into engagement with the spring of the wear adjuster. The method further includes determining the thickness of the brake stack when the rotors and stators are engaged and defining this position of the service piston, that is, the initial position of engagement of the service piston with the brake stack based on its initial thickness without any wear as being $A_0$. The positions $I_0$ and $A_0$ are known and determined before any operation of the device. $A_0$ is the position the service position would be in if it were to engage a new brake stack without any wear and with the components (rotor and stator) of the brake stack engaged. $A_0$ is a position as is $I_0$ which can be defined relative to a wall of the inner cylindrical brake cavity, and these positions are set and determined initially by the dimensions of the device and its construction. Gap, G, is set as the desired distance between the locations $A_0$ and $I_0$, with $I_0$, being the initial home position of the service piston without any actuation having taken place and $A_0$ being the initial another position, that is, based on the dimension of a new brake stack and the position the service piston would be in if it were actuated for the first time as it just begins to engage the brake stack. Put another way, $A_0$ and $I_0$ can both be measured from the wall of the substantially cylindrical inner portion of the housing and the gap, G, is simply $I_0$ minus $A_0$. Gap, G, controls the speed of response of the service brake piston. Initial home position of the service piston, $I_0$, is dependent on placement of the wear adjuster on the cylindrical portion of the plate at a location marked on the plate. Initial another position, $A_0$, is dependent on the dimensions of the brake stack.

Further, the step of rotating an input drive imparting rotating input motion to the planetary gear set driving the rotating output drive of the planetary gear set is included in the method. The output drive of the planetary gear set is rotatable with respect to the fixed housing.

The method further includes moving the service piston between its initial position, to, to another position, $A_N$, with N being a positive integer equal to the number of service piston actuations and with N=1 for the first service piston actuation. The position $A_N$ is defined at the end of the Nth braking cycle with the service piston forcing the plurality of rotors and the plurality of stators into engagement with each other creating some wear. For each actuation there will be some wear and it will be practically immeasurable. The method further includes determining the another position $A_N$ (the location of the brake stack) according to the accumulated wear of the brake stack. Still further, the method includes a step for maintenance of the gap, G, for repeated actuations of the service brake piston.

The step of actuating and moving the service piston to the another position $A_N$ results in: the first shoulder of the service piston engaging the wear adjuster repositioning the wear adjuster; the second shoulder of the service piston engaging the spring compressing the spring between the service piston and the wall of the wear adjuster; and, the service piston forcefully engaging the brake stack wherein the plurality of stators and the plurality of rotors engage each other causing brake stock wear (rotor wear) and prohibiting rotation of the coupling with respect to the fixed housing.

A step of discontinuing actuation of the service piston results in: the spring urging the second shoulder of the service piston in a direction opposite the wall of the wear adjuster, the first shoulder of the service piston disengaging the wear adjuster, and, the service piston being repositioned to a position, $I_N$, and spaced a distance, G, from the brake stack when it is next engaged by the service position.

Therefore the positions of the service piston and brake stack are grouped in pairs, $(I_0, A_0)$; $(I_1, A_1)$; $(I_2, A_2)$; $(I_3, A_3)$; etc.

The method also includes a step of determining the wear of the brake stack by determining the change of position of the service piston from one actuation to the next. The magnitude of wear of the brake stack from one actuation to the next is equal to $I_N$ minus or the magnitude of wear of the brake stack from one actuation to the next is equal to $A_N$ minus $A_{N-1}$.

One aspect of the invention internalizes the service braking and combines it with the parking brake on the input of the gearbox. This reduces cost as well and protects the brake from the environment. To do this, heat must be absorbed and removed when the brake is engaged.

One example of the service piston is illustrated in the context of a two stage planetary gearbox with a ring gear output. The gearbox operates by taking a rotational input from the motor shaft which is coupled to a coupling which in turn is coupled to the input shaft of the gearbox. The input shaft includes a sun gear and motion of the sun gear is transmitted through an input planetary stage and an output planetary stage. These planetary stages transmit motion to the ring gear which is rigidly connected to the hub. The vehicle's wheel is attached to the hub. When transmitting rotational speed through planetary stages, the motor shaft speed is reduced and the motor shaft torque is increased by the same ratio.

The service piston is housed in the spindle/fixed housing which is connected to the frame of the vehicle. Main wheel bearings are mounted on the outer part of the spindle/fixed housing and these bearings support the hub. Since the vehicle's wheel is rigidly attached to the hub, the main wheel bearings support any loading imparted by the vehicle's wheel to the gearbox.

The brake mechanism includes a plurality of stators, a plurality of rotors, a parking piston, a plurality of parking piston springs, a service piston, a wear adjuster which includes a return spring which repositions the service piston after engagement with the brake stack, and a motor mounting plate. The motor mounting plate substantially closes off the substantially cylindrical inner portion of the fixed housing. The motor mounting plate is sometimes just referred to herein as the plate. The plate includes a flange portion and a cylindrical portion extending partially within the substantially cylindrical inner portion of the fixed housing.

The brake mechanism also includes a parking piston. There are a plurality of springs which apply force to the parking piston which in turn applies a force to the brake stack comprising alternating rotors and stators. The stators are coupled to the spindle/housing and the rotors are coupled to the coupling. Friction material can be on either the rotor or stator and the friction material is specially designed to prevent relative motion between the rotor and stator surfaces when a force is applied to the brake stack. By preventing motion between the rotors and stators, the coupling is locked to the spindle/housing which prevents any motion from taking place in the planetary wheel drive.

To release the parking piston, hydraulic charge pressure, usually 300-500 psi, is applied to the parking brake release port. This pressurizes the parking piston cavity and imparts a force on the parking piston that compresses the springs and allows the rotors and stators to separate. This allows the coupling to rotate and impart motion through the system.

Usually brakes get very hot even when there is no braking taking place. Parasitic heat is generated when from oil shear between relatively small gaps between the rotors and stators. The brake used in the invention is physically large and will generate considerable parasitic heat.

To combat the generation of heat, a hydraulic system removes heat from the brake mechanism. A cooling passageway branches off from the passageway which supplies the parking brake piston cavity. Fluid through the passageway leading to the brake mechanism goes through an orifice which drops the pressure from 300-500 psi down to 30-50 psi. The fluid moves axially through the brake cavity and is removed from the brake housing through a passage. While traveling through the brake, the motion from the rotors moves the oil around in the brake allowing it to absorb heat from the brake components. A suction or vacuum pump is in communication with the drain port passageway to evacuate hydraulic oil from the substantially cylindrical inner portion of the fixed housing. The oil is then routed through the hydrostatic system which contains a large oil cooler where heat is rejected to atmosphere.

When service braking is required, the machine operator presses down on the brake pedal which is interlocked to the hydrostatic system which creates a negative torque at the motor shaft to begin slowing down the vehicle. In addition, pressure is delivered to the service brake piston cavity. The pressure will depend on how far the brake pedal is pushed down by the operator's foot. Due to the pressure, the service piston moves and imparts a force on the brake stack to prohibit the rotation of the coupling.

While braking, heat is developed due to relative motion and frictional force between the rotors and stators. Most of this heat is removed by extracting oil from the substantial cylindrical inner portion of the fixed housing. The remainder of the heat is absorbed by the brake components. Brake rotors and stators are very thick and capable of absorbing heat so that the temperature in the brake cavity does not reach a destructive level. A continuous flow of hydraulic oil cools the stators and the rotors so that stators and the rotors are ready for the next braking cycle.

When the brake cycle is complete, and the operator removes his or her foot from the brake pedal, the pressure is removed from the service brake cavity and the return spring repositions the service piston allowing the rotors and stators to regain their approximate original clearances prior to the brake cycle.

Each time the service piston is applied, the friction surfaces wear and the brake stack thickness will change. For a single brake cycle the change of the brake stack thickness is not very large and will most likely be imperceptible. A wear adjuster is lightly press-fit to the cylindrical portion of the motor mounting plate. When the service piston is applied on a worn brake stack, the service piston adjusts the position of the wear adjuster to a new position and simultaneously imparts a force on the brake stack. The wear adjuster includes a return spring, which may be a wave spring, and when the brake cycle is complete the return spring repositions the service piston and ensures that the clearance between the brake stack and service piston is always the same no matter how much wear takes place on the friction surfaces of the rotors and stators.

Alternatively, another process may be used where the wear adjuster may be pushed down into engagement with the service piston until the piston cannot travel further and then the first actuation is used to set the gap.

BRIEF DESCRIPTION OF THE DRAWINGS

FIG. 1F is a side view of another example of a stator with friction material residing on the stators.

FIG. 1G is a front view of the stator with friction material applied thereto in the shape of squares or partial squares.

FIG. 2B is an enlargement of a portion of FIG. 2A illustrating a portion of the brake stack with the stators and rotors illustrated engaging each other.

FIG. 2D is a side view of a second example of a rotor with friction material applied thereto in the shape of squares or partial squares.

FIG. 2E is a cross-sectional view of the rotor taken along the lines 2E-2E illustrated in FIG. 2D.

FIG. 2F is an enlargement of a portion of FIG. 2E illustrating frictional material applied to the rotor.

FIG. 2G is a side view of a stator.

FIG. 2H is a front view of the stator illustrated in FIG. 2G.

FIG. 7A is an enlargement of a portion of FIG. 7.

FIG. 8A is an enlargement of a portion of FIG. 8.

A better understanding of the invention will be had when reference is made to the description of the invention and claims set forth below.

DESCRIPTION OF THE INVENTION

Figure 1:
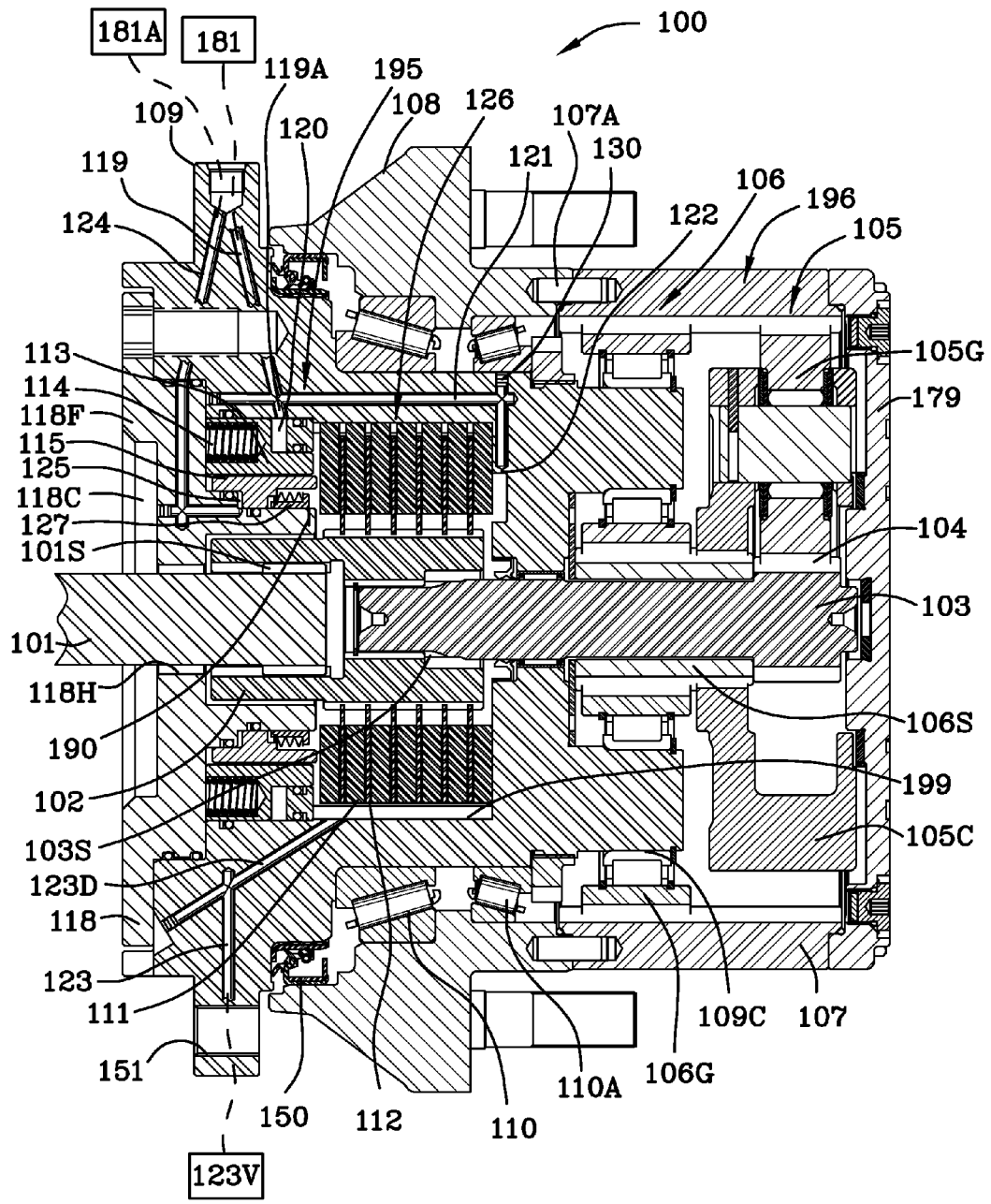
FIG. 1 is a cross-sectional schematic view illustrating the hub, spindle, fixed housing, motor mounting plate, wear adjuster, parking piston, service piston and brake stack with the parking piston and the service piston not actuated, and with the brake stack rotors and stators illustrated engaging each other, and with no wear on the friction material of the rotors.
Figure 2:
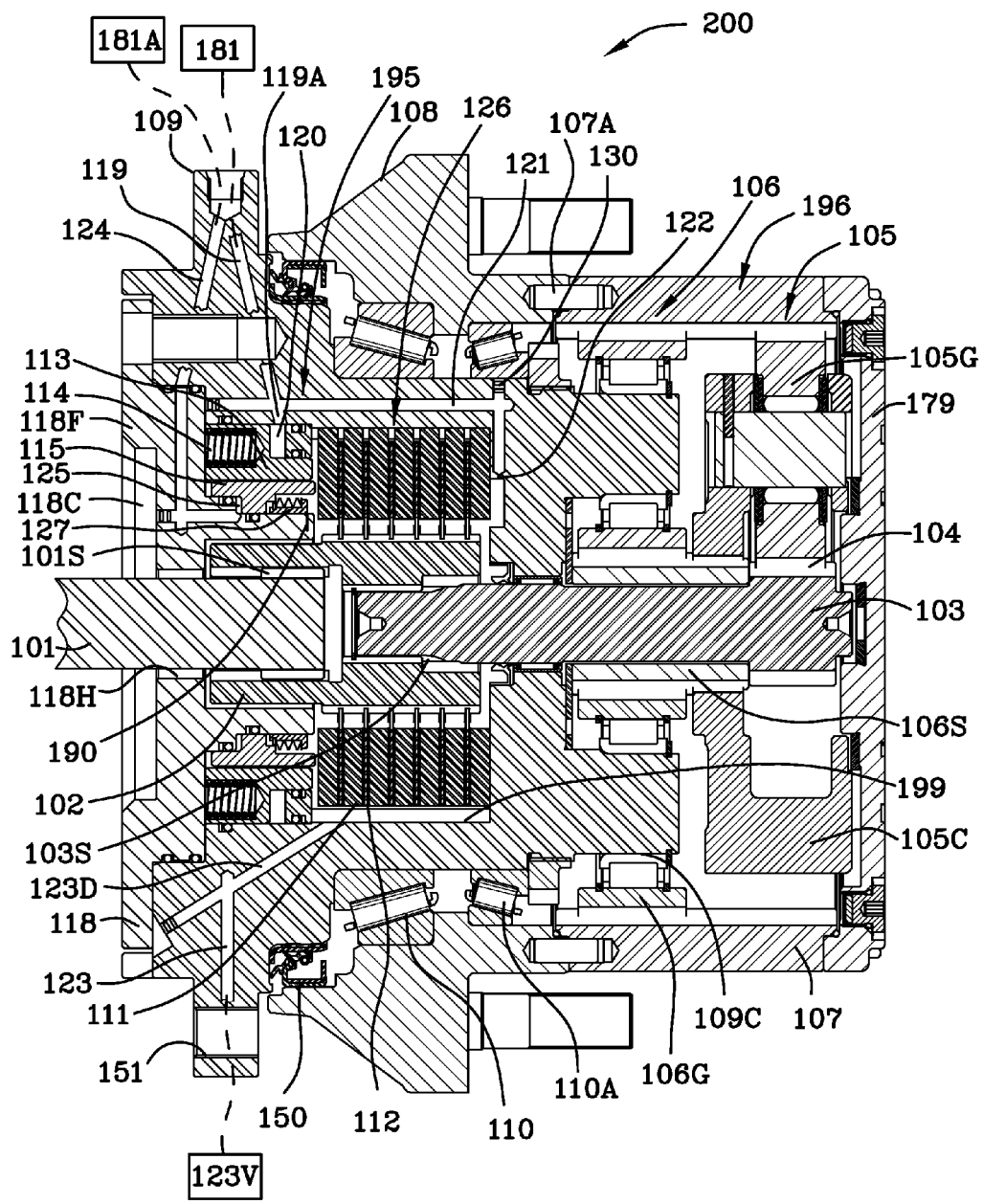
FIG. 2 is a cross-sectional schematic view illustrating the hub, spindle, fixed housing, motor mounting plate, wear adjuster, parking piston, service piston and brake stack with the parking piston and the service piston not actuated, and with a second example of brake stack rotors, and with the brake stack rotors and stators engaging each other.
Figure 3:
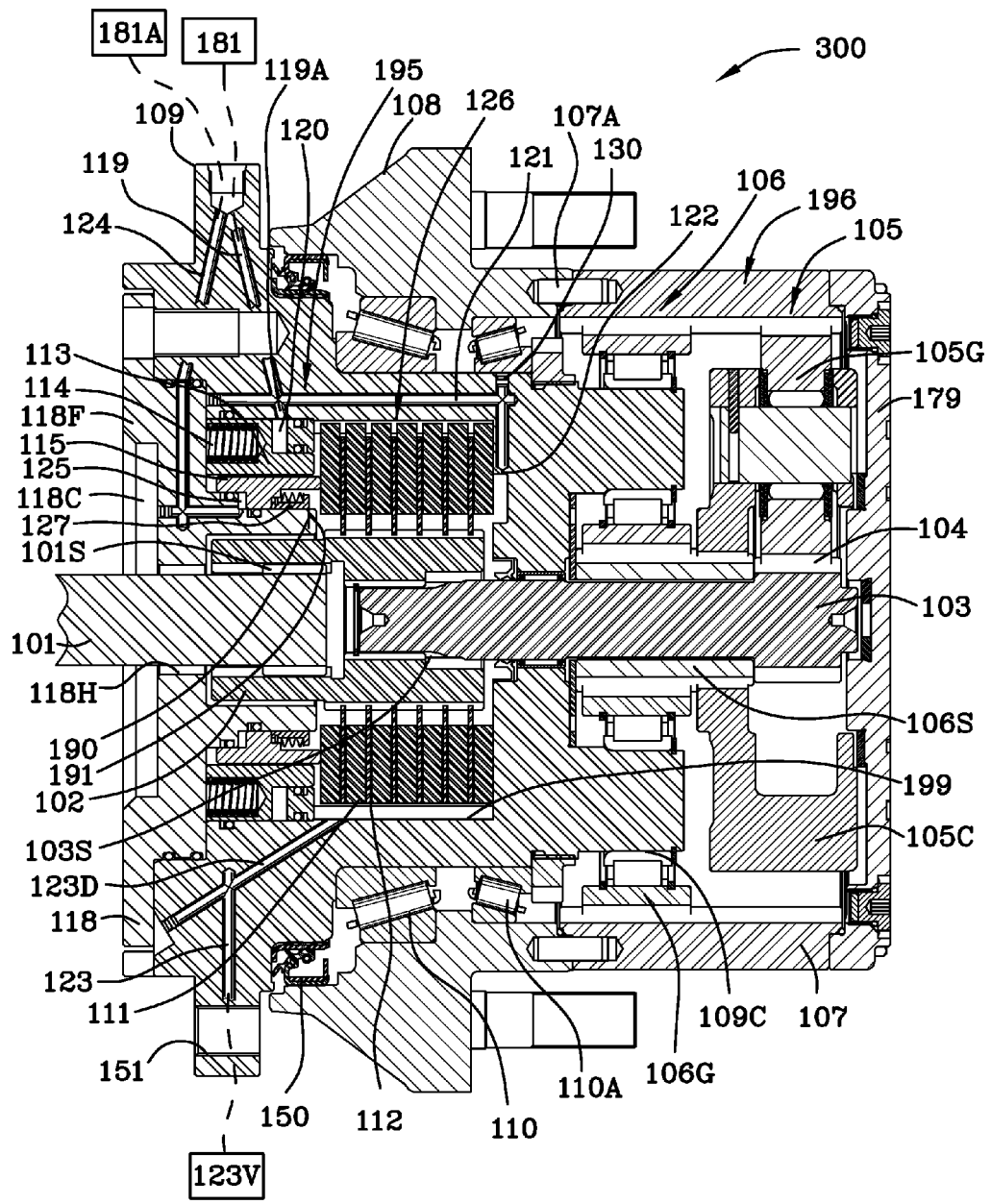
FIG. 3 is a cross-sectional schematic view illustrating the hub, spindle, fixed housing, motor mounting plate, wear adjuster, parking piston, service piston and brake stack with the parking piston not actuated and with the service piston actuated, and with some wear of the friction material on the rotors, and with the brake stack rotors and stators engaging each other.
Figure 4:
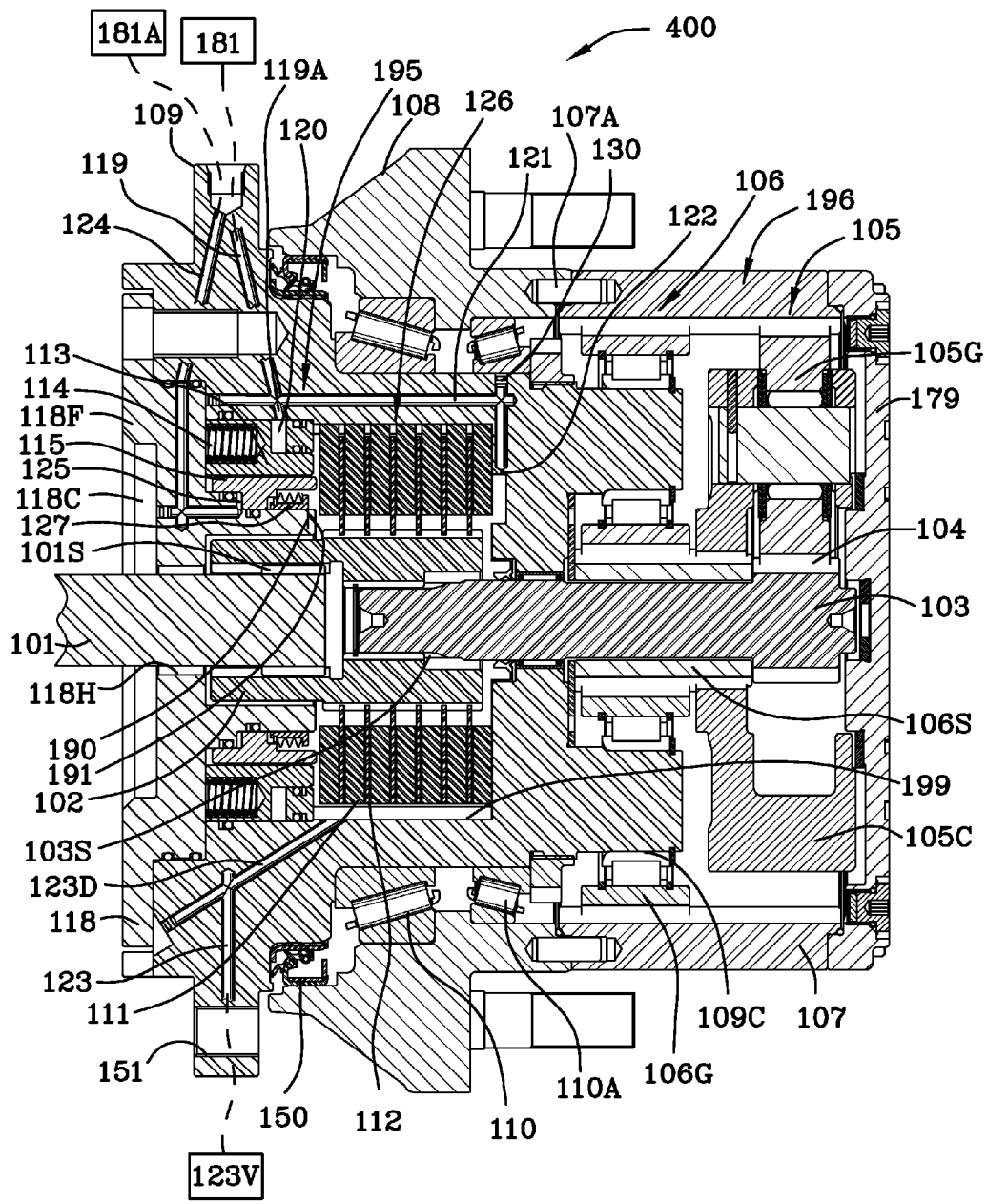
FIG. 4 is a cross-sectional schematic view illustrating the nub, spindle, fixed housing, motor mounting plate, wear adjuster, parking piston, service piston and brake stack with the parking piston and service piston not actuated, and with some wear of friction material on the rotors, with the brake stack rotors and stators engaging each other, and further illustrating the spring return of the service piston in its not actuated or un-actuated position, the service piston having been returned by the spring of the wear adjuster.
Figure 6:
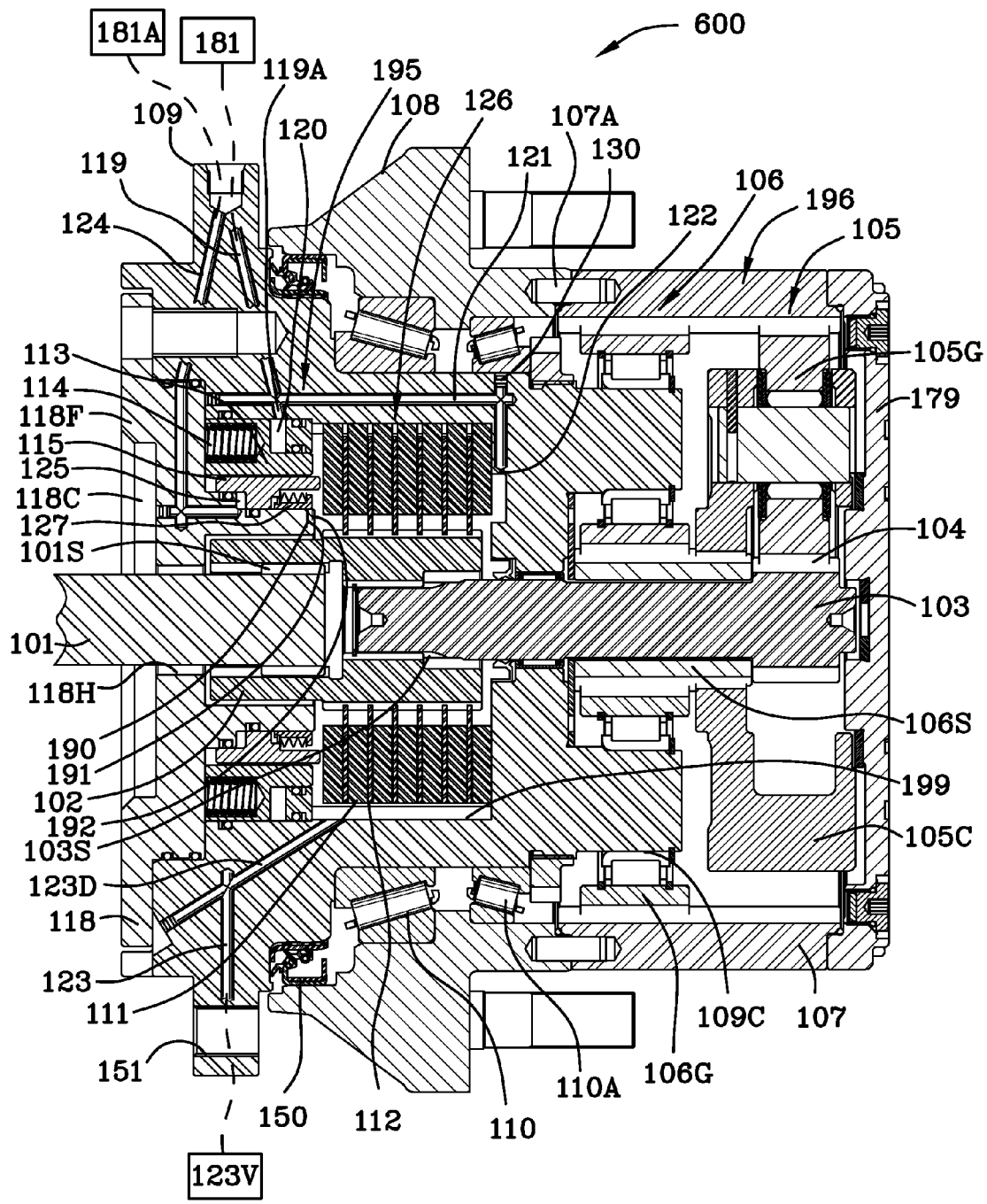
FIG. 6 is a cross-sectional schematic view illustrating the nub, spindle, fixed housing, motor mounting plate, wear adjuster, parking piston, service piston and brake stack with the parking piston and service piston not actuated, and with substantial wear of the frictional material of the rotors, and with the brake stack rotors and stators engaging each other, and further illustrating the spring return of the service piston in its not actuated or un-actuated position, the service piston having been returned by the spring of the wear adjuster.

FIG. 1 is a cross-sectional schematic view 100 illustrating the hub 108, spindle/fixed housing 109, motor mounting plate 118, wear adjuster 127, parking piston 113, service piston 115 and brake stack 126 with the parking piston 113 and the service piston 115 not actuated, and with the brake stack rotors 112 and stators 111 illustrated engaging each other, and with no wear on the friction material of the rotors. The condition of FIG. 1 will not exist in operation of the brake mechanism 195 in combination with the planetary gear set 196 as FIG. 1 depicts the structure wherein the brake stack 126 is shown with a plurality of stators 111 and rotors 112 in engagement with each other. This condition of the brake stack does not occur in ordinary operation of the device without a force from the parking piston or service piston applied to clamp the stators and rotors together. Similarly, the condition of FIGS. 2, 4, and 6 will not exist in operation of the brake mechanism 195 in combination with the planetary gear set 196 as illustrated in FIGS. 2, 4, and 6, because the condition of the brake stack (stators and rotors engaged together) does not occur in ordinary operation of the device without a force being applied to clamp the stators and rotors together. FIG. 3 illustrates the service piston 115 engaging the brake stack and pinning the stators and rotors against the wall 168 of the inner cylindrical portion 199 of the fixed housing 109. FIGS. 2, 4, and 6 are similar to FIG. 1 which depicts the structure wherein the brake stack 126 is shown with a plurality of stators 111 and rotors 112 in engagement with each other. FIGS. 1, 2 4, and 6 depict the brake stack 126 as if it were clamped together with the stators 111 and rotors 112 in engagement with each other. No such clamp is depicted in FIGS. 1, 2, 4 and 6. Referring to FIG. 1, reference numerals 130, 172, 172A indicate plugs inserted in machine inlets for manufacturing the passageways described below.

Figure 1A:
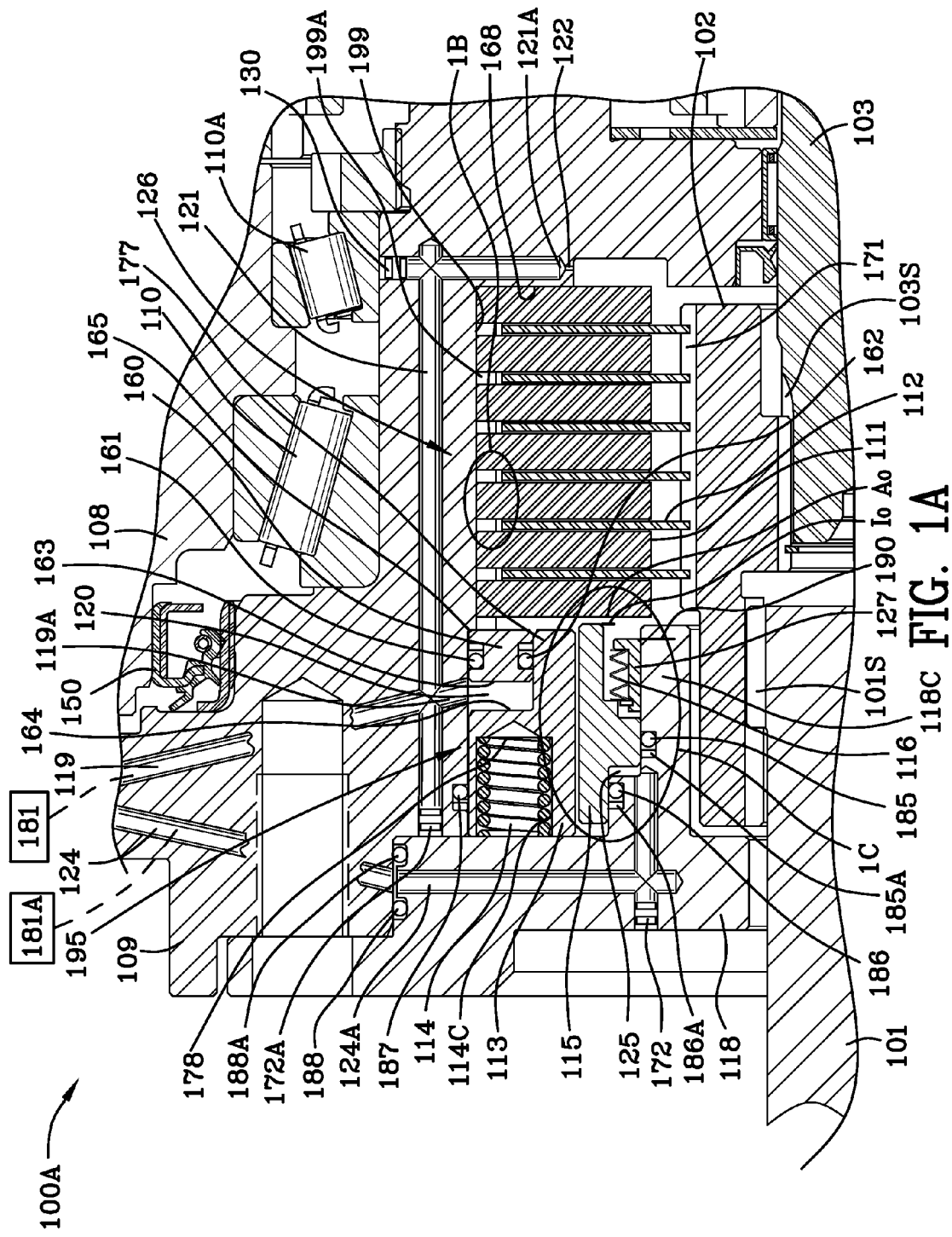
FIG. 1A is an enlargement of a portion of FIG. 1.
Figure 1B:
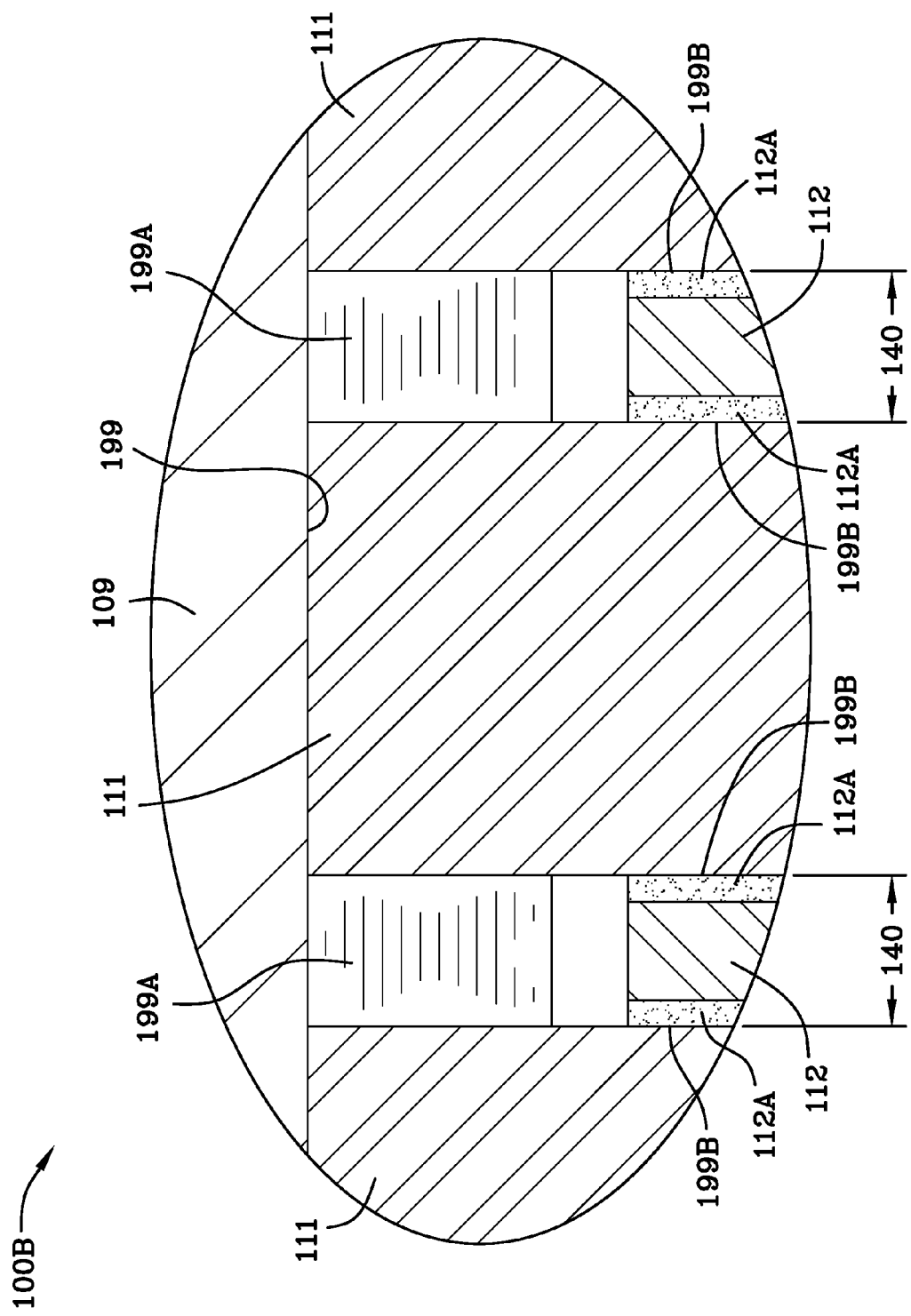
FIG. 1B is an enlargement of a portion of FIG. 1A illustrating a portion of the brake stack with the stators and the rotors engaging each other and with friction material residing on the rotors.

FIG. 1 illustrates a brake mechanism 195 in combination with a planetary gear set 196 which includes a fixed housing 109 which has a substantially cylindrical inner portion 199. FIG. 1A is an enlargement of a portion 100A of FIG. 1 illustrating the stators 111, rotors 112, the fixed housing 109. The substantially cylindrical inner portion 199 of the fixed housing 109 is illustrated in FIG. 1B as is contour 199A which guides and locks the stators 111 to fixed housing 109. In the condition illustrated in FIG. 1B, the stators 111 and rotors 112 are illustrated in engagement with each other. Further, reference numeral 199B is used to denote the engagement of the stators 111 and rotors 112.

Figure 8:
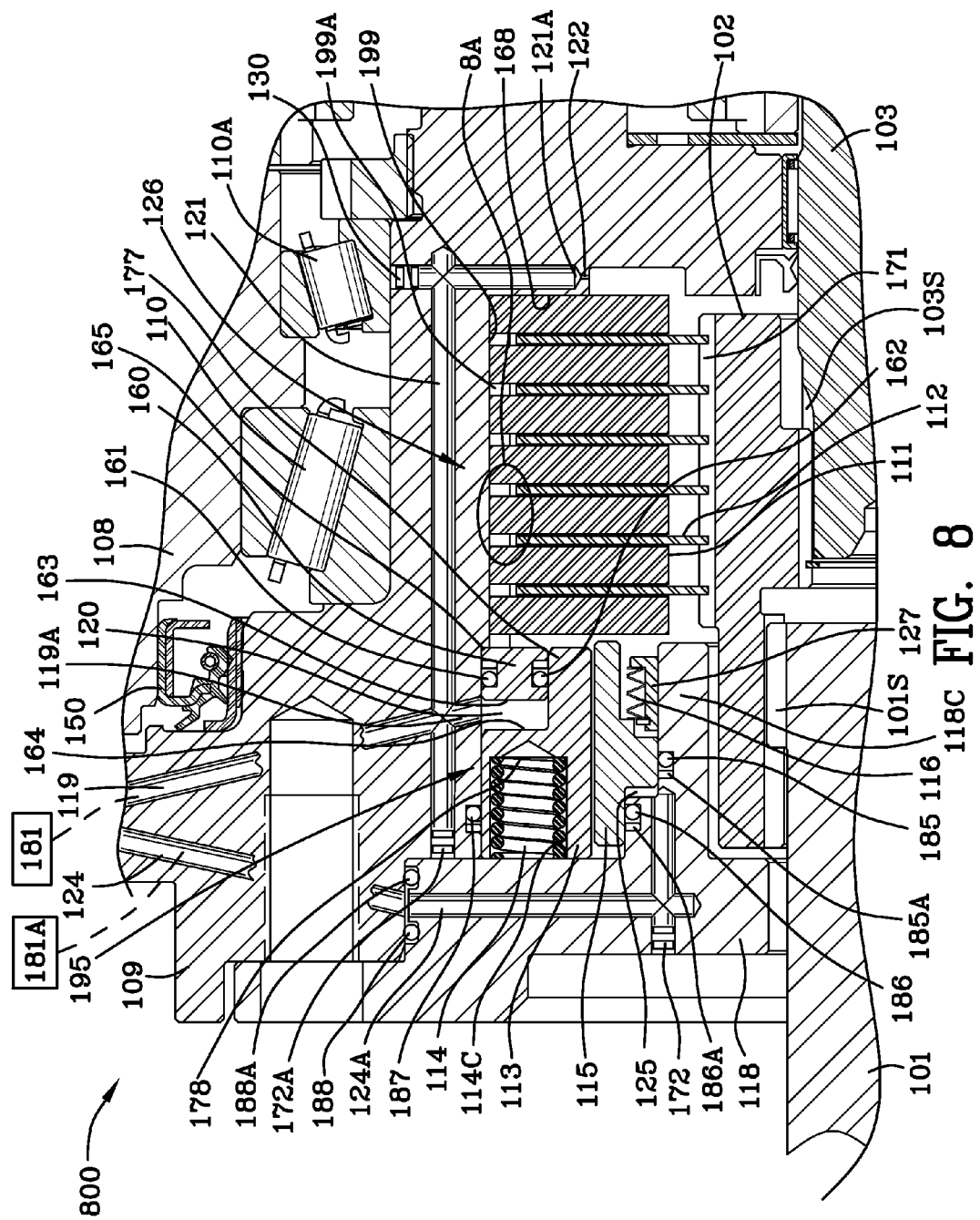
FIG. 8 is a cross-sectional schematic view illustrating the hub, spindle, fixed housing, motor mounting plate, wear adjuster, parking piston, service piston and brake stack with the parking piston not actuated and with the service piston not actuated, and with no wear of the friction material of the rotors, and with the stators and the rotors of the brake stack illustrated as residing loosely in the brake housing, which is the normal operating state of the brake stack.

FIG. 8 is a cross-sectional view 800 illustrating the hub 108, spindle/fixed housing 109, motor mounting plate 118, wear adjuster 127, parking piston 113, service piston 115 and brake stack 126 with the parking piston 113 not actuated and with the service piston 115 not actuated, and with no wear of the friction material of the rotors, and with the stators 111 and the rotors 112 of the brake stack illustrated as residing loosely in the brake housing, which is the normal operating state of the brake stack 126. FIG. 8 illustrates the operational state of its brake mechanism with no wear.

FIG. 8A is an enlargement of a portion 800A of FIG. 8 illustrating gaps 812G between the stators 111 and the rotors 112. Rotors 112 include friction material 112A on both sides of rotor plate 112. Rotors 112 and stators 111 are thick and have a high heat capacity. Thicker rotors and stators with a high heat capacity are used to keep the dimensions of the cylindrical inner portion 199 of the fixed housing/spindle 109 reasonable.

FIGS. 1, 8 and 8A illustrate a brake mechanism 195 in combination with a planetary gear 196 set which includes a fixed housing 109 which has a substantially cylindrical inner portion 199. The substantially cylindrical inner portion 199 of the fixed housing/spindle includes contours 199A thereon which mate with contours 216 of the stators 111. See FIG. 2G. FIG. 2G is a side view 200G of a stator and FIG. 2H is a front view 200H of the stator 111 illustrated in FIG. 2O. Contours 216 being raised exterior portions and lands 217 of stator 111.

Referring to FIGS. 1, 1B, 2, 2B, 3, 3B, 2G and 2H, stators 111 may be keyed or splined and mate with corresponding keyed or splined surfaces of the fixed housing 109. Brake mechanism 195 resides substantially within the substantially cylindrical inner portion 199 of the fixed housing 109. Motor mounting plate 118 sometimes referred to herein as a plate 118 includes a flange portion 118F and a cylindrical portion 118C extending partially within the substantially cylindrical inner portion 199 of the fixed housing 109. Flange portion 118F of the plate 118 substantially encloses the substantially cylindrical inner portion 199 of the fixed housing 109. Opening 118H in plate 118 allows motor shaft 101 to penetrate therethrough. Shaft 101 is driven by a hydraulic motor or by an electric motor which is not shown.

Referring to FIGS. 1, 2, and 3, planetary gear set 196 includes a rotating input drive 103 and a rotating output drive 107, 108. The planetary gear set 196 includes an input planetary stage 105 and an output planetary stage 106. The planetary gear set further includes a motor shaft 101, a coupling 102 splined 101S to motor shaft 101, and the coupling 102 splined 103S to input drive shaft 103 transferring the rotary motion of the motor shaft 101 to the input drive shaft 103. Service piston 115 is generally cylindrically shaped and concentric with the substantially cylindrical portion 118C of plate 118. Service piston 115 slidingly engages the substantially cylindrical portion 118C of the plate 118. Input drive shaft 103 includes a sun gear 104 driving input planetary stage 105 which includes input planet gears 105C which interengage the ring gear. Ring gear 107 and hub 108 are affixed together and input sun gear 104 drives input planet gears 105G which interengage ring gear 107. Input planet carrier 105C engages and drives output sun gear 106S. Output planet gears 106G are mounted on cylindrical mounts 109C of the fixed housing 109 and are driven by output sun gear 106S and are rotatable with respect to the fixed housing 109. Output planet gears 106G are interengaged with ring gear 107 and drive ring gear 107 and huh 108 with respect to the housing 109. Bearings 110, 110A are interposed between hub 108 and fixed housing 109 enabling the hub 108 to rotate with respect to the fixed housing 109.

Referring to FIGS. 1, 1A, and 1B, the brake mechanism 195 includes a service piston 115 and a brake stack 126. Planetary gear set 196 includes a motor shaft 101, an input shaft 103, and a coupling 102 affixed to the motor shaft 101 and to the input shaft transferring the rotary motion of the motor shaft 101 to the input shaft. Brake stack 126 includes a plurality of stators 111 and a plurality of rotors 112 and the plurality of rotors 112 are interleaved with the stators 111 such that each of the plurality of rotors resides interleaved between a pair of proximate stators. FIG. 1B is an enlargement of a portion 100B of FIG. 1A illustrating a portion of the brake stack 126 with the stators 111 and the rotors 112 engaging each other and with friction material 112A residing on the rotors 112. Rotors 112 are affixed to the coupling 102 and rotate therewith. Each of the rotors include friction material 112A affixed thereto. Stators 111 are affixed to the fixed housing 109. Rotating input drive 103 imparts rotating input motion to the planetary gear set 196 driving the rotating output drive 107, 108 of the planetary gear set. The output drive 107, 108 of the planetary gear set is rotatable with respect to the fixed housing 109.

Figure 1C:
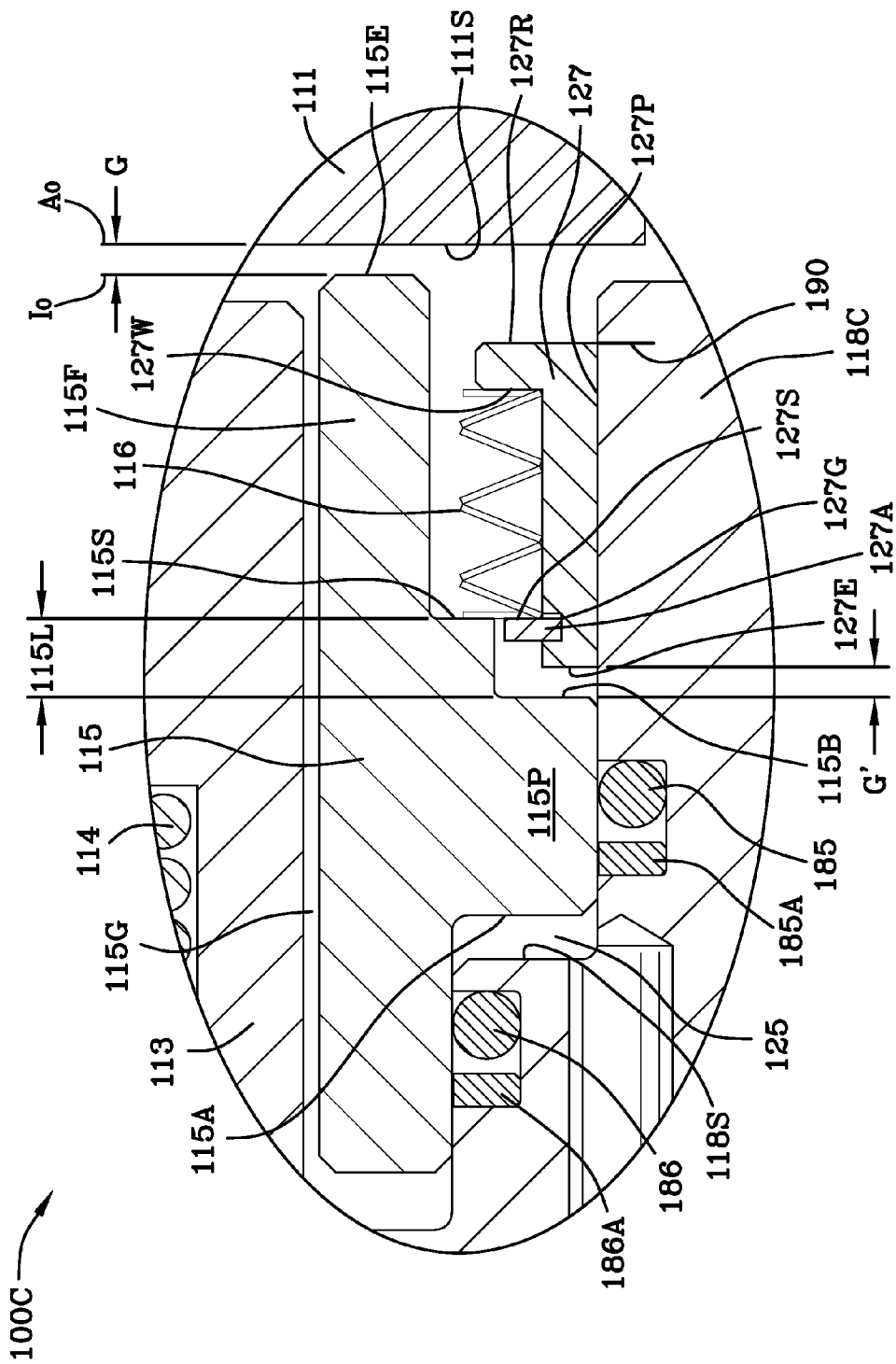
FIG. 1C is an enlargement of a portion of FIG. 1A illustrating the wear adjuster press-fit on a cylindrical portion of the motor mounting plate and also illustrating a guide line for the initial location of the wear adjuster.

Referring to FIG. 1C, Service piston 115 includes a brake stack engagement portion 115F, a piston portion 115P, a first shoulder portion 115B, a second shoulder portion 115S, surface 115A, and a piston cavity 125. Brake stack engagement portion 115F includes an end 115E which engages said brake stack 126 when the service piston is actuated. Piston cavity 125 of the service piston 115 is formed by the surface 115A of piston portion 115P of the service piston, cylindrical portion 118C of plate 118, and shoulder 118S of plate 118. Seals 185, 185A, 186, and 186A seal cavity 125. Service piston 115 is movable between an initial position or starting position and another position. A pressurized fluid source/controls 181. A supply suitable fluid to a service piston cavity 125. A first passageway 124, 124A communicates suitable fluid from a pressurized source 181A to the service piston cavity. Specifically, the service piston cavity 125 is interconnected with a first passageway 124A in plate 118 which is interconnected with a first passageway 124 in housing 109. First passageway 124A of plate 118 communicates fluid to service piston cavity 125 of service piston 115 pressurizing the service piston cavity 125 when service piston 115 is actuated. Any suitable fluid may be used to supply the service piston cavity 125. The supply of fluid under pressure to the service piston cavity is a closed system in that there is no flow through the system. See FIG. 1.

Figure 5:
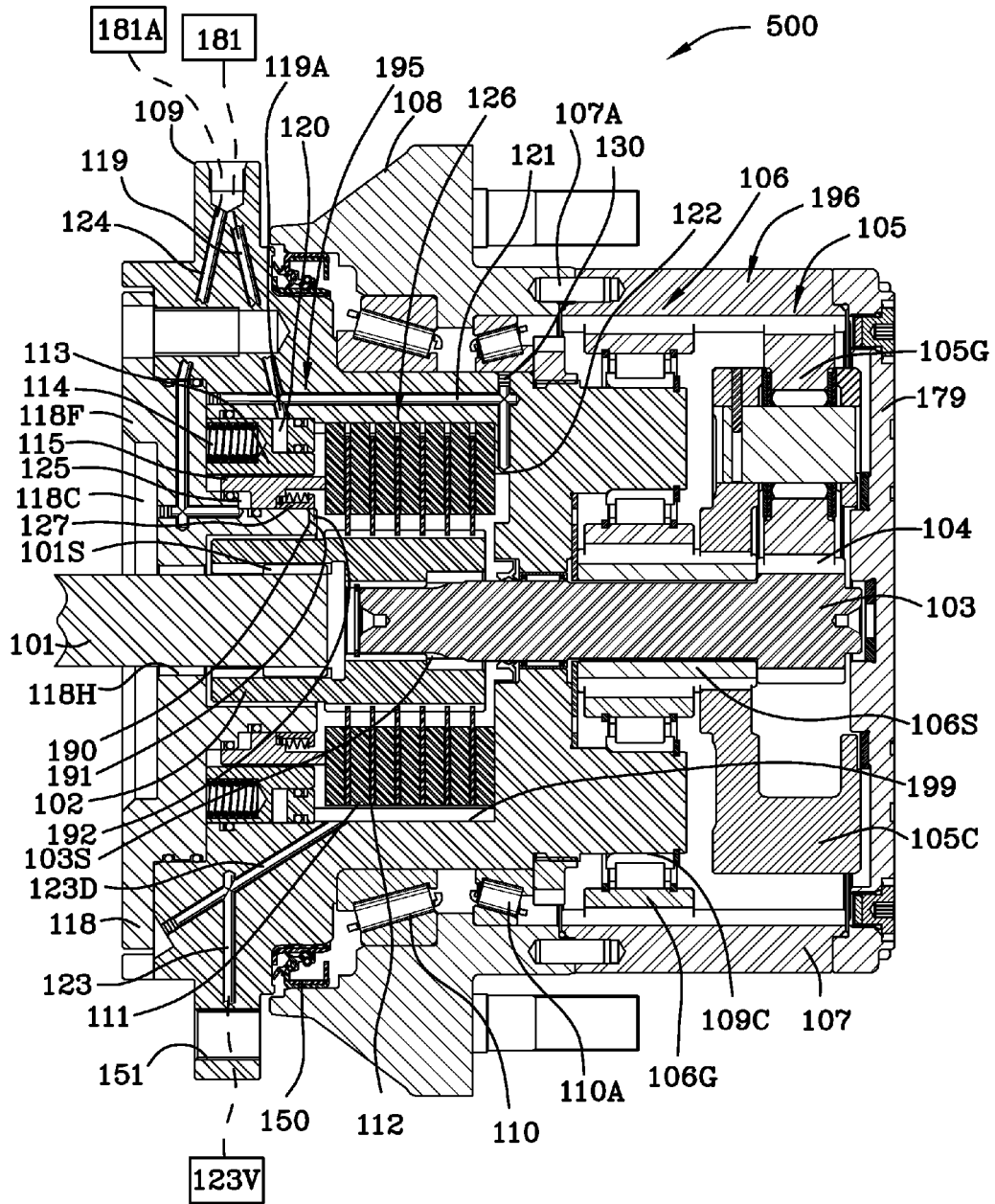
FIG. 5 is a cross-sectional schematic view illustrating the hub, spindle, fixed housing, motor mounting plate, wear adjuster, parking piston, service piston and brake stack with the parking piston not actuated and with the service piston actuated, and with substantial wear of the friction material of the rotors with the brake stack rotors and stators illustrated engaging each other.

Fixed housing 109 includes a fourth passageway 119, 119A which supplies hydraulic oil (hydraulic fluid) to the parking piston cavity 120. Second passageway 119, 121 includes a discharge end 121A. Discharge end 121A of the second passageway includes an orifice 122 therein whose function is to reduce the hydraulic oil pressure coming into the substantially cylindrical inner portion 199 of the fixed housing 109 which houses the brake mechanism. Hydraulic oil is communicated from the hydraulic oil pressure source/control 181 at approximately 300-500 psi through the second passageway 119, 121 and the orifice 122 where the pressure drops to 30-50 psi. Hydraulic oil then proceeds into the substantially cylindrical inner portion 199 of the fixed housing 109 to cool all brake components. Once inside the inner portion 199, the hydraulic oil mixes with the rotors 112, 112S, stators 111, and pistons 113, 115 and performs a cooling function. If the rotors as illustrated in FIG. 2D are used, the coolant oil enters the spaces between the square friction elements and the covering of the core plate. Thus, the oil is used to cool the brake stack 126 whether: the brake stack is operating loosely with the rotors and stators separated apart as illustrated in FIGS. 8 and 8A; or, the brake stack 126 is engaged by the service piston 115 as illustrated in FIGS. 3 and 5. Additionally, even if the parking piston is the only actuated piston, the brake stack 126 is cooled by the oil supply from second passageway 119, 121. Fixed housing 109 includes an exterior and a third passageway 123, 123D. Third passageway 123, 123D communicates between the substantially inner portion 199 of the fixed housing 109 and the exterior of housing 109. Third passageway 123, 123D communicates hydraulic oil from the substantially cylindrical inner portion 199 of fixed housing 109 to vacuum pump 123V. Vacuum pump, or suction pump 123V, may be affixed to, or be a part of, housing 109.

When the parking piston cavity 120 is depressurized, springs 114 urge parking piston 113 into engagement with the brake stack 126 and the transmission of power to the gear box ceases. Additionally, the flow of hydraulic oil through the second passageway 119, 121 and through the discharge portion 121A and the orifice 122 ceases.

When the service piston 115 is in the initial position it is not actuated, and, the plurality of rotors 112 and the plurality of stators 111 are not engaged with each other.

FIG. 1C is an enlargement of a portion 100C of FIG. 1A illustrating the wear adjuster 127 press-fit 127P on a cylindrical portion 118C of the motor mounting plate 118 and also illustrating a guide line 190 for the initial location of the wear adjuster. Guide line 190 is scribed on the outside of the cylindrical portion 118C of the plate 118. End portion 127R of wear adjuster 127 must be placed exactly coincident with guide line 190 for the gap, G, to be properly set initially.

Referring to FIGS. 1, 1A, 1B and 1C, gap, G, is the distance between surface 111S of the first stator of the brake stack 126 and the end 115B of the engagement portion 115F of the service piston 115. FIGS. 1, 1A, 1B and 1C illustrate the brake stack 126 with the elements thereof being in engagement with each other. As stated previously, this condition does not exist during operation. FIGS. 1, 1A, 1B and 1C are being used to schematically illustrate the gap, G. It is necessary to control the size of the gap, G, so as to consistently control the actuation of the service piston despite the wear of the brake stack due to loss of friction material 112A from the rotors 112. The initial home position $I_O$ of the end of the engagement portion 115E is illustrated in FIG. 1C. $I_O$ is determined by the dimensions of the service piston, the dimensions of the wear adjuster and the positioning of the wear adjuster at the location of line 190. The initial another position, $A_O$, is determined by the thickness of brake stack 126.

Referring to FIG. 1A, wall 168 is illustrated as part of the fixed housing 109 and to and $A_O$ are measured from wall 168.

Referring to FIG. 1C, G' is the distance between the first shoulder 115B on the piston portion 115P and the end 127E of the wear adjuster, and the relationship between G and G' is as follows:

$$G' \leq G$$

Wear adjuster 127 includes a groove 127G and a snap ring 127A. Snap ring 127A resides in groove 127G. The wear adjuster 127 further includes a wall 127W and a spring 126. Spring 116 may be a wave spring or the equivalent. Spring 126 resides between the wall 127W of the wear adjuster and snap ring 127A. Wear adjuster 127 is generally cylindrically shaped and extends around the outer circumference of cylindrical portion 118C of plate 118.

Still referring to FIG. 1C, it is readily apparent that if the wear adjuster 127 is initially set rightwardly of guide line 190, that the service piston will work but that there will be no control of the gap, G. Gap, G, is set a specified distance from the first stator 111S to achieve the desired braking performance. However, it is also readily apparent that if the wear adjuster is initially set slightly leftwardly of guide line 190 that the service piston will work and the service piston will correct the position of the wear adjuster as long as the relationship $$G' \leq G$$

is maintained. The relationship G'≤G is necessary to ensure that the first shoulder 115B of the service piston engages the end surface 127E of the wear adjuster. The relationship between G' and G will be maintained as long as the service piston, the wear adjuster 127 and the spring 116 are sized and manufactured correctly. Maintenance of the distance 115L between the first shoulder 115B and the second shoulder 115S ensures that the G' is less than G. Second shoulder 115S engages spring 116. Spring 116 engages snap ring 127A. Spring 116 is a wave spring or equivalent which extends 360° around cylindrical portion 118C of the plate 118E. Reference numeral 115G is used to denote a gap between the generally cylindrical parking piston 113 and the generally cylindrical service piston 115.

The generally cylindrically shaped wear adjuster 127 is press fit 127P on the cylindrical portion 118C of plate 118. The press-fit 127P of the wear adjuster is a light press-fit and permits the wear adjuster 127 to move on the cylindrical portion 118C of the plate in engagement with, and under the force of, the piston portion 115P of the service piston 115.

The service piston 115 includes a brake stack engagement portion 115E, a piston portion 115P, a first shoulder portion 115B, and a second shoulder 115S and a piston cavity 125. The piston cavity 125 of the service piston 115 is formed by the piston portion 115P of the service piston and the cylindrical portion 118C of the plate. The service piston 115 is movable between a home position, $I_N$, and another position, $A_N$. The service piston is in home position, $I_N$, when the service piston is not actuated, and, the plurality of rotors 112 and the plurality of stators 111 are not engaged with each other. Before the first actuation of the service piston, the wear adjuster 127 is placed on the cylindrical portion of the plate to a specified position, which then determines the initial home position, $I_O$. See FIG. 1C where $I_O$, the initial home position of the service piston and $A_O$, the initial another position of the service piston are illustrated. Also, see FIG. 1C illustrating the placement of the wear adjuster 127 such that end 127R of the wear adjuster 127 is placed at line 190 scribed or marked on the cylindrical portion 118C of the plate.

Figure 2A:
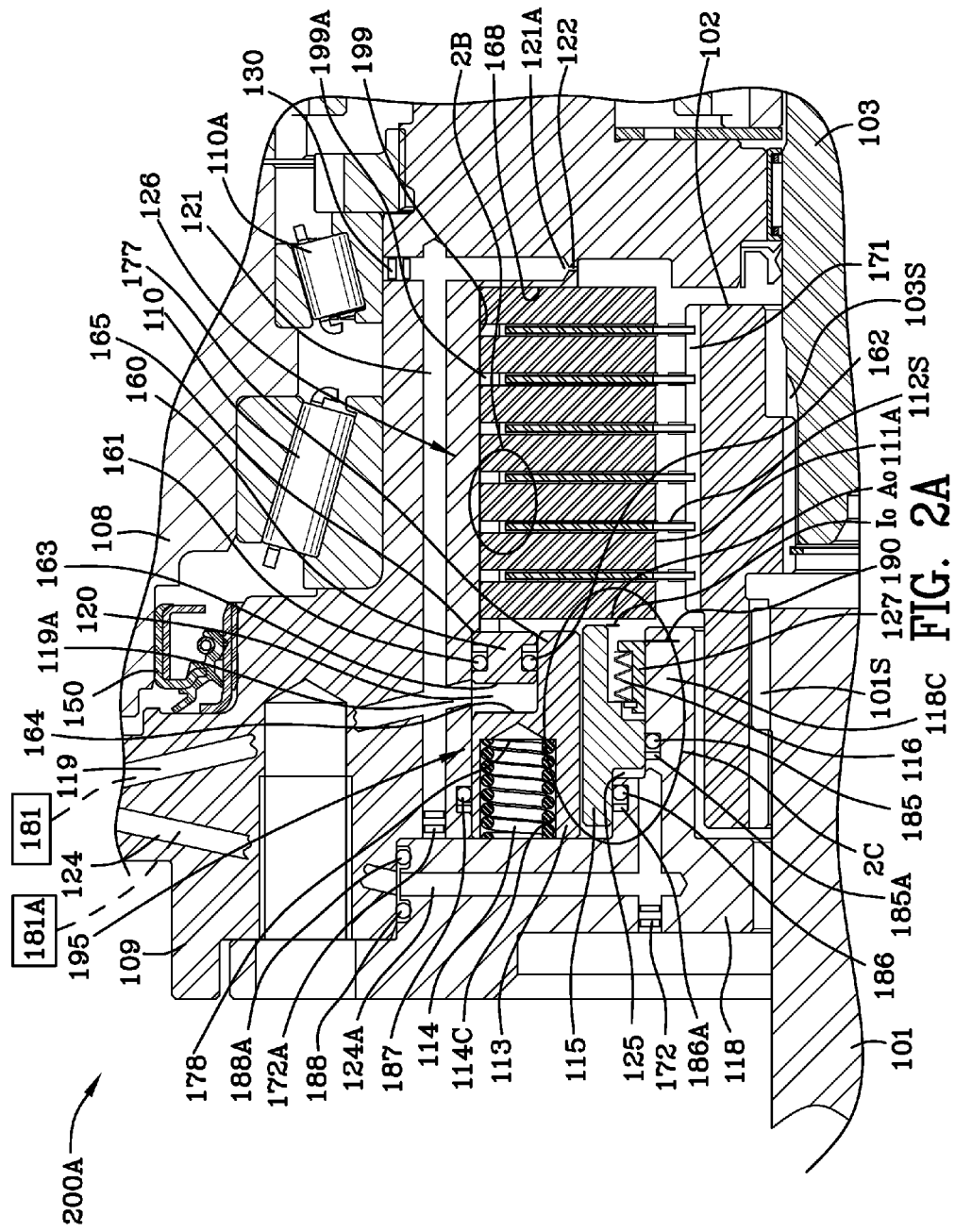
FIG. 2A is an enlargement of a portion of FIG. 2.
Figure 2C:
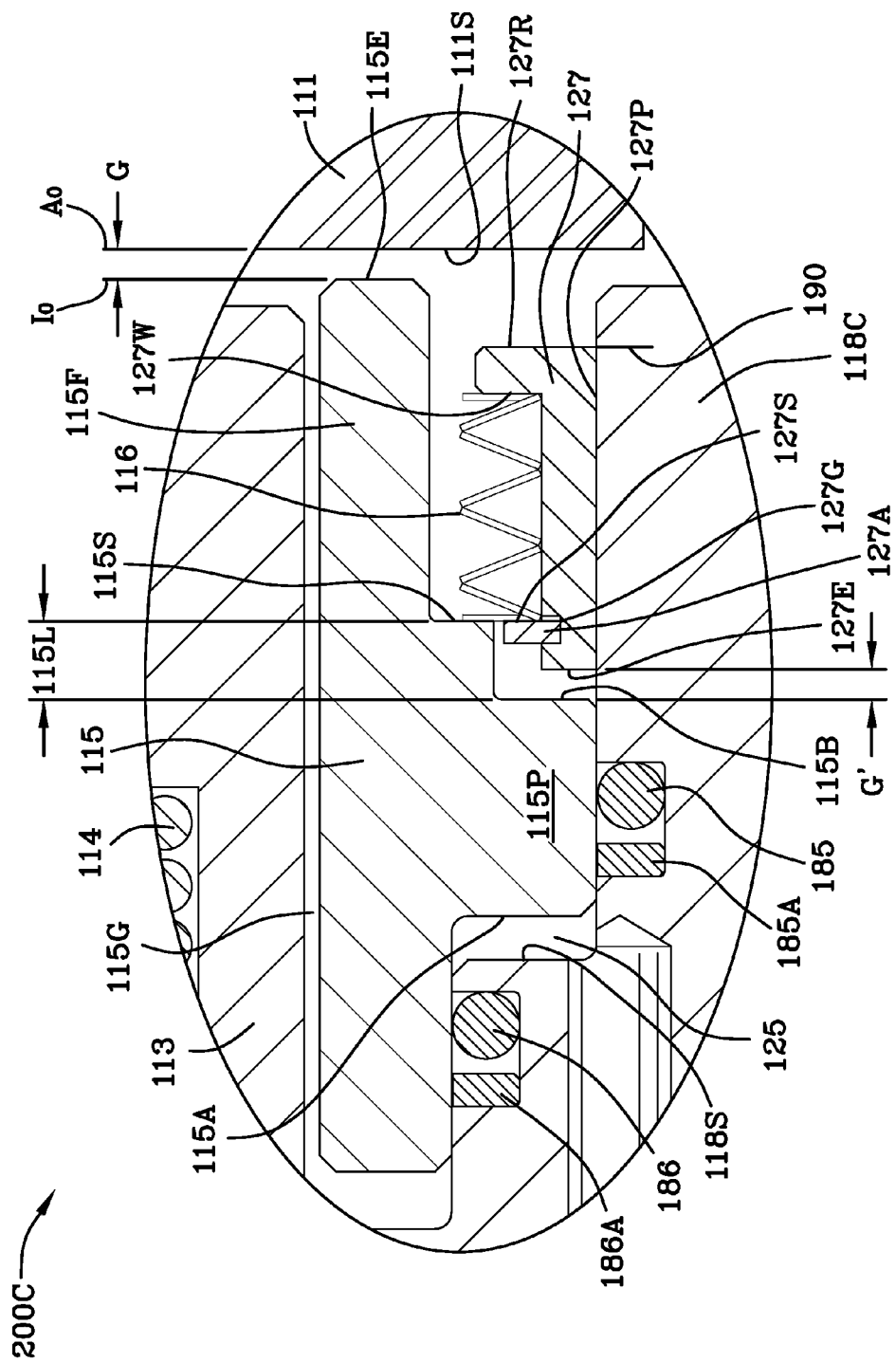
FIG. 2C is an enlargement of a portion of FIG. 2A illustrating the wear adjuster press-fit on a cylindrical portion of the motor mounting plate and also illustrating a guide line for the initial location of the wear adjuster.

The another position, $A_N$, of the service piston 115 is determined according to the wear of the brake stack 126. Before the first actuation occurs, the another position is the initial another position, $A_O$, and it is determined by the thickness of the brake stack. See FIG. 1C. During the first actuation of the service piston, the engagement portion 115E of the service piston engages the brake stack 126 forcing the plurality of rotors and the plurality of stators into engagement with each other and creating some wear of the friction material in the brake stack. See FIG. 4C. The engagement portion 115E of the service piston 115 is initially spaced apart from the brake stack by a distance, G. See FIGS. 1C and 2C. Distance, G, is defined as the distance between the engagement portion 115E of the service piston in its initial home position and in its initial another position (i.e., the position of brake stack 126 in the engaged state). See FIGS. 1C and 2C wherein the gap, G, $I_O$, and $A_O$ are shown. Initially, the brake stack 126 has no wear (as illustrated in FIGS. 1C and 2C) and the initial position of the brake stack 126 (i.e., the initial another position of the service piston) is determined by the initial thickness of all the rotors and stators with respect to wall 168 of substantially cylindrical inner portion 199 of housing 109. The initial home position, $I_O$, of the service piston, for example, may also be referenced (measured) from wall 168 of the substantially cylindrical inner portion 199 of housing 109. Wall 168 is illustrated in FIGS. 1A, 2A, and others.

A generally cylindrically shaped wear adjuster 127 includes a groove 127E and a snap ring 127. The snap ring 127A resides in the groove 127G. The wear adjuster 127 further includes a wall 127W and a spring 116. Spring 116 resides between wall 127W of the adjuster 127 and the snap ring 127A.

The generally cylindrically shaped wear adjuster is press fit 127P on the cylindrical portion 118C of the plate. The press-fit of the wear adjuster permits the wear adjuster to move on the cylindrical portion 118C of the plate in engagement with, and under the force of, the piston portion 115P of the service piston. Shoulder 115B engages wear adjuster end 127E during each actuation of the service piston 115.

During actuation and movement of the service piston 115 to the another position, $A_N$: the first shoulder portion 115B of the piston portion 115 of the service piston 115 engages the wear adjuster 127 repositioning the wear adjuster position to accommodate for loss of friction material; the second shoulder 115S of the service piston engages the spring 116 compressing the spring 116 between the shoulder 115S of the service piston and the wall 127W of the wear adjuster; and, the engagement portion 115E of the service piston 115 forcefully engages the brake stack 126 wherein the plurality of stators 111 and the plurality of rotors 112 engage each other prohibiting rotation of the input drive 103 with respect to the fixed housing 109.

Actuation and movement of the service piston are caused by pressure applied to the service piston pressure cavity 125. Pressurized fluid is used to actuate the service piston 115.

Upon discontinuation of the service piston actuation, the follow results occur: spring 116 urges shoulder 115S of service piston in a direction opposite the wall 127W of the wear adjuster 127 and repositions service piston 115 to a second position due to a loss of friction material; the first shoulder 115B of the service piston disengages the wear adjuster 127 and the service piston is repositioned to the second position (see FIG. 4); and, the engagement portion 115E of the service piston is returned to the second position and is spaced a distance, G, from the brake stack 126 when it is next engaged.

Figure 3A:
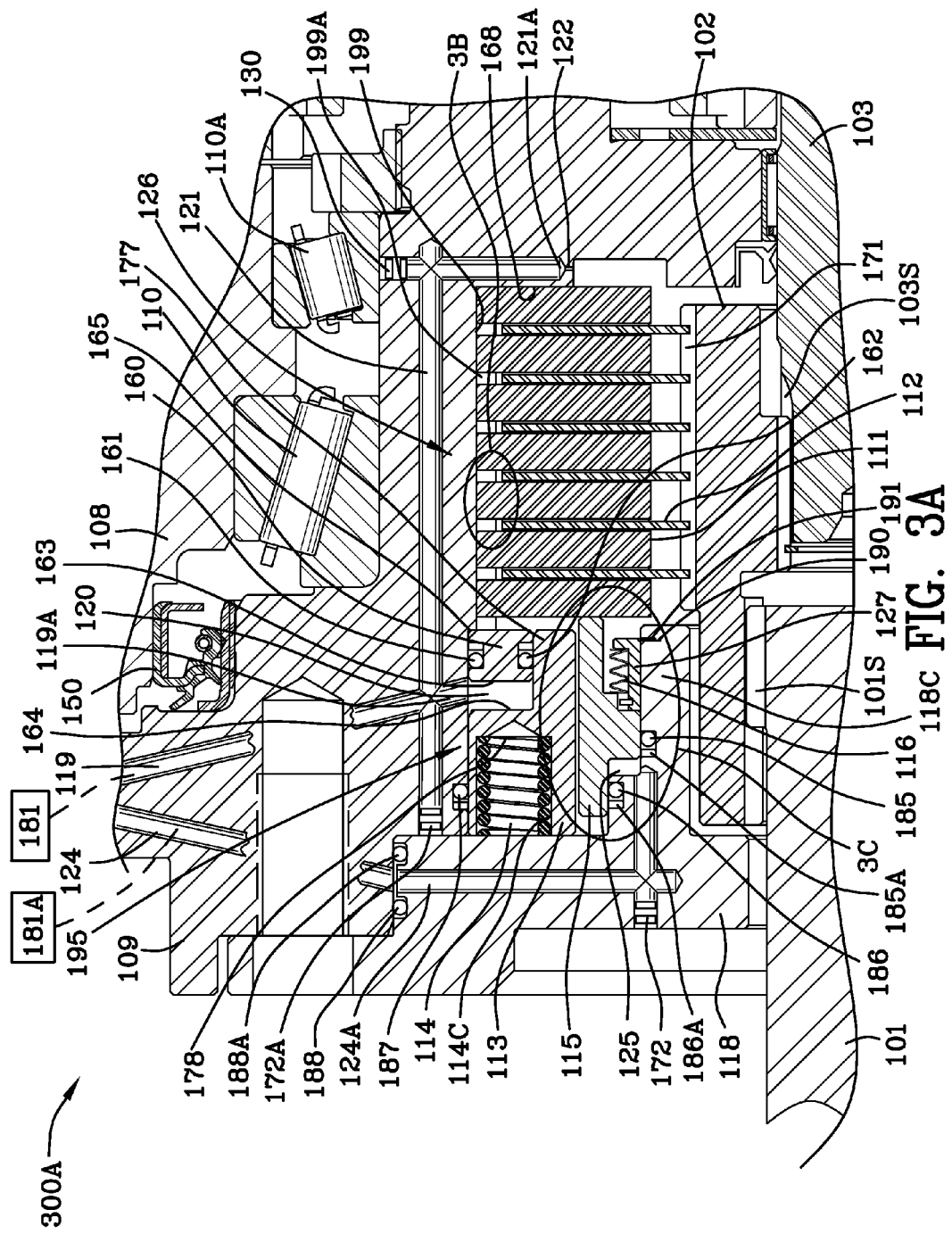
FIG. 3A is an enlargement of a portion of FIG. 3.
Figure 3B:
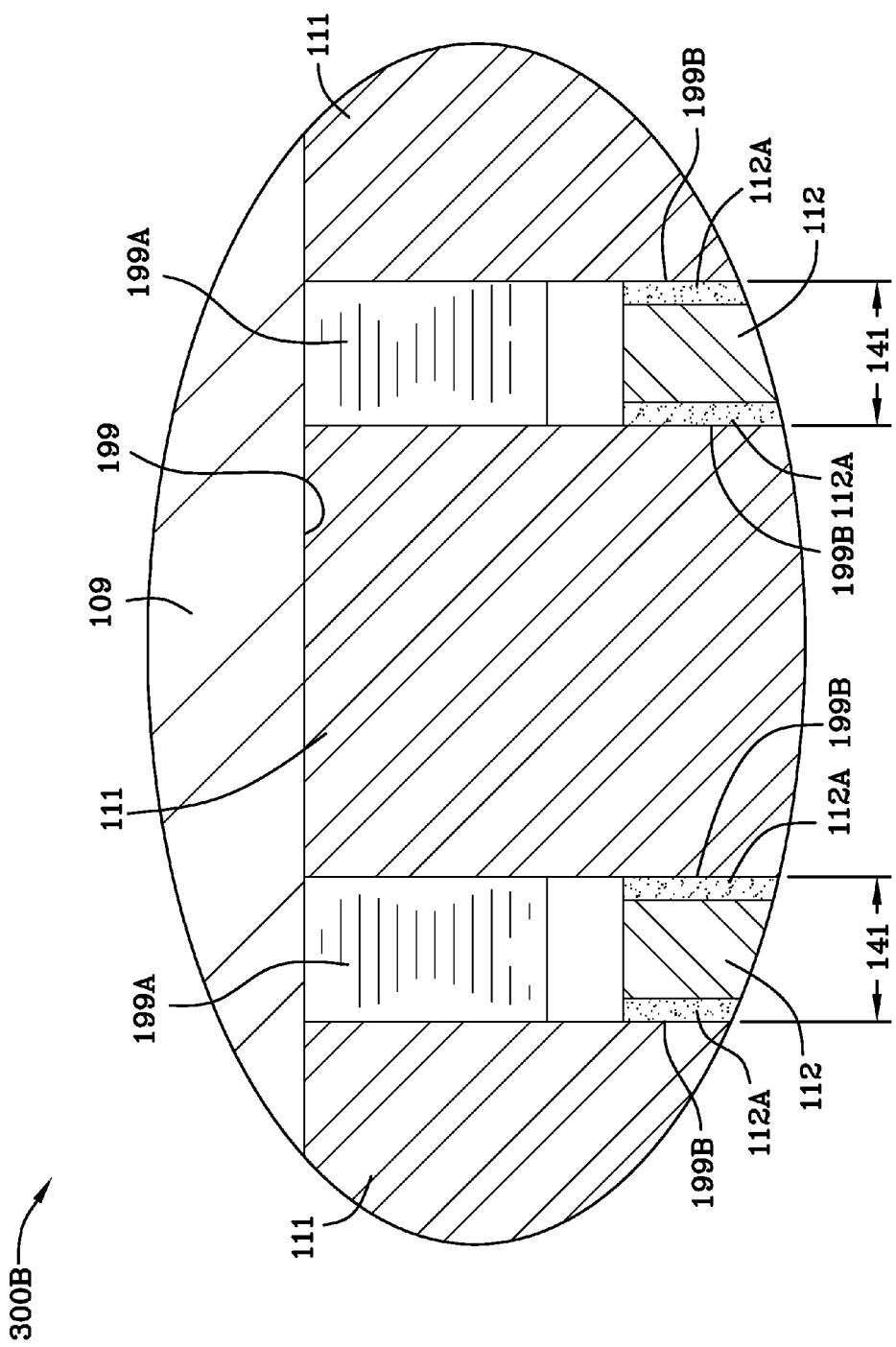
FIG. 3B is an enlargement of a portion of FIG. 3A illustrating a portion of the brake stack with the stators and rotors engaging each other and with friction material being somewhat worn from the rotors.
Figure 3C:
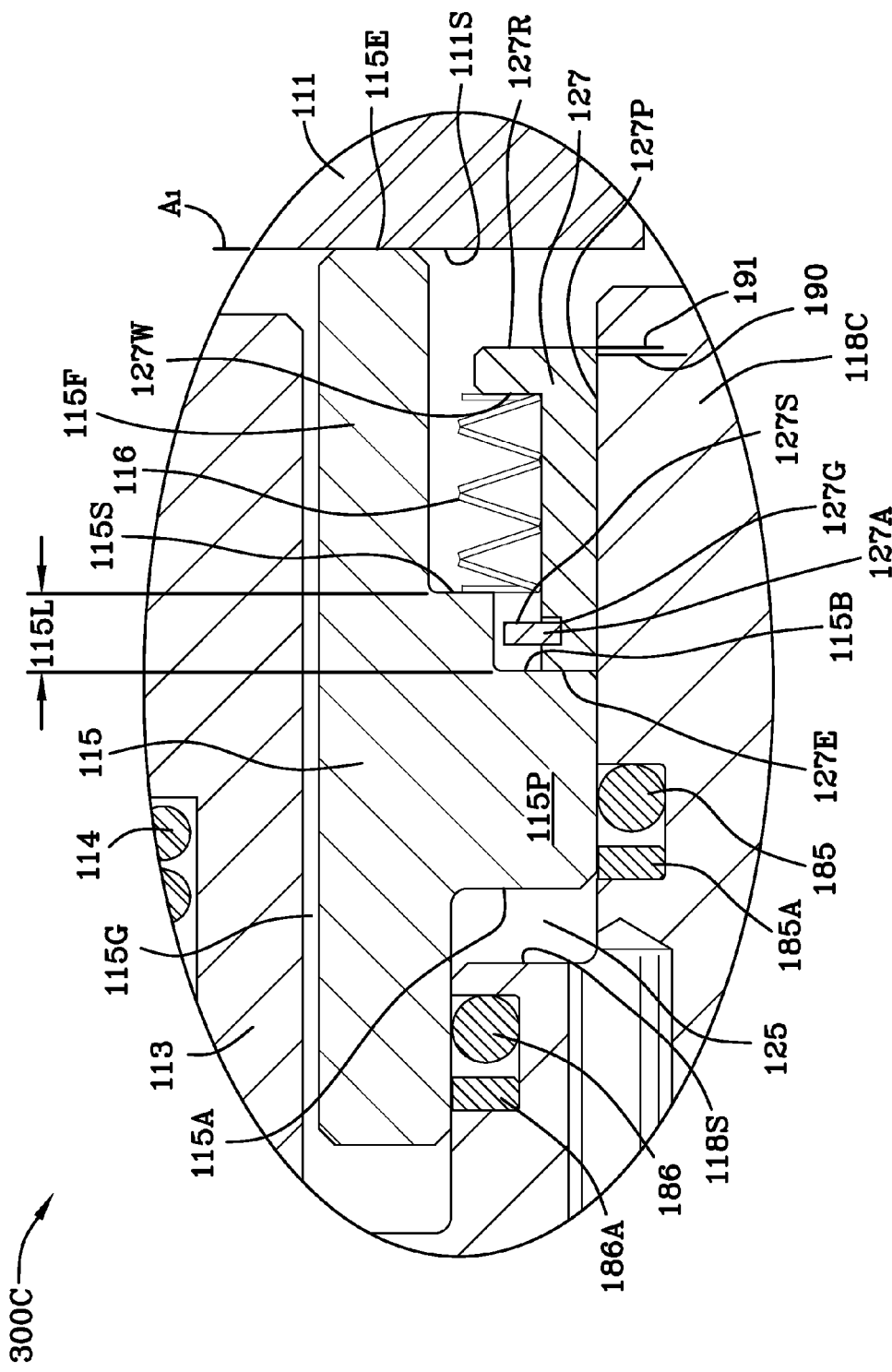
FIG. 3C is an enlargement of a portion of FIG. 3A illustrating the wear adjuster moved by action of the service piston to another position due to some wear of friction material from the rotor in the brake stack.
Figure 4A:
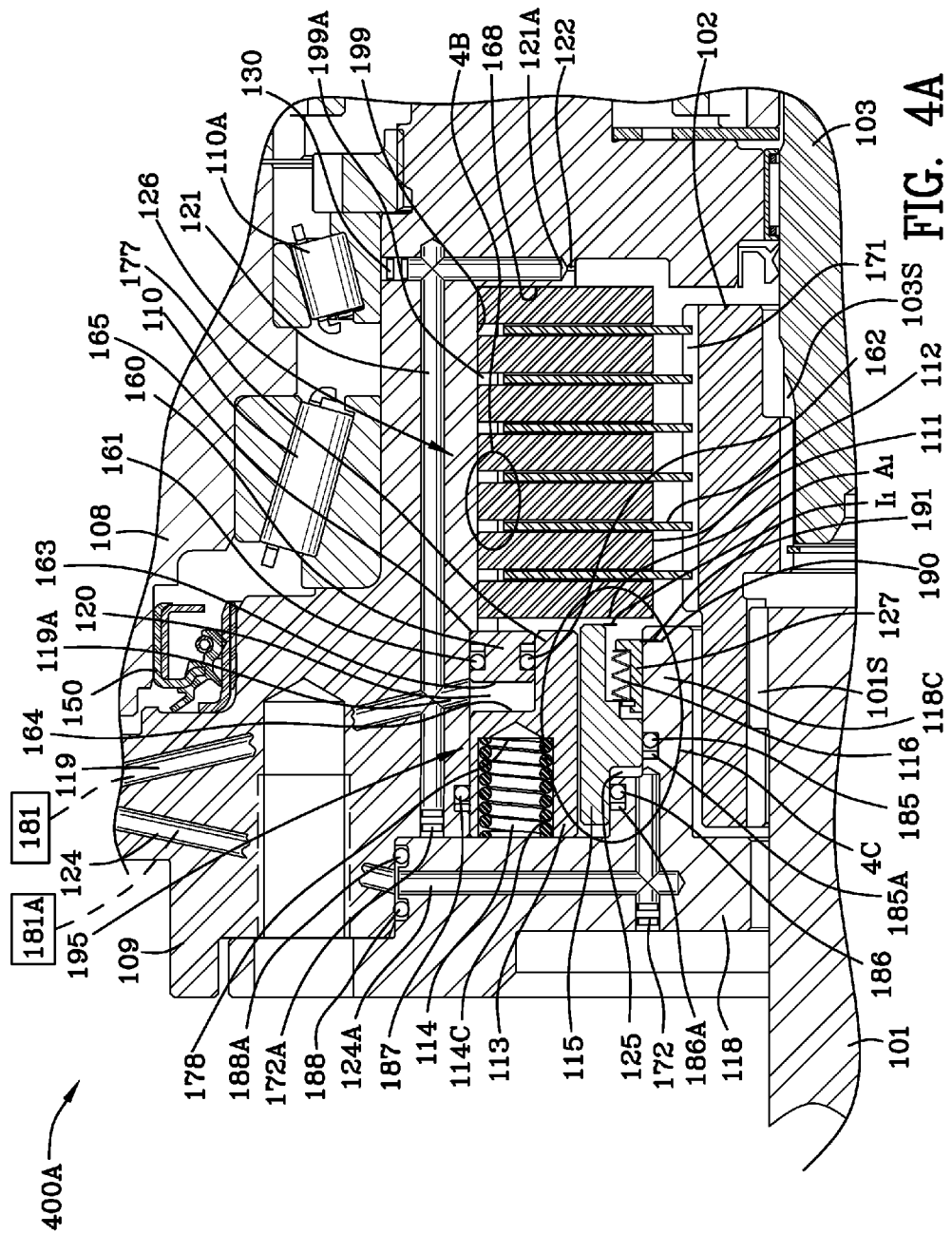
FIG. 4A is an enlargement of a portion of FIG. 4.
Figure 4B:
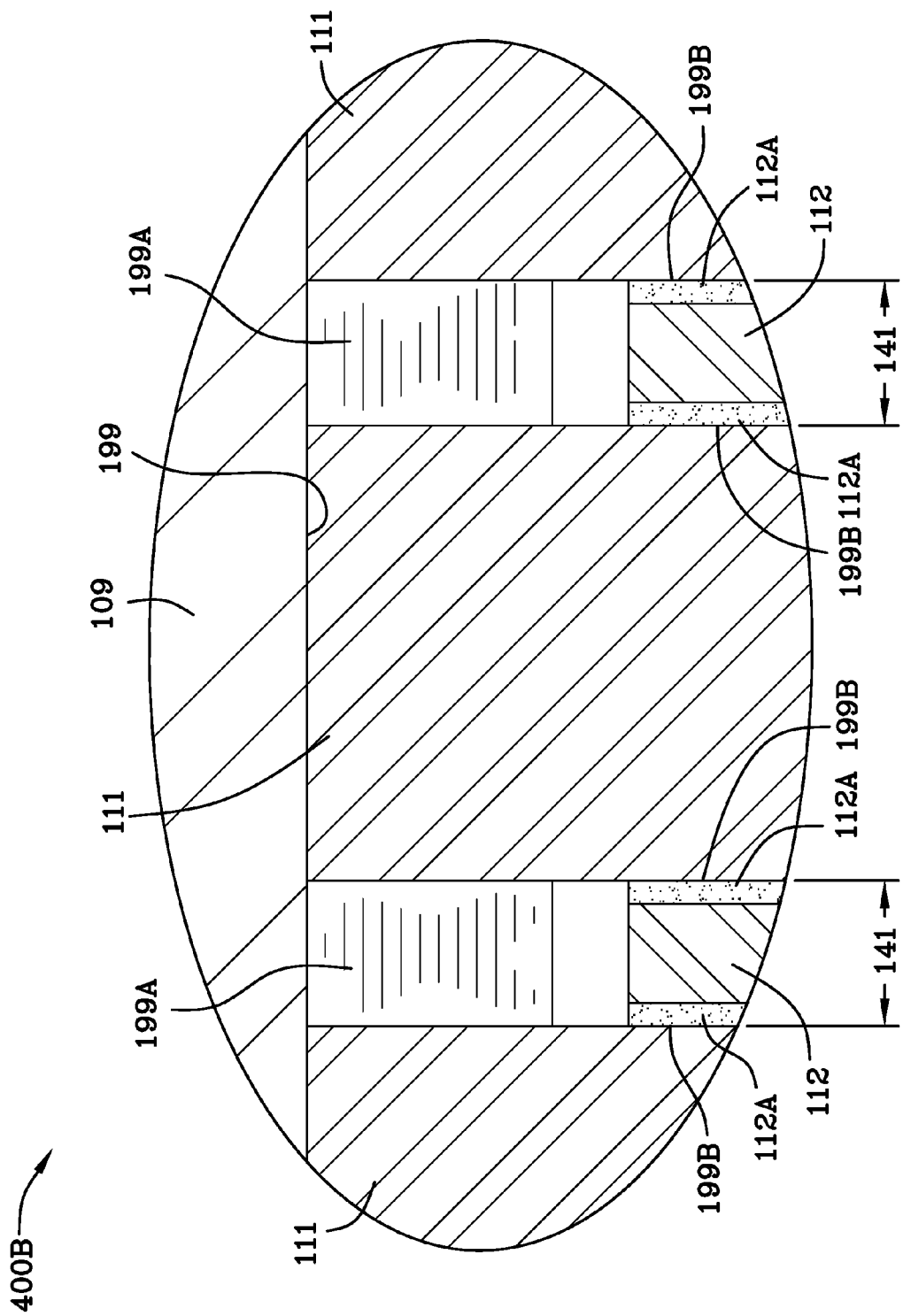
FIG. 4B is an enlargement of a portion of FIG. 4A illustrating a portion of the brake stack with the stators and rotors engaging each other and with some friction material being worn from the rotors and with the parking piston and service piston not actuated, and FIG. 4B being essentially the same view as FIG. 3B.
Figure 4C:
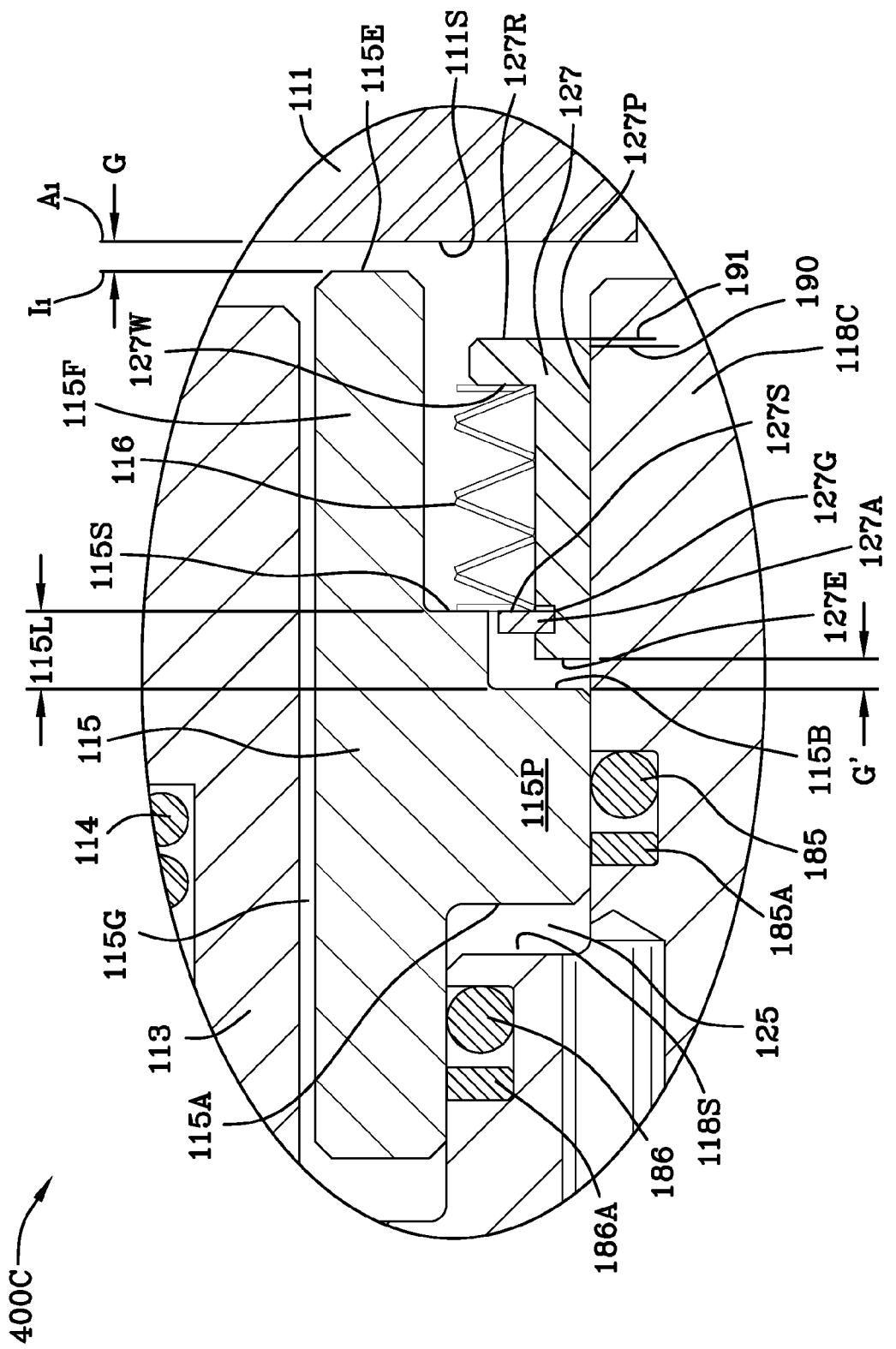
FIG. 4C is an enlargement of a portion of FIG. 4A illustrating the wear adjuster moved to a different position with respect to FIG. 1C due to the wear of the friction material on the rotor, and the repositioning of the service piston by the spring of the wear adjuster.

Discontinuation of the service piston actuation is the substantial removal of pressure from the service piston pressure cavity. The process for the next service piston actuation is then repeated. When spring 116 urges service piston 115 to the second position as illustrated in FIG. 4C, there is enough fluid in cavity 125 and there is enough friction between service piston 115 and cylindrical portion 118C, so as to not separate shoulder 115S from spring 116. Spring 116 may be a wave spring. As explained elsewhere herein, FIGS. 3C and 4C illustrate two lines 190 and 191 on the cylindrical portion 118C of the plate 118. Line 190 represents a line or scribe on the cylindrical portion 118C for initial placement of the wear adjuster thereat which results in the desired placement of the service piston at the initial home position, $I_0$. Line 191 in FIG. 4C represents repositioning of the wear adjuster 127. In reality, to effect movement to line 191, would require numerous actuations of the service piston. FIG. 4C is being used to explain movement of the wear adjuster for the first actuation of the service piston to move the service piston to the second position. FIG. 4C is also being used to explain movement of the wear adjuster 127 after numerous actuations of the service piston.

A method for operating a brake mechanism in combination with a planetary gear set is also disclosed and claimed. The method includes arranging a brake stack 126 within the housing 109. The brake stack 126 includes a plurality of stators and a plurality of rotors. The method further includes affixing the rotors 112 to a coupling 102 such that the rotors rotate with the coupling. Further, the method includes affixing the stators 111 to a fixed housing 109. Still further, the method includes interleaving a plurality of rotors 112 with the stators 111 such that each of the plurality of rotors 112 resides interleaved between a pair of proximate stators 111.

The step of press-fitting 127P a wear adjuster on a cylindrical member 118C to a pre-set location 190 on the cylindrical member 118C is included in the method. The wear adjuster includes a groove 127G and a snap ring 127A. The snap ring 127A resides in the groove 127G. The wear adjuster 127 further includes a wall 127W and a spring 116. The spring resides between the wall 127W of the adjuster and the snap ring 127G. The wear adjuster 127 is generally cylindrically shaped. The press-fit of the wear adjuster 127 is light so as to permit the wear adjuster to move on the cylindrical member 118C in engagement with, and under the force of the service piston 115.

The method further includes positioning a generally cylindrically shaped service piston 115 concentrically around the cylindrical member 118C to an initial home position, $I_0$, and abutting the shoulder 115S of service piston 115 into engagement with the spring 116 of the wear adjuster. The method further includes determining the thickness ($A_0$ location compared to wall 168 location) of the brake stack 126 when the rotors 112 and stators 111 are engaged and defining this position of the service piston, that is, the initial position of engagement of the service piston with the brake stack based on its initial thickness without any wear as being $A_0$, the initial another position. The positions $I_0$ and $A_0$ are known and determined before any operation of the device. $A_0$ is the position the service position would be in if it were to engage a new brake stack 126 without any wear and with the components (rotor and stator) of the brake stack engaged. See FIGS. 1C and 2C. $A_0$ is a position as is $I_0$ which can be defined relative to a wall 168 of the inner cylindrical portion of housing 109, and these positions are set and determined initially by the dimensions of the device and its construction. Gap, G, is set as the desired distance between the locations $A_0$ and $I_0$, with $I_0$, being the initial home position of the service piston without any actuation of the service piston having taken place, and, $A_0$ being the initial another position, that is, based on the dimension of a new brake stack 126 (without any wear) and the position the service piston 115 would be in if it were actuated for the first time as it just begins to engage the brake stack 126. Put another way, $A_0$ and $I_0$ can both be measured from wall 168 of the substantially cylindrical inner portion 199 of the housing 109 and gap, G, is simply $I_0$ minus $A_N$. Gap, G, controls the speed of response of the service brake piston 115. Initial home position of the service piston, $I_0$, is dependent on placement of the wear adjuster 127 on the cylindrical portion of the plate at a location 190 marked on the plate. Initial another position, $A_0$, is dependent on the dimensions of the brake stack. See FIGS. 1A, 1C and 2C where $I_0$ and $A_0$ are illustrated.

Further, the step of rotating an input drive imparting rotating input motion to the planetary gear set driving the rotating output drive of the planetary gear set is included in the method. The output drive of the planetary gear set is rotatable with respect to the fixed housing.

The method further includes moving the service piston between its initial position, $I_0$, to another position, $A_N$, with N being a positive integer equal to the number of service piston actuations and with N=1 for the first service piston actuation. The another position $A_N$ is defined at the end of the Nth braking cycle with the service piston 115 forcing the plurality of rotors 112 and the plurality of stators 111 into engagement with each other creating some wear. See FIG. 4C where $I_1$ and $A_1$ are illustrated. See FIG. 6C where $I_N$ and $A_N$ are illustrated. For each actuation there will be some wear and it will be practically immeasurable. The method further includes determining the another position $A_N$ (the location of the brake stack) according to the accumulated wear of the brake stack. Still further, the method includes a step for maintenance of the gap, G, for repeated actuations of the service brake piston.

The step of actuating and moving the service piston 115 to the another position $A_N$ from the previous home position, $I_{N-1}$ results in: the first shoulder 115E of the service piston engaging the wear adjuster 127 repositioning the wear adjuster 127; the second shoulder 115S of service piston 115 engaging the spring 116 compressing the spring 116 between the service piston and the wall 127W of the wear adjuster; and, the service piston forcefully engaging the brake stack 126 wherein the plurality of stators and the plurality of rotors engage each other causing brake stack wear (rotor wear) and prohibiting rotation of the coupling with respect to the fixed housing.

A step of discontinuing actuation of the service piston results in: the spring 116 urging the service piston 115 in a direction opposite the wall 127W of the wear adjuster; the service piston disengaging the wear adjuster; and, the service piston being repositioned to a position, $I_N$ and spaced a distance, G, from the brake stack when it is next engaged by the service position.

Therefore the positions of the service piston and brake stack are grouped in pairs, ($I_0$, $A_0$); ($I_1$, $A_1$); ($I_2$, $A_2$); ($I_3$, $A_3$); etc.

The method also includes a step of determining the wear of the brake stack by determining the change of position of the service piston from one actuation to the next. The magnitude of wear of the brake stack from one actuation to the next is equal to $I_N$ minus $I_{N-1}$ or the magnitude of wear of the brake stack from one actuation to the next is equal to $A_N$ minus $A_{N-1}$.

FIG. 3 is a cross-sectional view 300 illustrating the hub 108, spindle/fixed housing 109, motor mounting plate 118, wear adjuster 127, parking piston 113, service piston 115 and brake stack 126 with the parking piston 113 not actuated and with the service piston 115 actuated, and with some wear of the friction material 112A on the rotors 112, and with the brake stack rotors 112 and stators 111 engaging each other. FIG. 3A is an enlargement 300A of a portion of FIG. 3. FIG. 3B is an enlargement of a portion of FIG. 3A illustrating a portion of the brake stack 126 with the stators 111 and rotors 112 engaging each other and with friction material 112A being somewhat worn from the rotors.

Referring to FIG. 3B, friction material 112A has been worn from the rotors 112 provided, of course, that the end 115E of the engagement portion 115F has been applied to the first stator 111 of the brake stack 126 for some time as wear is not instantaneous. Rather, as illustrated in FIG. 3B, the wear has occurred at the end of the braking cycle. Still referring to FIG. 3B, the distance between stators 111 is indicated as reference numeral 141. FIG. 1B is an enlargement of a portion 100B of FIG. 1A illustrating a portion of the brake stack 126 with the stators 111 and the rotors 112 engaging each other and with friction material 112A residing on the rotors 112 and without any wear of the friction material. FIG. 1A illustrates the engaged state of the rotors 112 and the stators 111 with no wear and with the brake mechanism 195 and the planetary gear set 196 being in a new and never actuated condition. No wear is shown on friction material 112A and the distance between a pair of adjacent stators is indicated by reference numeral 140 as illustrated in FIG. 1B. The distance represented by reference numeral 140 in FIG. 1B is greater than the distance represented by reference numeral 141 in FIG. 3B. FIG. 3C is an enlargement of a portion 300A of FIG. 3A illustrating the wear adjuster 127 moved by actuation of the service piston 115 to another position 191 due to some wear of friction material 112A from the rotors 112 in the brake stack 126. Very little wear, but some wear, of the friction material would be illustrated for just a single actuation of the service piston 115. FIG. 3C further illustrates the end 115E of the engagement portion 115F of the service piston 115 in engagement with the brake stack 126 and, in particular, with the surface 111S of the adjacent stator 111. Due to the magnitude of movement of the wear adjuster from line 190 to line 191, FIG. 3C illustrates the wear which would occur for numerous repeated actuations of service piston 115 and not just one actuation. However, FIG. 3C and line 191 are being used to explain movement of the wear adjuster for one actuation of the service piston and for the purpose of describing the sequential application of the service piston 115.

FIG. 4 is a cross-sectional view 400 illustrating the hub 108, spindle/fixed housing 109, motor mounting plate 118, wear adjuster 127, parking piston 113, service piston 115 and brake stack 126 with the parking piston 113 and service piston 115 not actuated, and with some wear of friction material on the rotors 112, with the brake stack rotors 112 and stators 111 engaging each other, and further illustrating the spring 116 return of the service piston 115 in its not actuated or un-actuated position. FIG. 4 illustrates the position of the service piston 115 when it is repositioned after having been actuated as illustrated in FIG. 3. FIG. 4A is an enlargement of a portion 400A of FIG. 4. FIG. 4B is an enlargement of a portion 400B of FIG. 4A illustrating a portion of the brake stack 126 with the stators 111 and rotors 112 engaging each other and with some friction material being worn from the rotors 112 and with the parking piston 113 and service piston 115 not actuated, and FIG. 4B being essentially the same view as FIG. 3B. FIG. 4C is an enlargement of a portion 400C of FIG. 4A illustrating the wear adjuster moved to a different position 191 with respect to FIG. 1C due to the wear of the friction material on the rotor 112, and, the repositioning of the service piston 115 by the spring 116 of the wear adjuster 127. As stated previously, FIG. 4B is to be compared to FIG. 1B, for example. The distance represented by reference numeral 141 in FIG. 4B is less than the distance represented by reference numeral 140 in FIG. 1 illustrating wear which occurs over numerous actuations. FIG. 4C illustrates the repositioning of the wear adjuster 127 to the location indicated by reference numeral 191 on the cylindrical portion 118C of the plate 118. Cavity 125 is slightly larger in FIG. 3C as compared to FIG. 1.

The service braking is combined with the parking brake on the input side of the device and, to accomplish this, heat must be absorbed and removed when the brake is engaged and when the brake is in the process of being intermittently applied. One example of the service piston is illustrated in the context of a two stage 105, 106 planetary gearbox with a ring gear output 107. Cover 179 closes off the gearbox. The gearbox operates by taking a rotational input from the motor shaft 101 which is coupled to a coupling 102, which in turn, is coupled to the input shaft 103 of the gearbox. The input shaft 103 includes an input sun gear 104 and motion of the input sun gear 104 is transmitted through an input planetary stage 105 and an output planetary stage 106. These planetary stages 105, 106 transmit motion to the ring gear 107 which is rigidly connected 107A to hub 108. The vehicle's wheel is attached to the hub 108. When transmitting rotational speed through planetary stages 105, 106, the motor shaft 103 speed is reduced and the motor shaft torque is increased by the same ratio.

Service piston 115 is housed in the spindle/fixed housing 109 which is connected to the frame of the vehicle. Main wheel bearings 110, 110A are mounted on the outer part of the spindle/fixed housing 109 and these bearings support hub 108. Since the vehicle's wheel is rigidly attached to the hub 108, the main wheel bearings 110, 110A support any loading imparted by the vehicle's wheel to the gearbox assembly.

The brake mechanism 195 includes a plurality of stators 111, a plurality of rotors 112, a parking piston 113, a plurality of parking piston springs 114, a service piston 115, a wear adjuster 127 which includes a return spring 116 which repositions the service piston 115 after engagement with the brake stack 126, and a motor mounting plate 118. The motor mounting plate 118 substantially closes off the substantially cylindrical inner portion 118C of the fixed housing 109. The motor mounting plate 118 is sometimes just referred to herein as the plate 118. The plate 118 includes a flange portion 118F and a cylindrical portion 118C extending partially within the substantially cylindrical inner portion 199 of the fixed housing 109.

The brake mechanism 195 also includes a generally cylindrically shaped parking piston 113 which extends 360° around the outer circumference of the service piston 115. A plurality of springs 114 reside in receptacles 114C. The receptacles 114C extend 360° around the generally cylindrically shaped parking piston. The springs 114 apply force to the parking piston 113 which in turn applies a force to the brake stack 126 comprising alternating rotors 112 and stators 111. The stators 111 are coupled to the spindle/housing 109 and the rotors are coupled to the coupling 102. Friction material 112A can be on either the rotor 112 or stator 111 and the friction material is specially designed to prevent relative motion between the rotor and stator surfaces when a force is applied to the brake stack. By preventing motion between the rotors and stators, the coupling 102 is locked to the spindle/housing 109 which prevents any motion from taking place in the planetary wheel drive.

FIG. 2 is a cross-sectional schematic view 200 illustrating the hub 108, spindle/fixed housing 109, motor mounting plate 118, wear adjuster 127, parking piston 113, service piston 115 and brake stack 126 with the parking piston 113 and the service piston 114 not actuated, and with a second example of brake stack rotors 112S, and with the brake stack rotors 112S and stators 111 engaging each other. FIG. 2A is an enlargement of a portion 200A of FIG. 2. FIG. 2B is an enlargement of a portion 200B of FIG. 2A illustrating a portion of the brake stack 126 with the stators 111 and rotors 112S illustrated engaging each other. FIG. 2B also illustrates friction material 212A applied to rotors 112S. The friction material 212A is not continuously applied in FIG. 2B as compared to FIGS. 1B, 3B and others. Rather, the friction material 212A is illustrated in squares and/or partial squares. The friction material may be the material of Miba Hydramechanica of Sterling Heights, Mich. Reference numeral 112S represents the rotor or, more specifically, the core plate 112S. Core plate 112S is carbon steel 1035-1080. Reference numeral 212C indicates a coating applied to the rotor 112S and friction material 212A is Miba MF 724. FIG. 2C is an enlargement 200C of a portion of FIG. 2A illustrating the wear adjuster 127 press-fit 127P on a cylindrical portion 118C of the motor mounting plate 118 and also illustrating a guide line 190 for the initial location of the wear adjuster 127.

FIG. 2D is a side view 200D of a second example of a rotor 112S with friction material 212A applied thereto in the shape of squares or partial squares. FIG. 2D also illustrates teeth 213, 214 and a land 215 on the inner circumference of the rotor plate 112S which correspond to surfaces on coupling 102. Rotors 112 have may have a similar configuration 171 on the inner circumference for mounting on coupling 102. FIG. 2E is a cross-sectional view 200E of the rotor 112S taken along the lines 2E-2E illustrated in FIG. 2D. FIG. 2F is an enlargement of a portion 200F of FIG. 2E illustrating friction material 212A applied to the rotor 112S. FIG. 2G is a side view 200G of a stator 111 illustrating raised surfaces 216 which interfit within corresponding contours 199A as illustrated in FIGS. 2B, 1B, 3B and others. Lands 217 are circumferential segments of the stator plate 111. FIG. 2H is a front view 200H of stator 111 illustrated in FIG. 2G which demonstrates the thickness of the stator 111 which facilitates the absorption of heat as indicated previously herein.

Figure 1D:
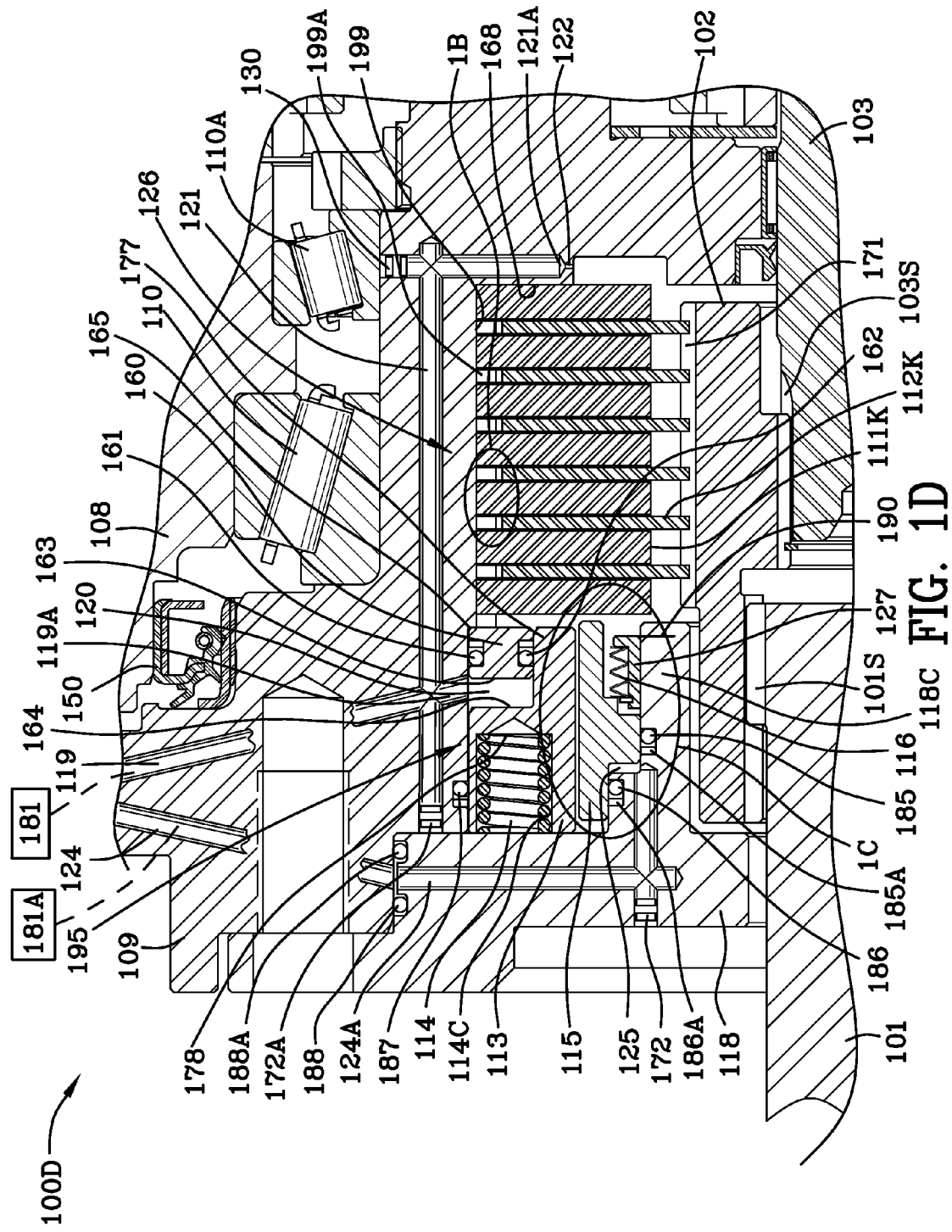
FIG. 1D is a cross-sectional schematic view illustrating the hub, spindle, fixed housing, motor mounting plate, wear adjuster, parking piston, service piston and brake stack with the parking brake and the service brake not actuated, and with the brake stack rotors and stators illustrated engaging each other, and with friction material residing on the stators, and with no wear of the friction material of the stators.
Figure 1E:
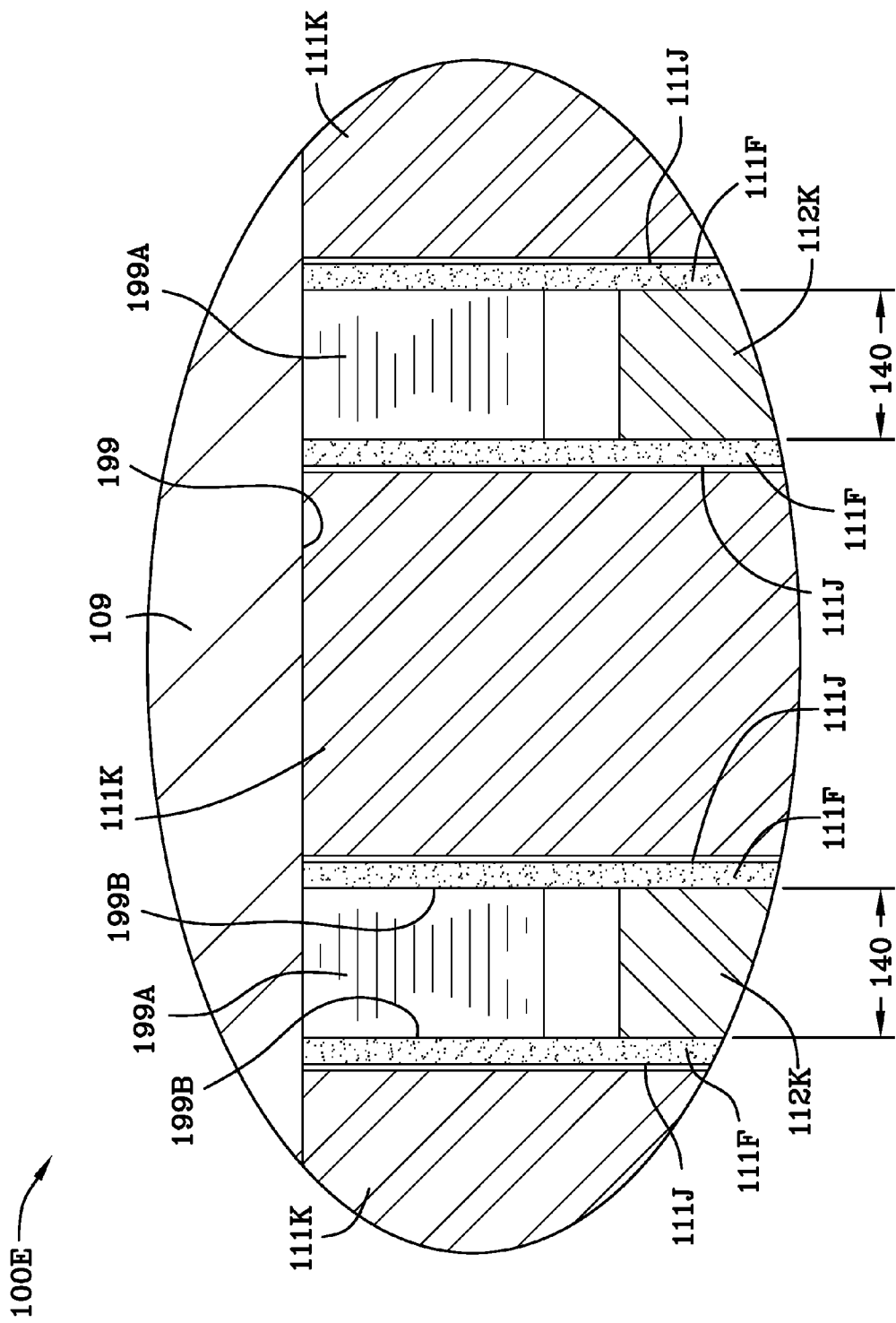
FIG. 1E is an enlargement of a portion of FIG. 11).

FIG. 1D is a cross-sectional schematic view 100D illustrating the hub, spindle, fixed housing, motor mounting plate, wear adjuster, parking piston, service piston and brake stack with the parking brake and the service brake not actuated, and with the brake stack rotors 112K and stators 111K illustrated engaging each other, and with friction material 111A residing on the stators, and with no wear of the friction material of the stators. FIG. 1E is an enlargement 100E of a portion of FIG. 1D and illustrates friction material 111F affixed to an interposing layer 111J which, in turn, is affixed to stator 111K. Reference numeral 199B indicates the inter-engagement of the stators and rotors. FIG. 1F is a side view 100F of another example of a stator 111N with friction material 111L residing on the stator. Lands 147 and raised areas 146 are used to secure the plate in the housing 109. FIG. 1G is a front view 100G of the stator 111N with friction material 111L applied thereto in the shape of squares or partial squares.

Figure 5A:
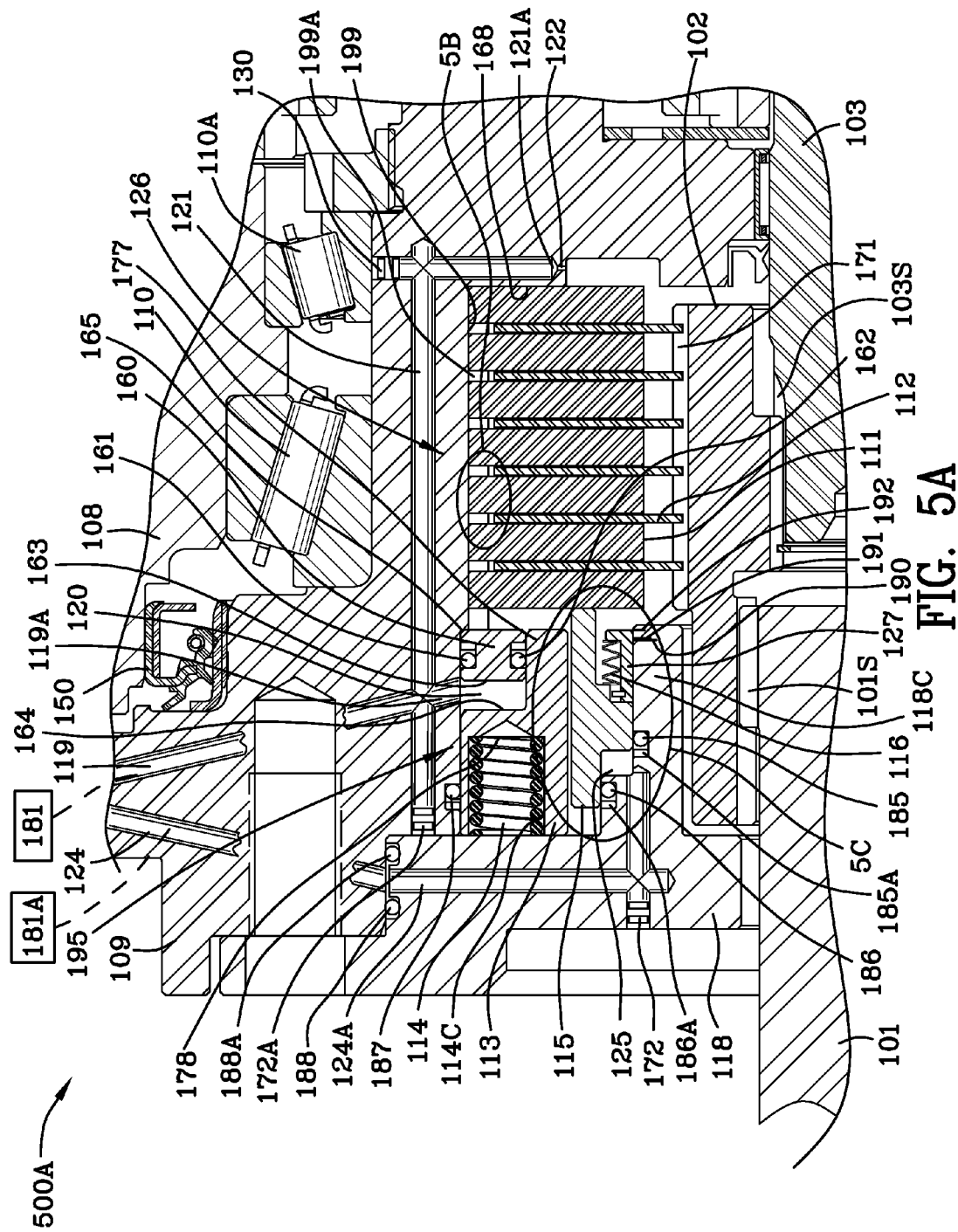
FIG. 5A is an enlargement of a portion of FIG. 5.
Figure 5B:
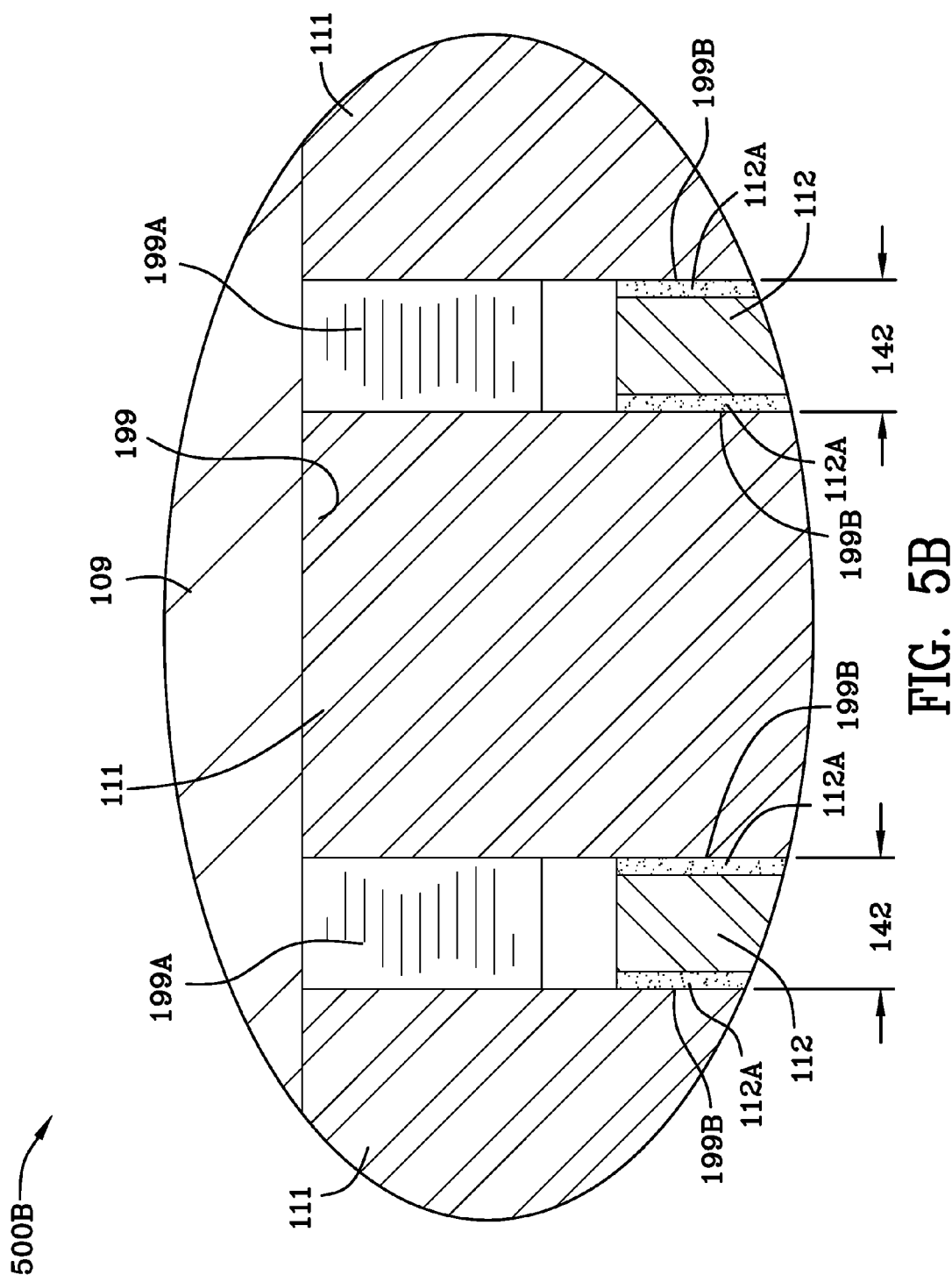
FIG. 5B is an enlargement of a portion of FIG. 5A illustrating a portion of the brake stack with the stators and the rotors engaging each other and with friction material being substantially worn from the rotors.
Figure 5C:
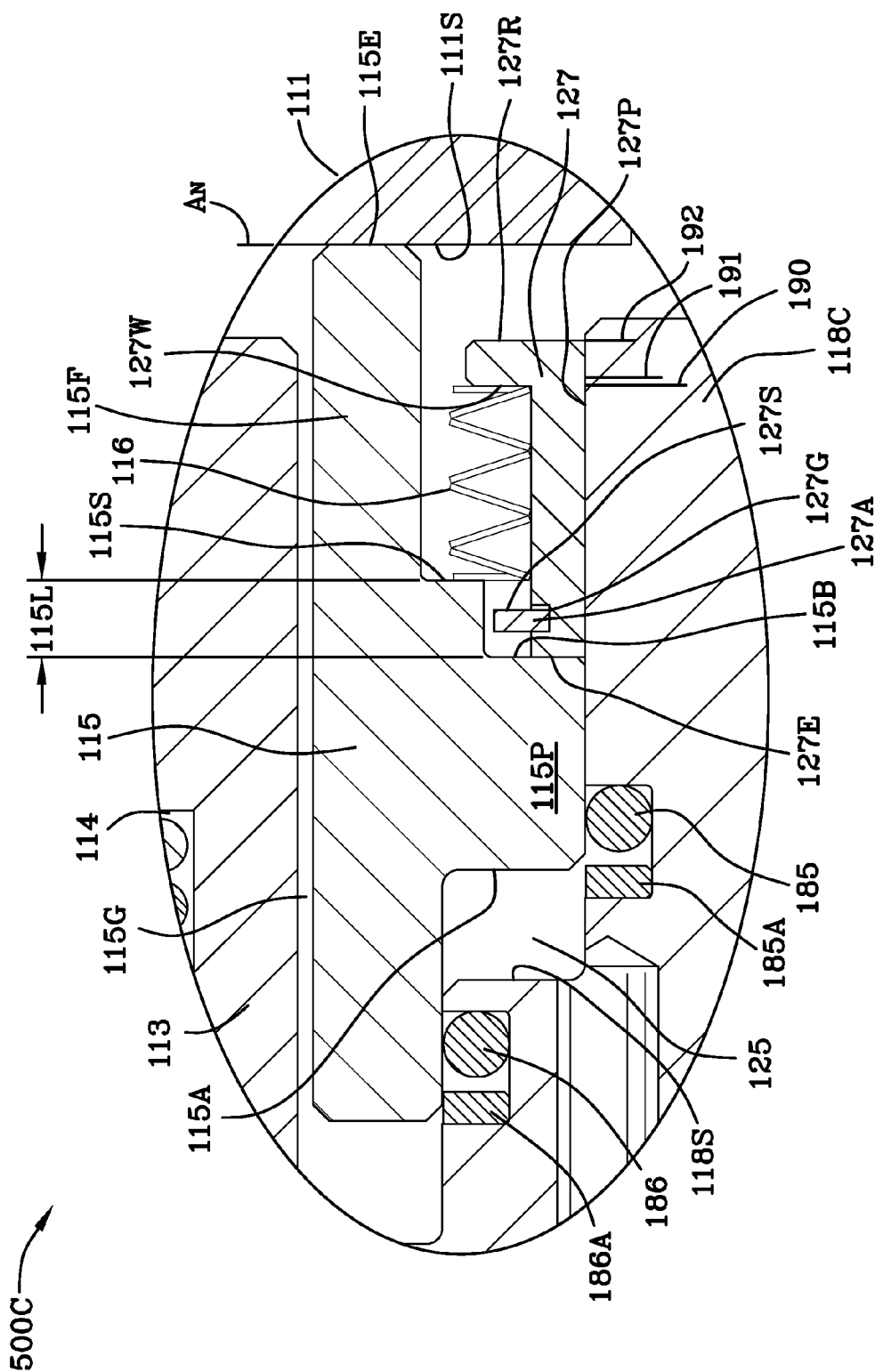
FIG. 5C is an enlargement of a portion of FIG. 5A illustrating the wear adjuster moved to a different position with respect to FIGS. 1C and 3C due to substantial wear of friction material from the rotors.

FIG. 5 is a cross-sectional schematic view 500 illustrating the huh 108, spindle/fixed housing 109, motor mounting plate 118, wear adjuster 127, parking piston 113, service piston 115 and brake stack 126 with the parking piston 113 not actuated and with the service piston 115 actuated, and with substantial wear of the friction material 112A of the rotors 112 with the brake stack rotors 112 and stators 111 illustrated engaging each other. FIG. 5A is an enlargement of a portion 400A of FIG. 5. FIG. 5B is an enlargement of a portion 500B of FIG. 5A illustrating a portion of the brake stack 126 with the stators 111 and the rotors 112 engaging each other and with friction material being substantially worn from the rotors. FIG. 5C is an enlargement of a portion 500C of FIG. 5A illustrating the wear adjuster 127 moved to position 192 with respect to the position of the wear adjuster as shown in FIGS. 1C, 2C, 3C, and 4C due to substantial wear of friction material 112A, 212A from the rotors 112, 112S. Referring to FIGS. 3C and 5C, it will be noticed that the piston cavity in FIG. 3C is smaller than the piston cavity in FIG. 5C due to the substantial wear of the friction material 112A, 212A from the rotors 112, 112S. Only one rotor, either rotor 112 or rotor 112S is used. Additionally, if the friction material is instead applied to stator 111 the same principles described herein as to wear of friction material and operation of the brake mechanism 195 and planetary gear set 196 apply.

Figure 6A:
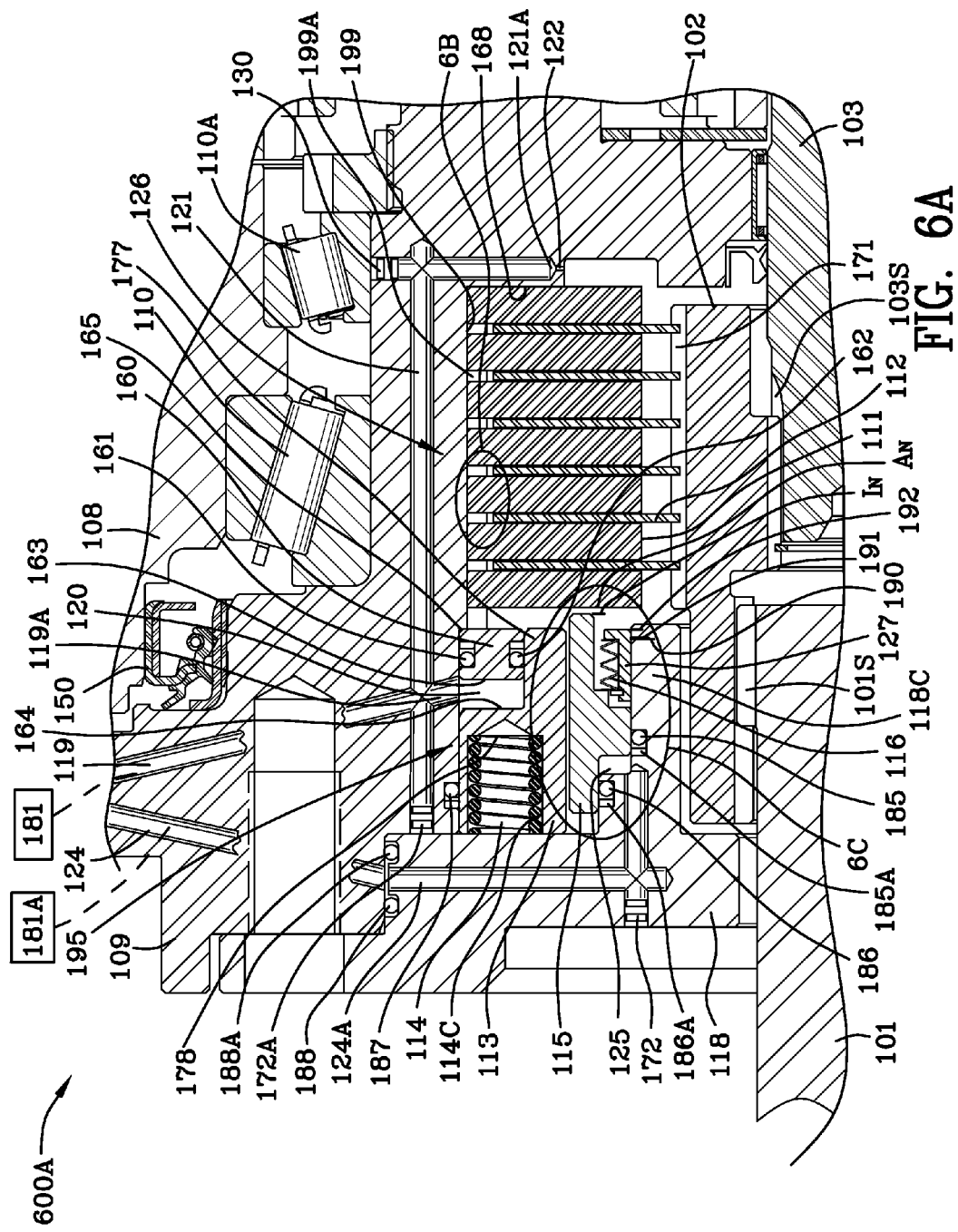
FIG. 6A is an enlargement of a portion of FIG. 6.
Figure 6B:
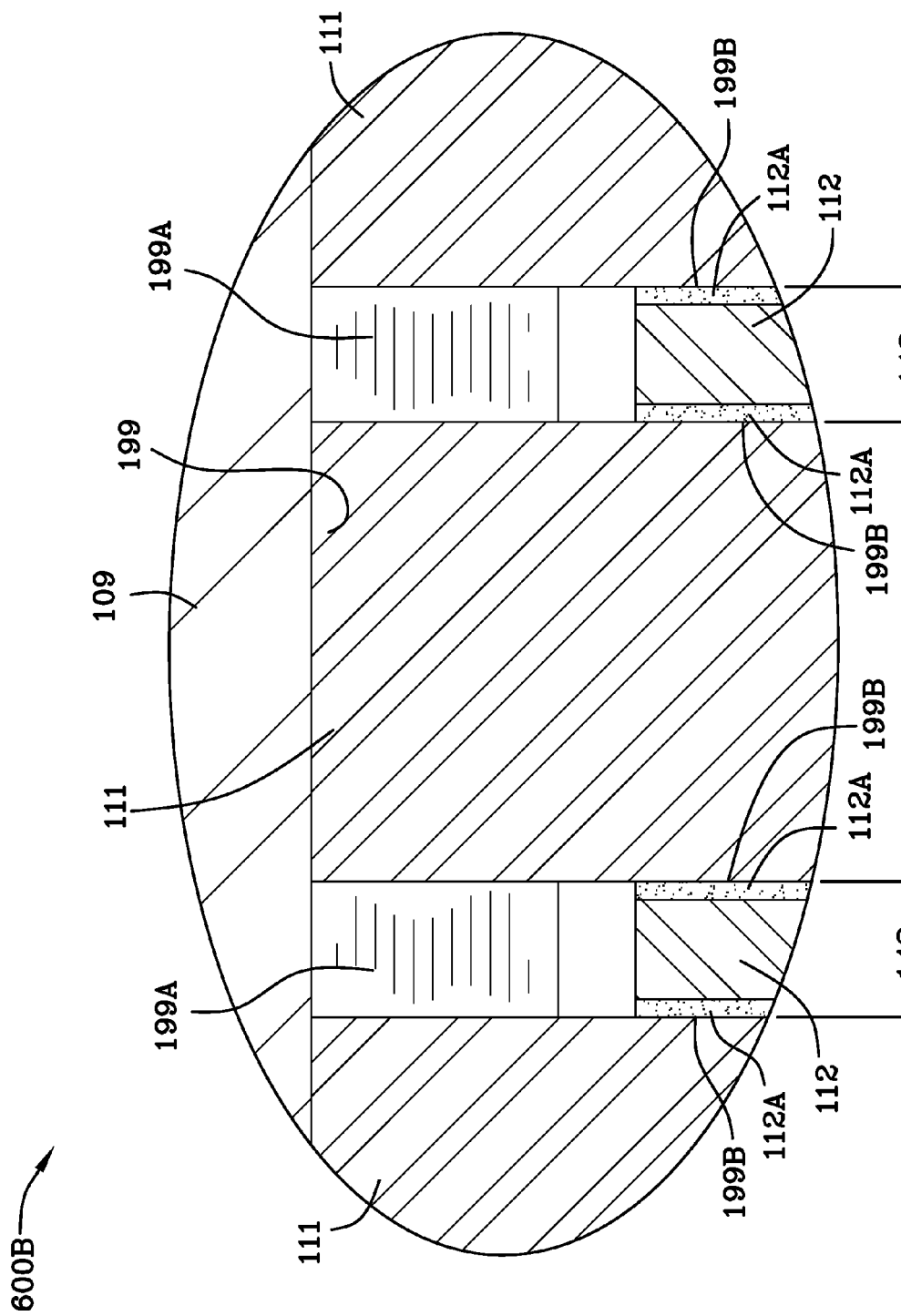
FIG. 6B is an enlargement of a portion of FIG. 6A illustrating a portion of the brake stack with the stators and rotors engaging each other and with friction material being substantially worn from the rotors, FIG. 6B being essentially the same view as FIG. 5B.

Referring to FIG. 5B, substantial wear of friction material 112A is illustrated and reference numeral 142 is used to illustrate the thickness of the rotor with friction material 112A worn such that the distance 142 is less than the distance 141 illustrated in FIG. 4B. The summation of all the wear of all the friction material of the rotors, as measured from the standpoint of thickness, from the condition indicated in FIGS. 3B and 4B as compared to the condition indicated in FIGS. 5B and 6B is equal to the distance between lines 191 and 192 as indicated in FIGS. 5B and 6B.

Referring to FIG. 5C, it is specifically contemplated that a sensor means may be applied to the wear adjuster and/or the cylindrical portion 118C of the plate so as to inform (electronically) or annunciate (i.e., through sound) to the operator of the vehicle that there is a need to replace the rotors and/or the stators due to substantial wear. Any type of sensor may be used to detect position such as a Hall effect sensor, capacitance type, LVDT, or Reed switch.

Figure 6C:
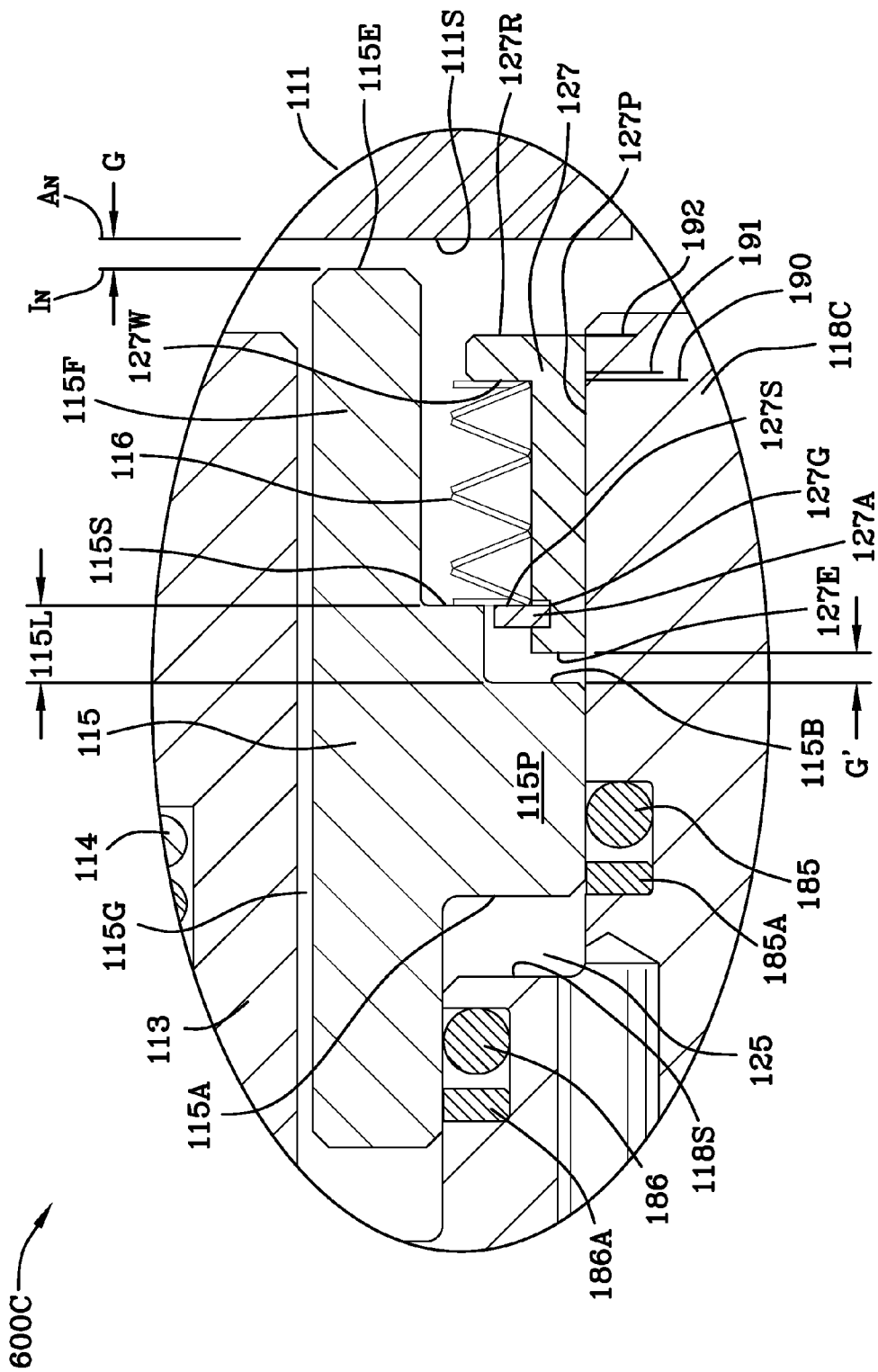
FIG. 6C is an enlargement of a portion of FIG. 6A illustrating the wear adjuster moved to a different position with respect to FIGS. 1C and 3C due to substantial wear of friction material from the rotors, and illustrating the repositioning of the service piston by the spring of the wear adjuster.

FIG. 6 is a cross-sectional schematic view 600 illustrating the hub 108, spindle/fixed housing 109, motor mounting plate 118, wear adjuster 127, parking piston 113, service piston 115 and brake stack 126 with the parking piston 113 and service piston 115 not actuated, and with substantial wear of the frictional material 112A, 212A of the rotors 112, 112S, and with the brake stack rotors 112 and stators 111 engaging each other. FIG. 6A is an enlargement of a portion 600A of FIG. 6. FIG. 6B is an enlargement of a portion 600B of FIG. 6A illustrating a portion of the brake stack 126 with the stators 111 and rotors 112 engaging each other and with friction material 112A being substantially worn from the rotors, FIG. 6B being essentially the same view as FIG. 5B. FIG. 6C is an enlargement of a portion of FIG. 6A illustrating the wear adjuster 127 moved to a different position 192 with respect to FIGS. 1C and 3C due to substantial wear of friction material 112A from the rotors 112, and illustrating the repositioning of the service piston by the spring 116 of the wear adjuster 127.

Figure 7:
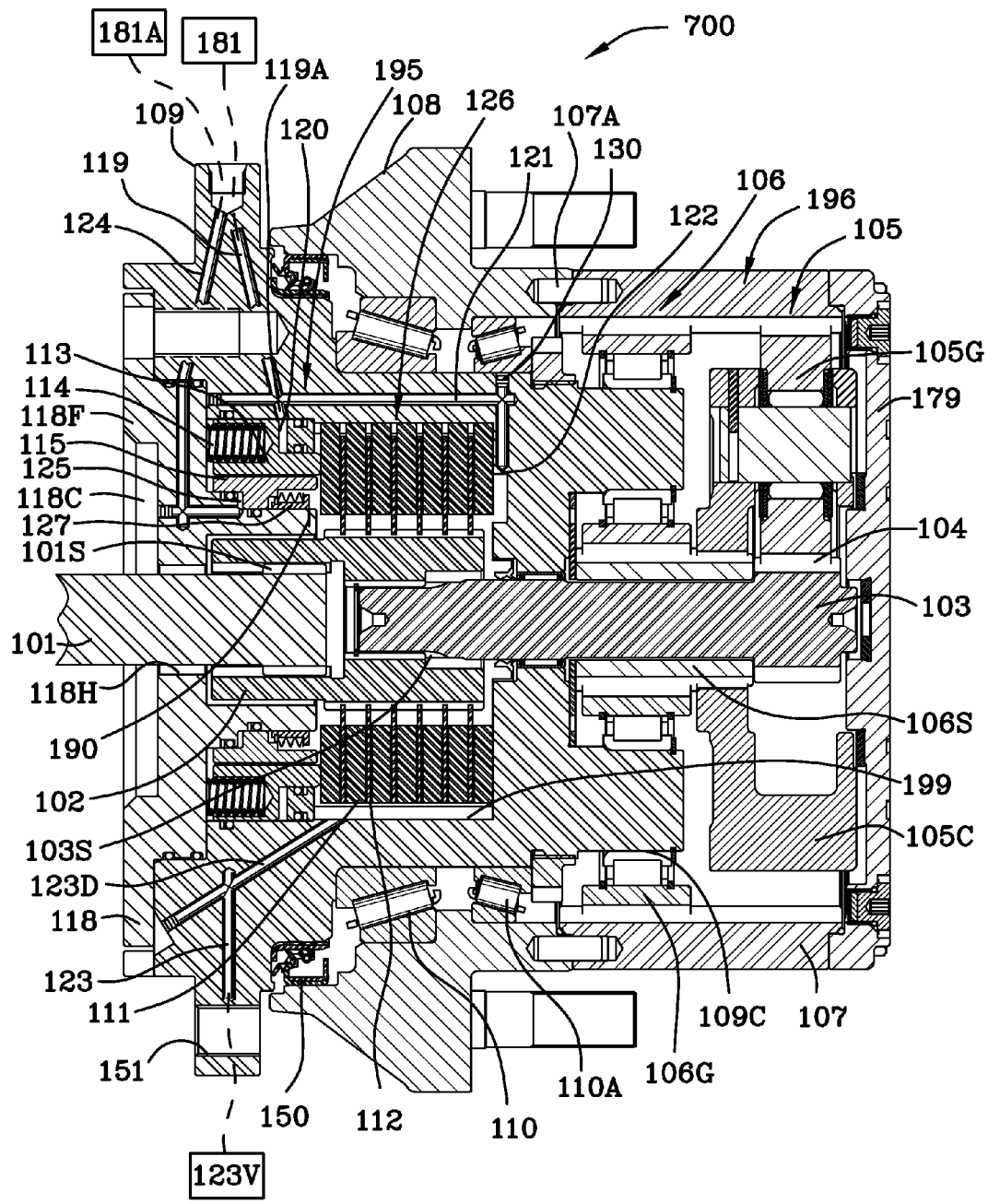
FIG. 7 is a cross-sectional schematic view illustrating the hub, spindle, fixed housing, motor mounting plate, wear adjuster, parking piston, service piston and brake stack with the parking piston actuated and with sue service piston not actuated, and with no wear of the friction material of the rotors, and with the brake stack rotors and stators engaging each other.
Figure 7B:
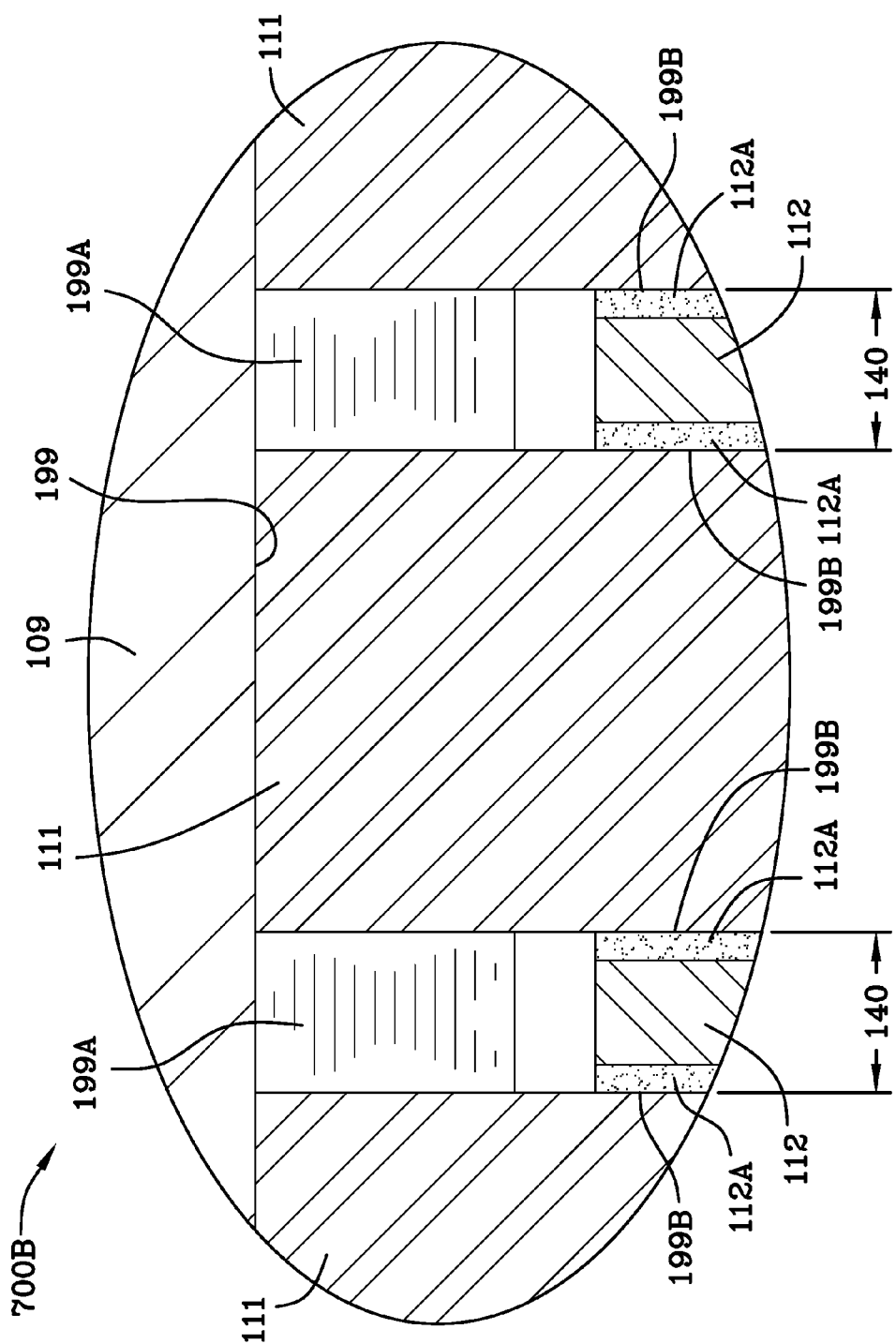
FIG. 7B is an enlargement of a portion of FIG. 7A.

FIG. 7 is a cross-sectional schematic view 700 illustrating the hub 108, spindle/fixed housing 109, motor mounting plate 108, wear adjuster 127, parking piston 113, service piston 115 and brake stack 126 with the parking piston 113 actuated and with the service piston 115 not actuated, and with no wear of the friction material of the rotors 112, and with the brake stack 126 rotors and stators engaging each other. FIG. 7A is an enlargement of a portion 700A of FIG. 7. FIG. 7B is an enlargement of a portion 700B of FIG. 7A. Brake mechanism 195 includes a parking piston 113 which is substantially cylindrically shaped and concentric with the service piston. Parking piston 113 includes a spring 114, a spring cavity 114C and a brake stack engagement portion 177. Spring 114 resides in the spring cavity 114C and is operable between said flange portion 118F of the plate and a wall 178 within the spring cavity 114C. Parking piston 113 slidingly engages the substantially cylindrical inner portion 199 of the fixed housing 109. A cavity end piece 160 is restrained from movement in one direction by a shoulder 165 of the fixed housing. Parking piston 113 includes a pressure actuation surface 164 and the cavity end piece 160 includes a pressure actuation surface 163. Pressure actuation surface 164 of parking piston 113, and the pressure actuation surface 163 of the cavity end piece 160, form a pressure cavity 120 therebetween. When pressure cavity 120 is pressurized, parking piston engagement portion 177 is not in engagement with brake stack 126, and, when pressure cavity 120 is not pressurized the parking piston engagement portion 177 engages the brake stack and the plurality of stators 111 and said plurality of rotors 112 engage each other prohibiting rotation of coupling 102 with respect to fixed housing 109. Seals 161, 162 prevent the escape of oil around stop 160. Seal 187 also functions to seal cavity 120. Seals 188, 188A seal the interface between the fixed housing and the plate 118 and allow fluid communication through passageways 124, 124A without leakage. Still referring to FIG. 7A, seal 150 prevents unwanted intrusion of debris etc. into the main bearings 110, 110A.

With no pressure applied to piston cavity 120, springs 114 apply force to the parking piston 113 which in turn applies a force to stack 126 of alternating rotors 112 and stators 111. The stators are coupled to the spindle/housing 109 and the rotors are coupled to the coupling 102. Friction material can be on either the rotor or stator. The friction material is specially designed to prevent relative motion between the rotor and stator surfaces when a force is applied to the brake stack 126. By preventing motion between the rotors and stators, the coupling 102 is locked to the spindle 109 which prevents any motion from taking place in the planetary wheel drive.

To release the parking brake, hydraulic charge pressure (usually 300-500 psi) is applied to the parking release port/fourth passageway 119, 119A which pressurizes cavity 120 and imparts a force on the parking piston 113 that compresses springs 114 and allows the rotors 112 and stators 111 to separate into the condition illustrated in FIGS. 8 and 8A allowing coupling 102 to rotate and impart motion through the system.

Fixed housing 109 includes a fourth passageway 119, 119A therethrough for applying pressure to parking piston cavity 120. Fourth passageway 119, 119A in the fixed housing is in communication with the pressurized hydraulic oil source controls 181 and the parking piston pressure cavity 120.

FIG. 8 is a cross-sectional schematic view 800 illustrating the hub 108, spindle/fixed housing 109, motor mounting plate 118, wear adjuster 127, parking piston 113, service piston 115 and brake stack 126 with the parking piston 113 not actuated and with the service piston 115 not actuated, and with no wear of the friction material of the rotors 112, and with the stators 111 and the rotors 112 of the brake stack 126 illustrated as residing loosely in the brake housing, which is the normal operating state of the brake stack 126 when neither the service piston 115 nor the parking piston 113 are actuated. FIG. 8A is an enlargement of a portion 800A of FIG. 8 which illustrates gaps 812G between the friction material 112A and the stator 111.

Figure 9:
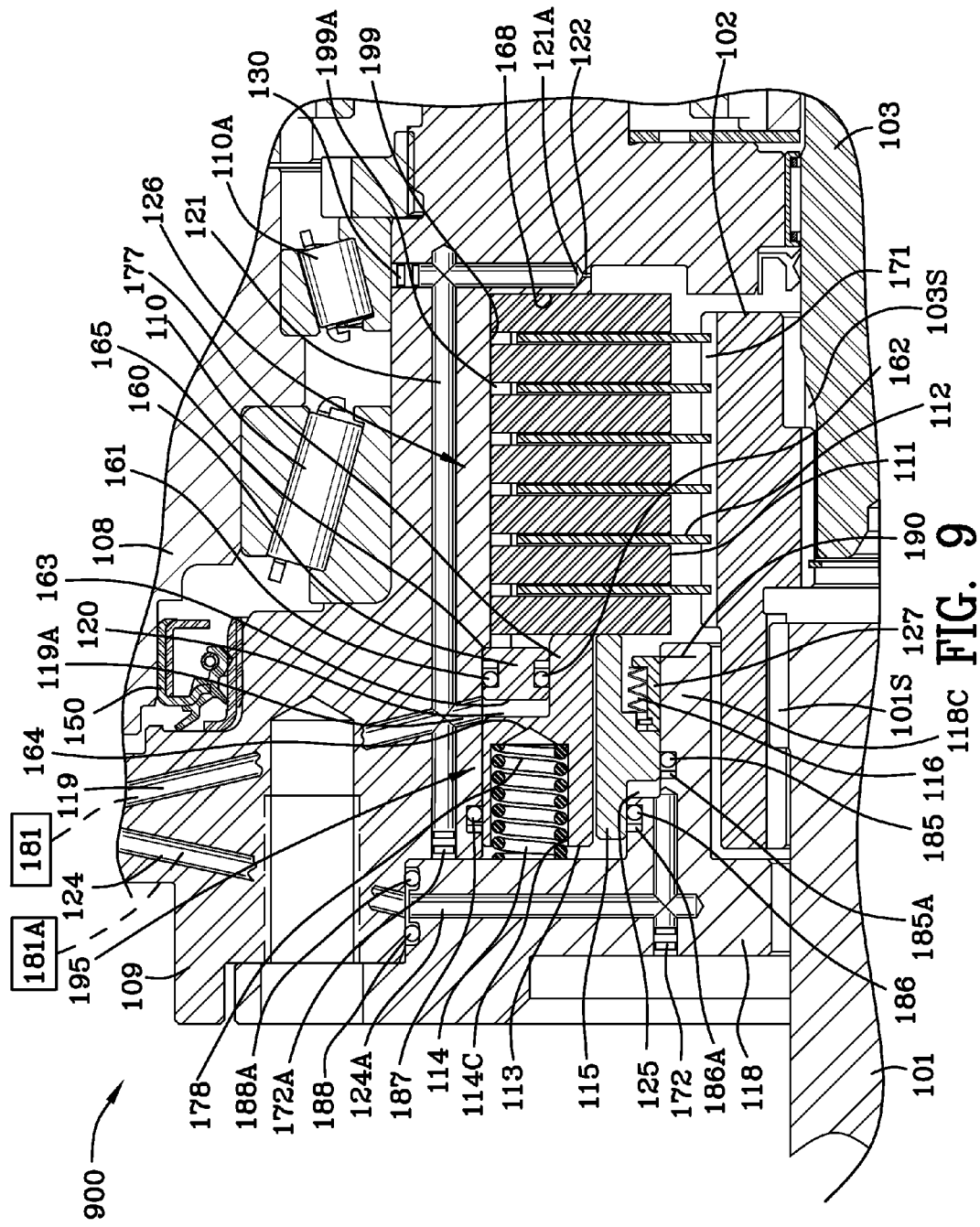
FIG. 9 is a cross-sectional schematic view illustrating the huh, spindle, fixed housing, motor mounting plate, wear adjuster, parking piston, service piston and brake stack with the parking piston actuated and with the service piston actuated, and with no wear of the friction material of the rotors.

FIG. 9 is a cross-sectional schematic view 900 illustrating the hub 108, spindle, fixed housing 109, motor mounting plate 118, wear adjuster 127, parking piston 113, service piston 115 and brake stack 126 with the parking piston 113 actuated and with the service piston 115 actuated, and with no wear of the friction material of the rotors 112.

REFERENCE NUMERALS

100—cross-sectional view illustrating the hub, spindle, motor mounting plate, wear adjuster, parking piston, service piston, brake stack and planetary gear set with the parking brake and the service piston not actuated, and with the brake stack rotors and stators illustrated engaging each other, and with no wear on the friction material of the rotors
100A—an enlargement of a portion of FIG. 1
100A—an enlargement of a portion of FIG. 1
100B—an enlargement of a portion of FIG. 1A illustrating a portion of the brake stack with the stators and the rotors engaging each other and with friction material residing on the rotors
100C—an enlargement of a portion of FIG. 1A illustrating the wear adjuster press fit on the motor mounting plate and also illustrating a guide line for the initial location of the wear adjuster
100D—cross-sectional schematic view illustrating the hub, spindle, fixed housing, motor mounting plate, wear adjuster, parking piston, service piston and brake stack with the parking brake and the service brake not actuated, and with the brake stack rotors and stators illustrated engaging each other, and with friction material residing on the stators, and with no wear of the friction material of the stators.
100E—an enlargement of a portion of FIG. 1D.
100E—a side view of another example of a stator with friction material residing on the stators.
100G—front view of the stator with friction material applied thereto in the shape of squares or partial squares.
101—motor shaft
101S—spline
102—coupling
103—input shaft
103S—spline connection between coupling 102 and shaft 103
104—a sun gear of input shaft 103
105—input planetary stage
105G—input planet gears
106—output planetary stage
106G—output planet gears
106S—output sun gears
107—ring gear
107A—rigid connection between ring gear 107 and hub 108
108—hub
109—spindle/fixed housing
109C—cylindrical mounts for output planet gears 106G
110, 110A—bearings supporting hub 108
111—stators
111A—friction material applied to stator
111F—friction material applied to second example of stator
111J—layer between friction material 111F and stator 111K
111K—second example of stator
111N—third example of stator with square shaped friction material 111S—surface of stator 111 in FIG. 1C,
112—rotors
112S—second example of rotor with patterned friction material 112A applied thereto
112A—friction material on rotor 112
112B—friction material on a second example of rotor 112
112K—rotor
113—parking piston sometimes referred to as the parking brake or static brake
114—spring
114C—spring cavity
115—service piston sometimes referred to as the service brake
115A—area of service piston upon which pressure acts
115B—first shoulder on service piston 115
115E—end of service piston 115
115F—engagement portion of service piston
115G—gap between parking brake 113 and service brake 115
115P—piston portion of service piston
115S—second shoulder on the service piston
116—return spring
118—motor mounting plate
118S—shoulder on motor mounting plate 118, pressure acts on this surface to actuate the service brake 115
119, 119A—fourth passageway leading to parking brake piston cavity 120
120—parking piston cavity
119, 121—second passageway in housing 109
121A—discharge end of second passageway 119, 121
122—orifice
123, 123D—third passageway, leading to vacuum pump or suction pump 123V
123V—vacuum pump
124, 124A—first passageway leading to service piston cavity 125
125—service piston cavity
126—stack of alternating rotors 112 and stators 111
127—wear adjuster
127A—snap ring
127E—end surface of wear adjuster 127
127G—groove in the wear adjuster
127P—press fit
127R—right end surface of the wear adjuster 127
127S—side wall of snap rig
127W—wall on the wear adjuster
130—plug in spindle 109
140—gap or spacing between stators 111 when the rotors are new and not worn
146—raised exterior portion of stator
147—land portion of stator
150—seal
151—though-holes for affixation to the vehicle
154—surface
160—cavity end piece
161, 162—seals around the cavity end piece
163—surface of cavity end piece 160 upon which pressure acts for the parking piston/parking brake 113
164—surface of the parking brake/parking piston 113 upon which pressure acts to permit operation of the planetary gear set/transmission
165—shoulder restraining cavity end piece 160 of the parking brake/parking piston 113
168—wall, from which positions $I_0$, $I_N$, $A_0$, and $A_N$ of the service piston are measured
171—spline for rotors
172, 172A—plug in motor mounting plate 118
177—engagement portion 177 of parking piston 113
178—walls within parking piston spring cavity 114C
179—end cap of planetary gear set 196
181—pressurized hydraulic oil fluid source/controls for operation of parking brake and cooling of brake stack 126
181A—pressurized fluid used to operate service piston (closed system)
185, 186—seals for service brake cavity 125
185A, 186A—back up seals for service brake cavity 125
187—parking brake piston seal
188, 188A—brake port seals
190—schematically illustrated scribed line on motor mounting plate which represents the maximum rightward position of the wear adjuster 127 on the motor mounting plate 118
191—schematically illustrated line on motor mounting plate 118 illustrating rightward movement of the wear adjuster 127
195—brake mechanism
196—planetary gear set
199—substantially cylindrical inner portion of housing 109
199A—contours on the cylindrical inner portion of housing 109 for guiding stators and preventing their rotation
199B—engagement of rotors and stators
200—cross-sectional view illustrating the hub, spindle, motor mounting plate, wear adjuster, parking piston, service piston and brake stack with the parking piston and the service piston not actuated, and with a second example of brake stack rotors, with the brake stack rotors and stators engaging each other
200A—an enlargement of a portion of FIG. 2
200B—an enlargement of a portion of FIG. 2A illustrating a portion of the brake stack with the stators and the rotors illustrated engaging each other
200C—an enlargement of a portion of FIG. 2A illustrating the wear adjuster press fit on the motor mounting plate and also illustrating a guide line for the initial location of the wear adjuster
200D—side view of a second example of a rotor with friction material applied thereto in the shape of squares or partial squares
200E—cross-sectional view of the rotor illustrated in FIG. 2D
200F—an enlargement of a portion of FIG. 2E illustrating the friction material applied to the rotor
200G—side view of a stator
200H—front view of the stator illustrated in FIG. 2G
212—second example of stator
212A—squares or portions of squares of frictional material on second example of stator 212
212C—layer between friction material and rotor
213, 214—spline tooth connection of rotor
215—spline tooth connection of rotor
216—raised exterior portion of stator
217—land portion of stator
300—cross-sectional view illustrating the hub, spindle, motor mounting plate, wear adjuster, parking piston, service piston and brake stack with the parking piston not actuated and with the service piston actuated, and with some wear of the friction material on the rotors, and with the brake stack rotors and stators engaging each other
300A—an enlargement of a portion of FIG. 3
300B—an enlargement of a portion of FIG. 3A illustrating a portion of the brake stack with the stators and the rotors engaging each other and with friction material being somewhat worn from the rotors 300C—an enlargement of a portion of FIG. 3A illustrating the wear adjuster on the motor mounting plate moved to another position due to some wear of the friction material of the brake stack 400—cross-sectional view illustrating the hub, spindle, motor mounting plate, wear adjuster, parking piston, service piston and brake stack with the parking piston and service piston not actuated, and with some wear of friction material on the rotors, with the brake stack rotors and stators engaging each other, and further illustrating the spring return of the service piston in its not actuated or un-actuated position, the service piston having been returned by the spring of the wear adjuster.

400A—an enlargement of a portion of FIG. 4

400B—an enlargement of a portion of FIG. 4A illustrating a portion of the brake stack with the stators and rotors engaging each other and with some friction material being worn from the rotors and with the parking piston and service piston not actuated, and FIG. 4B being essentially the same view as FIG. 3B.

400C—an enlargement of a portion of FIG. 4A illustrating the wear adjuster moved to a different position with respect to FIG. 1C due to the wear of the friction material on the rotor, and the repositioning of the service piston by the spring of the wear adjuster 500—cross-sectional view illustrating the hub, spindle, motor mounting plate, wear adjuster, parking piston, service piston and brake stack with the parking piston not actuated and with the service piston actuated, and with substantial wear of the friction material of the rotors with the brake stack rotors and stators illustrated engaging each other 500A—an enlargement of a portion of FIG. 5

500B—is an enlargement of a portion of FIG. 5A illustrating a portion of the brake stack with the stators and the rotors engaging each other and with friction material being substantially worn from the rotors 500C—an enlargement of a portion of FIG. 5A illustrating the wear adjuster moved to a different position with respect to FIGS. 1C and 3C due to substantial wear of friction material from the rotors 600—cross-sectional schematic view illustrating the hub, spindle, fixed housing, motor mounting plate, wear adjuster, parking piston, service piston and brake stack with the parking piston and service piston not actuated, and with substantial wear of the frictional material of the rotors, and with the brake stack rotors and stators engaging each other, and further illustrating the spring return of the service piston in its not actuated or un-actuated position, the service piston having been returned by the spring of the wear adjuster.

600A—an enlargement of a portion of FIG. 6

600B—an enlargement of a portion of FIG. 6A illustrating a portion of the brake stack with the stators and the rotors engaging each other and with friction material being substantially worn from the rotors, FIG. 6B being essentially the same view as FIG. 5B.

600C—an enlargement of a portion of FIG. 5A illustrating the wear adjuster moved to a different position with respect to FIGS. 1C and 3C due to substantial wear of friction material from the rotors, and illustrating the repositioning of the service piston by the spring of the wear adjuster 700—a cross-sectional view illustrating the hub, spindle, motor mounting plate, wear adjuster, parking piston, service piston and brake stack with the parking piston actuated and with the service piston not actuated, and with no wear of the friction material of the rotors, and with the brake stack rotors and stators engaging each other.

700A—an enlargement of a portion of FIG. 7

700B—an enlargement of a portion of FIG. 7A

800—a cross-sectional view illustrating the hub, spindle, motor mounting plate, wear adjuster, parking piston, service piston and brake stack with the parking piston not actuated and with the service piston not actuated, and with no wear of the friction material of the rotors, and with the stators and the rotors of the brake stack illustrated as residing loosely in the brake housing, which is the normal operating state of the brake stack 800A—an enlargement of a portion of FIG. 8

812G—gap between friction material on rotor and stator

900—FIG. 9 is a cross-sectional schematic view illustrating the hub, spindle, fixed housing, motor mounting plate, wear adjuster, parking piston, service piston and brake stack with the parking piston actuated and with the service piston actuated, and with no wear of the friction material of the rotors.

$A_0$—initial another position of service piston $A_N$—another position of service piston G—desired gap between end of service piston 115E and surface 111S of stator 111 in FIG. 1C G'—gap between shoulder 115B and end 127E of wear adjuster 127

$I_{N-1}$—previous home position, $I_0$—initial home position $I_N$—home position $I_0, A_0; I_1, A_1; I_2, A_2; I_3, A_3$; etc—positions of the service piston and brake stack are grouped in pairs It will be understood by those skilled in the art that the invention has been set forth by way of examples only and that the examples are not intended to limit the claims set forth hereinbelow

The invention claimed is:

1. A brake mechanism in combination with a planetary gear set, comprising:
a fixed housing, said fixed housing includes a substantially cylindrical inner portion, and, said brake mechanism residing substantially within said substantially cylindrical inner portion of said fixed housing;
a plate;
said plate includes a flange portion and a cylindrical portion extending partially within said substantially cylindrical inner portion of said fixed housing;
said flange portion of said plate substantially encloses said substantially cylindrical inner portion of said fixed housing;
said brake mechanism includes a coupling;
a motor shaft driven by a motor;
said planetary gear set includes a rotating input drive and a rotating output drive;
said motor shaft affixed to said coupling and said coupling affixed to said rotating input drive;
said brake mechanism includes a service piston and a brake stack;
said brake stack includes a plurality of stators and a plurality of rotors, said plurality of rotors are interleaved with said stators, and, each of said plurality of rotors resides interleaved between a pair of proximate stators;
said rotors are affixed to said coupling and rotate therewith;
each of said rotors includes friction material affixed thereto;
said stators are affixed to said fixed housing;
said rotating input drive imparting rotating input motion to said planetary gear set driving said rotating output drive of said planetary gear set, said output drive of said planetary gear set being rotatable with respect to said fixed housing;

said service piston includes a brake stack engagement portion, a piston portion, a first shoulder, a second shoulder and a piston cavity;

said piston cavity of said service piston formed by said piston portion of said service piston and said cylindrical portion of said plate;

said service piston movable between an initial home position and another position;

said service piston being in said initial home position wherein said service piston is not actuated, and, said plurality of rotors and said plurality of stators are not engaged with each other;

said another position being determined according to the wear of said brake stack, said initial another position being determined with no wear of said brake stack and before any actuation of said service piston;

said service piston being in said another position when said service piston is actuated and said engagement portion of said service piston engages said brake stack forcing said plurality of rotors and said plurality of stators into engagement with each other;

said engagement portion of said service piston spaced apart from said brake stack by a distance, G, when said engagement portion of said service piston is in said initial home position;

said distance, G, being the distance between said engagement portion of said service piston in said initial home position and said initial another position;

a wear adjuster, said wear adjuster includes: a groove, a snap ring, said snap ring residing in said groove, a wall, a spring, said spring resides between said wall of said adjuster and said snap ring, and, said wear adjuster being generally cylindrically shaped;

said generally cylindrically shaped wear adjuster being press fit on said cylindrical portion of said plate;

said press-fit of said wear adjuster permitting said wear adjuster to move on said cylindrical portion of said plate in engagement with, and under the force of, said piston portion of said service piston;

during actuation and movement of said service piston to said another position: said first shoulder of said piston portion of said service piston engages said wear adjuster repositioning said wear adjuster position to accommodate for loss of friction material; said second shoulder of said service piston engages said spring compressing said spring between said second shoulder of said service piston and said wall of said wear adjuster; and, said engagement portion of said service piston forcefully engages said brake stack wherein said plurality of stators and said plurality of rotors engage each other prohibiting rotation of said input drive with respect to said fixed housing;

upon discontinuation of service piston actuation: said spring urges said second shoulder of said service piston in a direction opposite said wall of said wear adjuster and repositions said service piston to a second position due to a loss of friction material; said first shoulder of said service piston disengages said wear adjuster; and, said engagement portion of said service piston is returned to said second position and is spaced a distance, G, from said brake stack when it is next engaged.

2. A brake mechanism in combination with a planetary gear set as claimed in claim 1, wherein:
said spring of said wear adjuster is a wave spring.

3. A brake mechanism in combination with a planetary gear set as claimed in claim 1, wherein:
said cylindrical portion of said plate includes a mark thereon; and, said wear adjuster is initially located on said mark or distally with respect to said mark and said brake stack.

4. A brake mechanism in combination with a planetary gear set as claimed in claim 1, further comprising:
a fluid source, said fluid source being pressurized;
said fixed housing includes a first passageway therethrough;
said plate includes a first passageway in communication with said first passageway of said fixed housing; and,
said first passageway of said plate communicates with said piston cavity of said service piston pressurizing said cavity when said service piston is actuated.

5. A brake mechanism in combination with a planetary gear set as claimed in claim 1, further comprising:
a hydraulic oil source, said hydraulic oil source being pressurized;
said fixed housing includes a second passageway therethrough;
said second passageway includes a discharge end;
said discharge end of said second passageway includes an orifice therein; and,
said hydraulic oil is communicated from said hydraulic oil pressure source through said second passageway and said orifice in said discharge end of said second passageway and into said substantially cylindrical inner portion of said fixed housing.

6. A brake mechanism in combination with a planetary gear set as claimed in claim 4, further comprising:
a hydraulic oil source, said hydraulic oil source being pressurized;
said fixed housing includes a second passageway therethrough;
said second passageway includes a discharge end;
said discharge end of said second passageway includes an orifice therein; and,
said hydraulic oil is communicated from said hydraulic oil pressure source through said second passageway and said orifice in said discharge end of said second passageway and into said substantially cylindrical inner portion of said fixed housing.

7. A brake mechanism in combination with a planetary gear set as claimed in claim 5, further comprising:
said fixed housing includes an exterior;
a vacuum pump;
said fixed housing includes a third passageway;
said third passageway in communication with said vacuum pump; and,
said third passageway communicating hydraulic oil from said substantially cylindrical inner portion of said fixed housing to said vacuum pump.

8. A brake mechanism in combination with a planetary gear set as claimed in claim 6, further comprising:
said fixed housing includes an exterior;
a vacuum pump;
said fixed housing includes a third passageway;
said third passageway in communication with said vacuum pump; and,
said third passageway communicating hydraulic oil from said substantially cylindrical inner portion of said fixed housing to said vacuum pump.

9. A brake mechanism in combination with a planetary gear set as claimed in claim 1, further comprising:

said service piston is generally cylindrically shaped and concentric with said substantially cylindrical portion of said plate; and, said service piston slidingly engages said substantially cylindrical portion of said plate.

10. A brake mechanism in combination with a planetary gear set as claimed in claim 9, further comprising:
said brake mechanism includes a parking piston;
said parking piston being substantially cylindrically shaped and concentric with said service piston;
said parking piston includes a spring, a spring cavity and a brake stack engagement portion;
said spring resides in said spring cavity;
said spring operable between said flange portion of said plate and said spring cavity;
said parking piston slidingly engages said substantially cylindrical inner portion of said fixed housing;
a cavity end piece;
said fixed housing includes a shoulder;
said cavity end piece restrained from movement in one direction by said shoulder of said fixed housing;
said parking piston includes a pressure actuation surface;
said cavity end piece includes a pressure actuation surface;
said pressure actuation surface of said parking piston and said pressure actuation surface of said cavity end piece forming a pressure cavity therebetween; and,
when said pressure cavity is pressurized said parking piston engagement portion is not in engagement with said brake stack, and, when said pressure cavity is not pressurized said parking piston engagement portion engages said brake stack and said plurality of stators and said plurality of rotors engage each other prohibiting rotation of said input drive with respect to said fixed housing.

11. A brake mechanism in combination with a planetary gear set as claimed in claim 8, further comprising:
said brake mechanism includes a parking piston;
said parking piston being substantially cylindrically shaped and concentric with said service piston;
said parking piston includes a spring, a spring cavity and a brake stack engagement portion;
said spring resides in said spring cavity;
said spring operable between said flange portion of said plate and said spring cavity;
said parking piston slidingly engages said substantially cylindrical inner portion of said fixed housing;
a cavity end piece;
said fixed housing includes a shoulder;
said cavity end piece restrained from movement in one direction by said shoulder of said fixed housing;
said parking piston includes a pressure actuation surface;
said cavity end piece includes a pressure actuation surface;
said pressure actuation surface of said parking piston and said pressure actuation surface of said cavity end piece forming a pressure cavity therebetween; and,
when said pressure cavity is pressurized said parking piston engagement portion is not in engagement with said brake stack, and, when said pressure cavity is not pressurized said parking piston engagement portion engages said brake stack and said plurality of stators and said plurality of rotors engage each other prohibiting rotation of said input drive with respect to said fixed housing.

12. A brake mechanism in combination with a planetary gear set as claimed in claim 11, further comprising:
a hydraulic oil source, said hydraulic oil source being pressurized;
said fixed housing includes a fourth passageway therethrough; and,
said fourth passageway in said fixed housing in communication with said hydraulic oil source and said parking piston pressure cavity.

13. A brake mechanism in combination with a planetary gear set as claimed in claim 11, further comprising:
said planetary gear set includes a motor shaft, an input shaft, and a coupling affixed to said motor shaft and to said input shaft transferring the rotary motion of said motor shaft to said input shaft;
said input shaft includes a sun gear;
said planetary gear set includes an input planetary stage and an output planetary stage;
a ring gear and a hub, said ring gear and said hub affixed together;
said input sun gear drives input planet gears which interengage with said ring gear;
and input planet carrier and an output sun gear;
said input planet carrier drives said output sun gear;
said output sun gear drives said output planet gears, said output planet gears mounted on said fixed housing and rotatable with respect to said fixed housing, and, said output planet gears interengaged with said ring gear and driving said ring gear and said hub with respect to said housing; and,
bearings interposed between said hub and said fixed housing enabling said hub to rotate with respect to said fixed housing.

14. A brake mechanism in combination with a planetary gear set as claimed in claim 1, further comprising:
said planetary gear set includes a motor shaft, an input shaft, and a coupling affixed to said motor shaft and to said input shaft transferring the rotary motion of said motor shaft to said input shaft;
said input shaft includes a sun gear;
said planetary gear set includes an input planetary stage and an output planetary stage;
a ring gear and a hub, said ring gear and said hub affixed together;
said input sun gear drives input planet gears which interengage with said ring gear;
an input planet carrier and an output sun gear;
said input planet carrier drives said output sun gear;
said output sun gear drives said output planet gears, said output planet gears mounted on said fixed housing and rotatable with respect to said fixed housing, and, said output planet gears interengaged with said ring gear and driving said ring gear and said hub with respect to said housing; and,
bearings interposed between said hub and said fixed housing enabling said hub to rotate with respect to said fixed housing.

15. A brake mechanism in combination with a planetary gear set, comprising:
a fixed housing, said fixed housing includes a substantially cylindrical inner portion, and, said brake mechanism residing substantially within said substantially cylindrical inner portion of said fixed housing;
a cylindrical member extending partially within said substantially cylindrical inner portion of said fixed housing;
said brake mechanism includes a coupling;
a motor shaft driven by a motor;
said planetary gear set includes a rotating input drive and a rotating output drive;
said motor shaft affixed to said coupling and said coupling affixed to said rotating input drive;
said brake mechanism includes a service piston and a brake stack;

said brake stack includes a plurality of stators and a plurality of rotors, said plurality of rotors are interleaved with said stators, and, each of said plurality of rotors resides interleaved between a pair of proximate stators;
said rotors are affixed to said coupling and rotate therewith;
said stators are affixed to said fixed housing;
said rotating input drive imparting rotating input motion to said planetary gear set driving said rotating output drive of said planetary gear set, said output drive of said planetary gear set being rotatable with respect to said fixed housing;
said service piston includes a brake stack engagement portion,
said service piston and said brake stack engagement portion thereof movable between an initial home position and another position;
said service piston being in said initial home position wherein said service piston is not actuated, and, said plurality of rotors and said plurality of stators are not engaged with each other;
said another position being determined according to the wear of said brake stack, said initial another position being determined with no wear of said brake stack and before any actuation of said service piston;
said service piston being in said another position when said service piston is actuated and said engagement portion of said service piston engages said brake stack forcing said plurality of rotors and said plurality of stators into engagement with each other;
said engagement portion of said service piston spaced apart from said brake stack by a distance, G, when said engagement portion of said service piston is in said initial home position;
said distance, G, being the distance between said engagement portion of said service piston in said initial home position and said initial another position;
a wear adjuster, said wear adjuster being generally cylindrically shaped;
said generally cylindrically shaped wear adjuster being press fit on said cylindrical member;
said press-fit of said wear adjuster permitting said wear adjuster to move on said cylindrical member in engagement with, and under the force of, said service piston;
said wear adjuster includes: a groove and a snap ring residing in said groove, and, a wall;
said wear adjuster includes a spring, said spring resides between said wall of said adjuster and said snap ring;
during actuation and movement of said service piston to said another position: said service piston engages said wear adjuster repositioning said wear adjuster to said another position to accommodate for loss of friction material; said service piston engages said spring compressing said spring between said service piston and said wall of said wear adjuster; and, said engagement portion of said service piston forcefully engages said brake stack wherein said plurality of stators and said plurality of rotors engage each other prohibiting rotation of said input drive with respect to said fixed housing;
upon discontinuation of service piston actuation: said spring urges said service piston in a direction opposite said wall of said wear adjuster and repositions said service piston to second position due to loss of friction material; said service piston disengages said wear adjuster and said service piston is repositioned to said second position; and, said engagement portion of said service piston is returned to said second position and is spaced a distance, G, from said brake stack when it is next engaged.

16. A brake mechanism in combination with a planetary gear set as claimed in claim 15, wherein: friction material resides on said rotors.

17. A brake mechanism in combination with a planetary gear set as claimed in claim 15, wherein: friction material resides on said stators.

18. A brake mechanism in combination with a planetary gear set as claimed in claim 15, wherein said another position changes each time said service piston is actuated.

19. A brake mechanism in combination with a planetary gear set as claimed in claim 1, wherein said another position changes each time said service piston is actuated.

20. A method for operating a brake mechanism in combination with a planetary gear set, comprising the steps of:
arranging a brake stack within a housing, said brake stack includes a plurality of stators and a plurality of rotors, said brake stack having a thickness when said plurality of stators and rotators are in engagement with each other;
affixing said rotors to a rotating input drive such that said rotors rotate with said rotating input drive;
affixing said stators to a fixed housing;
interleaving a plurality of rotors interleaved with said stators such that each of said plurality of rotors resides interleaved between a pair of proximate stators;
positioning a generally cylindrically shaped service piston concentrically around said cylindrical member;
press fitting a wear adjuster on a cylindrical member at a desired location, said wear adjuster includes: a groove, a snap ring residing in said groove, a wall, a spring, said spring resides between said wall of said adjuster and said snap ring, said wear adjuster being generally cylindrically shaped, said press-fit of said wear adjuster permitting said wear adjuster to move on said cylindrical member in engagement with, and under the force of, said service piston;
engaging said service piston with said spring of said wear adjuster defining the home position of said service piston;
defining an initial home position of said service piston before actuation of said service piston;
determining said initial another position of said service piston based upon said brake stack thickness;
rotating an input drive imparting rotating input motion to said planetary gear set driving said rotating output drive of said planetary gear set, said output drive of said planetary gear set being rotatable with respect to said fixed housing;
said initial home position of said service piston is spaced apart from said brake stack by a distance, G, said distance, G, being the distance between said service piston in said initial home position and said service piston in said initial another position;
moving said service piston between an initial home position and another position, said another position of said service piston being determined according to the wear of said brake stack, and, said service piston being in said another position when said service piston is actuated and said service piston engages said brake stack forcing said plurality of rotors and said plurality of stators into engagement with each other;
during actuation and movement of said service piston to said another position: said service piston engages said wear adjuster repositioning said wear adjuster; said service piston engages said spring compressing said spring between said service piston and said wall of said wear adjuster; said service piston moves to said another position; and, said service piston forcefully engages said brake stack wherein said plurality of stators and said plurality of rotors engage each other prohibiting rotation of said input drive with respect to said fixed housing; and, discontinuing actuation of said service piston results in: said spring urges said service piston in a direction opposite said wall of said wear adjuster and repositions said service piston to a new home position; said service piston disengages said wear adjuster; and, said service piston is and is spaced a distance, G, wherein G is the distance from the new home position of said service piston to said another position of said service piston at the end of the previous brake actuation.

21. A method for operating a brake mechanism in combination with a planetary gear set as claimed in claim 20 wherein:

said another position changes each time said service piston is actuated due to loss of said friction material; and, said home position changes each time said service piston is actuated due to loss of said friction material.

22. A method for operating a brake mechanism in combination with a planetary gear set, comprising the steps of:

arranging a brake stack within a housing, said brake stack includes a plurality of stators and a plurality of rotors;

affixing said rotors to a rotating input drive such that said rotors rotate with said rotating input drive;

affixing said stators to a fixed housing;

interleaving a plurality of rotors interleaved with said stators such that each of said plurality of rotors resides interleaved between a pair of proximate stators, said rotors or stators include friction material affixed thereto;

press-fitting a wear adjuster on a cylindrical member to a pre-set location on said cylindrical member, said wear adjuster includes: a groove, a snap ring residing in said groove, a wall, a spring, said spring resides between said wall of said adjuster and said snap ring, said wear adjuster being generally cylindrically shaped, said press-fit of said wear adjuster permitting said wear adjuster to move on said cylindrical member in engagement with, and under the force of, said service piston;

engaging and positioning said service piston with said spring of said wear adjuster to an initial position, $I_0$;

spacing apart said service piston from said brake stack by a distance, G, according to said pre-set location of said wear adjuster on said cylindrical member and the brake stack thickness when said rotors and stators are in engagement, rotating an input drive imparting rotating input motion to said planetary gear set driving said rotating output drive of said planetary gear set, said output drive of said planetary gear set being rotatable with respect to said fixed housing;

moving said service piston between said initial position, $I_0$, wherein said service piston abuts said spring of said wear adjuster, and another position, $A_N$, with N being a positive integer equal to the number of service piston actuations;

determining said another position $A_N$ according to the wear of said brake stack, said service piston being in said another position, $A_N$, when said service piston is actuated and said service piston engages said brake stack forcing said plurality of rotors and said plurality of stators into engagement with each other;

actuating and moving said service piston to said another position $A_N$ results in: said service piston engaging said wear adjuster repositioning said wear adjuster; said service piston engaging said spring compressing said spring between said service piston and said wall of said wear adjuster; and, said service piston forcefully engaging said brake stack wherein said plurality of stators and said plurality of rotors engage each other prohibiting rotation of said input drive with respect to said fixed housing; and, discontinuing actuation of said service piston results in: said spring urging said service piston in a direction opposite said wall of said wear adjuster, said service piston disengaging said wear adjuster, and, said service piston being repositioned to a position, $I_N$ and spaced a distance, G, from said worn brake stack when it is next engaged by said service position.

23. A method for operating a brake mechanism in combination with a planetary gear set, as claimed in claim 22, wherein said wear of said brake stack is equal to $I_N$ minus $I_{N-1}$, the change in position of said service piston.

* * * * *

UNITED STATES PATENT AND TRADEMARK OFFICE
CERTIFICATE OF CORRECTION

PATENT NO. : 8,662,277 B2
APPLICATION NO. : 13/335378
DATED : March 4, 2014
INVENTOR(S) : Benjamin Warren Schoon Page 1 of 1

It is certified that error appears in the above-identified patent and that said Letters Patent is hereby corrected as shown below:

In the Specifications:

Col. 13, line 22, after "spring" delete "126" and insert --116-- therefor.

Col. 1, line 60, after the first occurrence of "the" delete "shall" and insert --shaft-- therefor.

Col. 2, line 35, after "input" delete "shall" and insert --shaft-- therefor.

Col. 3, line 25, after "engaged state)" delete ", initially," and insert --. Initially,-- therefor.

Col. 3, line 33, after "shaped" delete "shape".

Col. 5, line 4, after the first occurrence of "position," delete "to," and insert --Io,-- therefor.

Col. 5, line 41, after "minus" insert --In-1-- therefor.

Col. 7, line 54, after the second occurrence of "FIG." delete "11)" and insert --1D-- therefor.

Col. 8, line 34, before "spindle," delete "nub," and insert --hub,-- therefor.

Col. 9, line 6, before "spindle," delete "nub," and insert --hub,-- therefor.

Col. 9, line 28, after "with" delete "sue" and insert --the-- therefor.

Col. 9, line 44, before "spindle," delete "huh," and insert --hub,-- therefor.

Col. 11, line 28, after the second occurrence of "and" delete "huh" and insert --hub-- therefor.

Col. 13, line 13, after the first occurrence of "and" delete "to" and insert --Io-- therefor.

Col. 14, line 39, after "groove" delete "127E" and insert --127G-- therefor.

Col. 16, line 48, after "shoulder" delete "115E" and insert --115B-- therefor.

Col. 20, line 4, after "the" delete "huh" and insert --hub-- therefor.

Col. 22, line 39, before "view" delete "100E-aside" and insert --100F- a side-- therefor.

Signed and Sealed this
Twentieth Day of May, 2014

Michelle K. Lee
*Deputy Director of the United States Patent and Trademark Office*